(12) United States Patent
Yoshikawa et al.

(10) Patent No.: US 9,577,450 B2
(45) Date of Patent: Feb. 21, 2017

(54) CHARGER FOR HAND-HELD POWER TOOL, POWER TOOL SYSTEM AND METHOD OF CHARGING A POWER TOOL BATTERY

(75) Inventors: Shuji Yoshikawa, Anjo-Shi (JP);
Tatsuya Nagahama, Anjo-Shi (JP);
Nobuyasu Furui, Anjo-Shi (JP);
Hitoshi Suzuki, Anjo-Shi (JP);
Masaaki Fukumoto, Anjo-Shi (JP);
Takuya Umemura, Anjo-Shi (JP);
Kosuke Ito, Anjo-Shi (JP)

(73) Assignee: MAKITA CORPORATION, Anjo-shi (JP)

( * ) Notice: Subject to any disclaimer, the term of this patent is extended or adjusted under 35 U.S.C. 154(b) by 345 days.

(21) Appl. No.: 14/233,804

(22) PCT Filed: Jul. 19, 2012

(86) PCT No.: PCT/JP2012/004605
§ 371 (c)(1),
(2), (4) Date: Jan. 20, 2014

(87) PCT Pub. No.: WO2013/014889
PCT Pub. Date: Jan. 31, 2013

(65) Prior Publication Data
US 2014/0159640 A1    Jun. 12, 2014

Related U.S. Application Data

(60) Provisional application No. 61/511,092, filed on Jul. 24, 2011, provisional application No. 61/581,950, (Continued)

(51) Int. Cl.
*H02J 7/00*    (2006.01)

(52) U.S. Cl.
CPC ............ *H02J 7/0042* (2013.01); *H02J 7/0044* (2013.01); *H02J 7/0054* (2013.01)

(58) Field of Classification Search
CPC ..................................................... H02J 7/0044
(Continued)

(56) References Cited

U.S. PATENT DOCUMENTS 3,629,680 A    12/1971    Baynes et al.
4,677,362 A    6/1987    House, II et al.
(Continued)

FOREIGN PATENT DOCUMENTS

CN    101268583 A    9/2008
CN    101305404 A    11/2008
(Continued)

OTHER PUBLICATIONS

European Office Action in related EP application No. 12 775 057.8 mailed Apr. 29, 2015 with examined claims 1-15.
(Continued)

*Primary Examiner* — Thuan Do
(74) *Attorney, Agent, or Firm* — J-Tek Law PLLC; Jeffrey Tekanic; Scott Wakeman

(57) ABSTRACT

A charger for a hand-held power tool includes a power source interface, a charger base and a charging cradle rotatably supported on the charger base. The rotatable charging cradle includes at least two charging output terminals electrically connected to the power source interface. A power tool system includes the charger and the hand-held power tool. A method of charging the power tool system includes contacting charging input terminals of the power tool with the charging output terminals, rotating the charging cradle and the power tool relative to the charging base and supplying charging current to at least one battery cell while
(Continued)

the charging cradle and the power tool are allowed to freely swing relative to the charging base.

31 Claims, 34 Drawing Sheets

Related U.S. Application Data filed on Dec. 30, 2011, provisional application No. 61/664,928, filed on Jun. 27, 2012.

(58) Field of Classification Search
USPC .......................................... 320/103
See application file for complete search history.

(56) References Cited

U.S. PATENT DOCUMENTS

| | | | |
|---|---|---|---|
| 4,827,534 A | 5/1989 | Haugen | |
| 5,680,026 A | 10/1997 | Lueschen | |
| 5,809,432 A | 9/1998 | Yamashita | |
| 5,914,585 A | 6/1999 | Grabon | |
| 6,043,626 A | 3/2000 | Snyder et al. | |
| 6,154,007 A | 11/2000 | Shaver et al. | |
| 6,502,949 B1 | 1/2003 | Horiyama et al. | |
| 6,577,104 B2 | 6/2003 | Sakakibara | |
| 6,803,744 B1 | 10/2004 | Sabo | |
| 6,845,279 B1 | 1/2005 | Gilmore et al. | |
| 6,870,089 B1 | 3/2005 | Gray | |
| 6,872,121 B2 | 3/2005 | Wiesner et al. | |
| 7,030,590 B2 | 4/2006 | Sakakibara et al. | |
| 7,227,335 B2 | 6/2007 | Sakakibara et al. | |
| 7,273,159 B2 | 9/2007 | Brotto | |
| 7,357,526 B2 | 4/2008 | Zeiler | |
| 7,394,347 B2 | 7/2008 | Kady | |
| 7,863,862 B2 | 1/2011 | Idzik et al. | |
| 8,319,376 B2 | 11/2012 | Kitamura et al. | |
| 8,912,751 B2* | 12/2014 | Suzuki ............... | H01M 2/1055 320/103 |
| 2001/0010455 A1 | 8/2001 | Brotto et al. | |
| 2002/0122707 A1 | 9/2002 | Sakai et al. | |
| 2003/0107470 A1 | 6/2003 | Kady | |
| 2003/0182916 A1 | 10/2003 | Iida et al. | |
| 2003/0203669 A1 | 10/2003 | Glauning | |
| 2004/0069920 A1 | 4/2004 | Dirks | |
| 2004/0070369 A1 | 4/2004 | Sakakibara | |
| 2004/0144552 A1 | 7/2004 | Suzuki et al. | |
| 2005/0069391 A1 | 3/2005 | Dils et al. | |
| 2005/0075149 A1 | 4/2005 | Gerber et al. | |
| 2005/0111214 A1 | 5/2005 | Zeiler | |
| 2005/0173142 A1 | 8/2005 | Cutler et al. | |
| 2005/0267998 A1 | 12/2005 | Ferguson et al. | |
| 2005/0280393 A1 | 12/2005 | Feldmann | |
| 2006/0096771 A1 | 5/2006 | Brotto | |
| 2006/0112572 A1 | 6/2006 | Mccambridge et al. | |
| 2006/0142894 A1 | 6/2006 | Tsuchiya et al. | |
| 2006/0155582 A1 | 7/2006 | Brown | |
| 2006/0244414 A1 | 11/2006 | Lay | |
| 2007/0170220 A1 | 7/2007 | Fragassi | |
| 2007/0276457 A1 | 11/2007 | Gordon | |
| 2008/0008928 A1 | 1/2008 | Partin et al. | |
| 2008/0238609 A1 | 10/2008 | Wiesner et al. | |
| 2009/0096430 A1 | 4/2009 | Van Der et al. | |
| 2009/0123817 A1 | 5/2009 | Stickel et al. | |
| 2009/0145621 A1 | 6/2009 | Lau et al. | |
| 2009/0291330 A1 | 11/2009 | Onnerud et al. | |
| 2010/0134984 A1 | 6/2010 | Lum et al. | |
| 2010/0171367 A1 | 7/2010 | Kitamura et al. | |
| 2011/0140654 A1 | 6/2011 | Osswald et al. | |
| 2011/0148344 A1 | 6/2011 | Manor et al. | |
| 2011/0189512 A1 | 8/2011 | Onnerud et al. | |
| 2012/0104991 A1 | 5/2012 | Suzuki et al. | |
| 2012/0104992 A1 | 5/2012 | Suzuki et al. | |
| 2012/0111589 A1 | 5/2012 | Schmidt et al. | |
| 2012/0170204 A1* | 7/2012 | Ahn ...................... | G06F 1/1616 361/679.41 |
| 2012/0238119 A1 | 9/2012 | Rejman et al. | |
| 2012/0267134 A1 | 10/2012 | Matthias et al. | |
| 2014/0151079 A1 | 6/2014 | Furui et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2015/0054447 A1 | 2/2015 | Suzuki et al. | |
| 2015/0054464 A1 | 2/2015 | Suzuki et al. | |

FOREIGN PATENT DOCUMENTS

| | | |
|---|---|---|
| DE | 4204420 A | 8/1993 |
| DE | 9311901 | 12/1993 |
| DE | 10127821 C1 | 7/2002 |
| DE | 202006014606 | 1/2007 |
| DE | 102008060703 A | 6/2009 |
| DE | 102009045946 A | 4/2011 |
| EP | 1251618 A | 10/2002 |
| EP | 1690648 A | 8/2006 |
| EP | 1852760 A | 11/2007 |
| EP | 2072192 A | 6/2009 |
| GB | 2386746 A | 9/2003 |
| GB | 2420487 A | 5/2006 |
| JP | S6190884 A | 5/1986 |
| JP | S61142372 | 9/1986 |
| JP | H10275635 A | 10/1998 |
| JP | 2004181549 A | 7/2004 |
| JP | 2005073350 A | 3/2005 |
| JP | 2009535007 A | 9/2009 |
| JP | 3154556 U | 10/2009 |
| JP | 2009262254 A | 11/2009 |
| JP | 2010206871 A | 9/2010 |
| JP | 2010226890 A | 10/2010 |
| JP | 2011034793 | 2/2011 |
| JP | 4835697 B2 | 12/2011 |
| JP | 5569717 B2 | 8/2014 |
| WO | 0241465 A | 5/2002 |
| WO | 2006044693 A | 4/2006 |
| WO | 2007042924 A | 4/2007 |
| WO | 2007058596 A | 5/2007 |
| WO | 2007121533 A | 11/2007 |
| WO | 2008088266 A | 7/2008 |
| WO | 2011032803 A | 3/2011 |
| WO | 2012123210 A | 9/2012 |

OTHER PUBLICATIONS

Office Action from the Chinese Patent Office dated May 27, 2015 in counterpart Chinese application No. 201280036992.2, and translation thereof.
Un-published U.S. Appl. No. 14/004,951.
International Search Report from PCT/JP2012/004605.
Written Opinion from PCT/JP2012/004605.
Office Action from the Japanese Patent Office mailed Jun. 7, 2016 in counterpart Japanese application No. 2014-503344, and translation of substantive portions thereof.
Office Action from the United States Patent Office mailed Jun. 15, 2016 in counterpart U.S. Appl. No. 14/233,792.

* cited by examiner

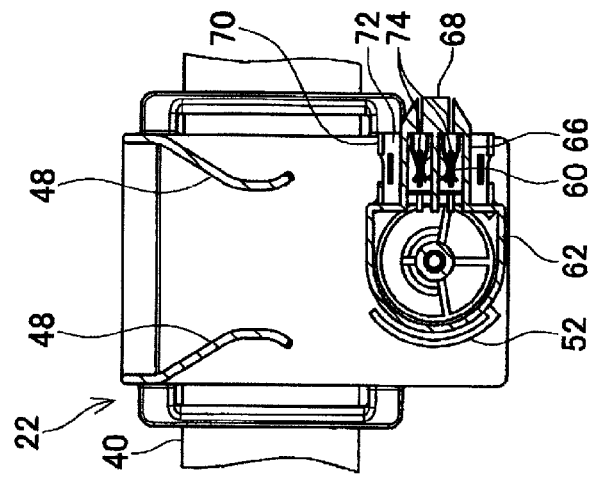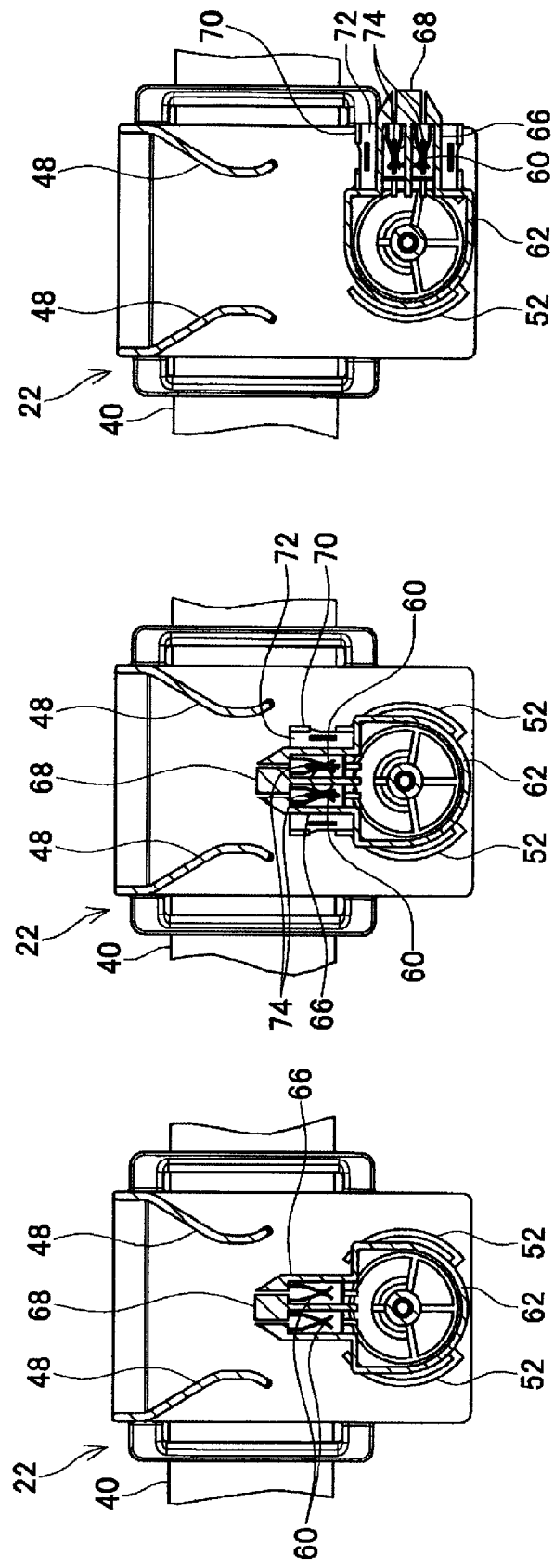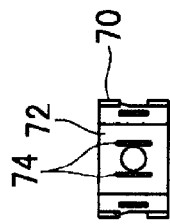

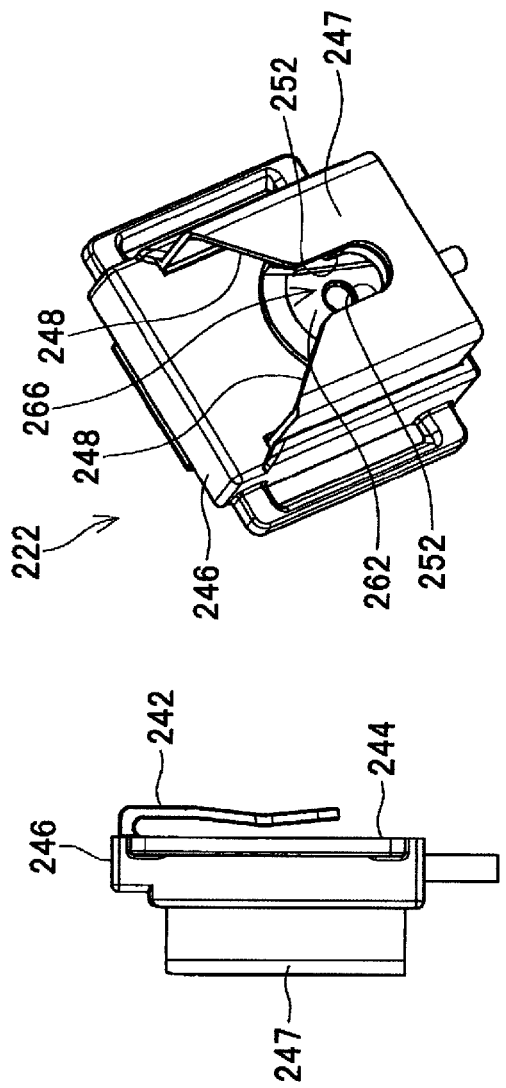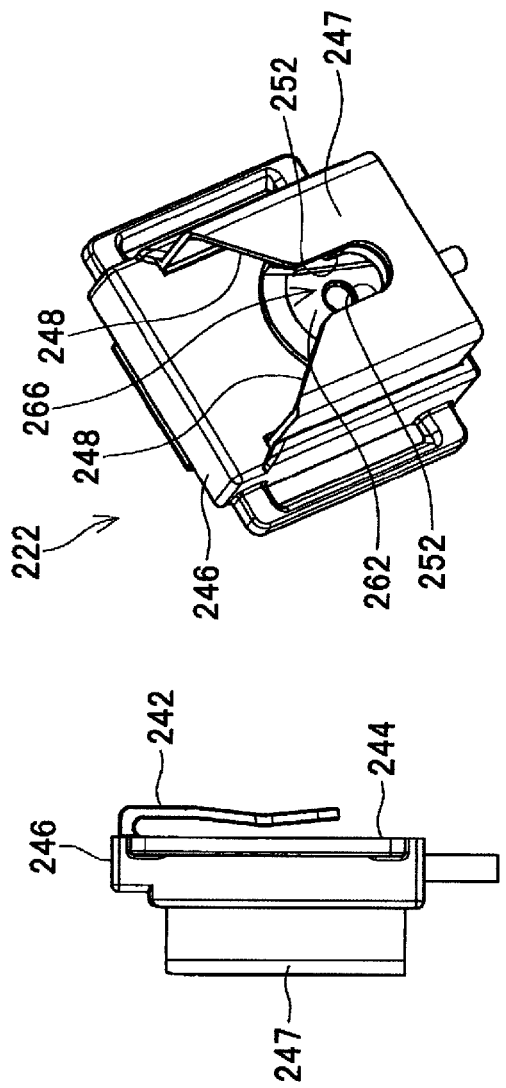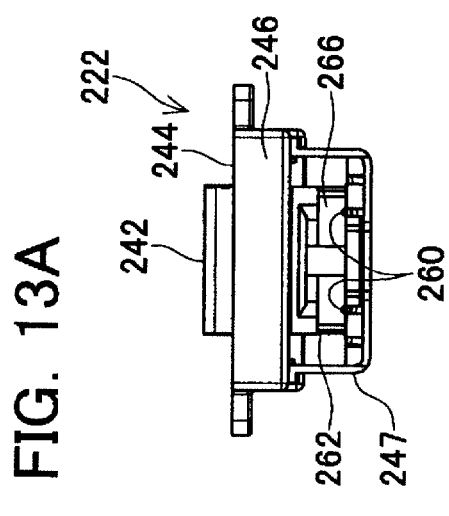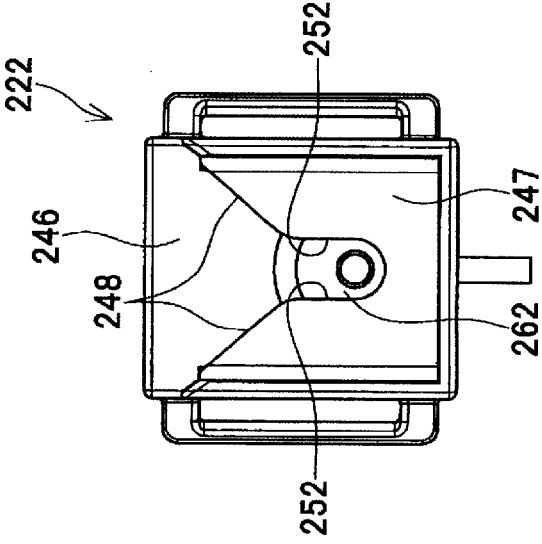

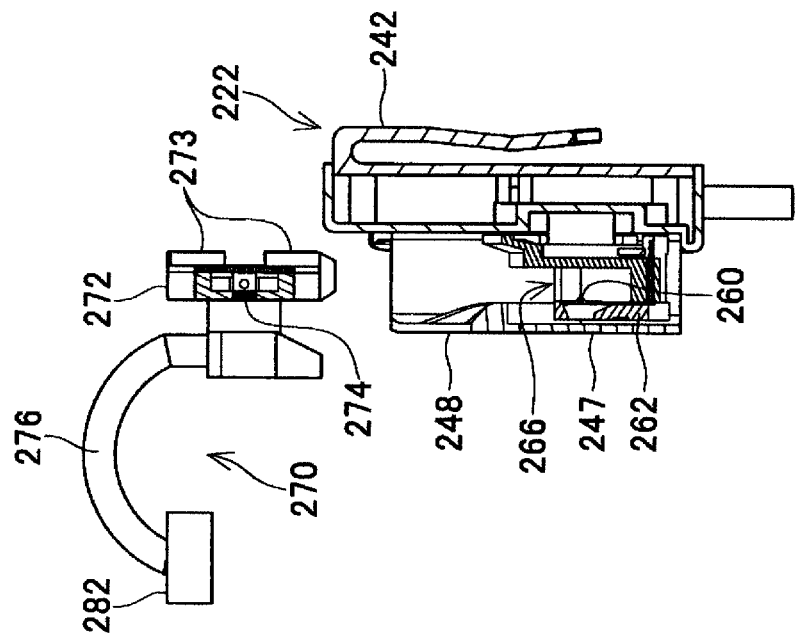
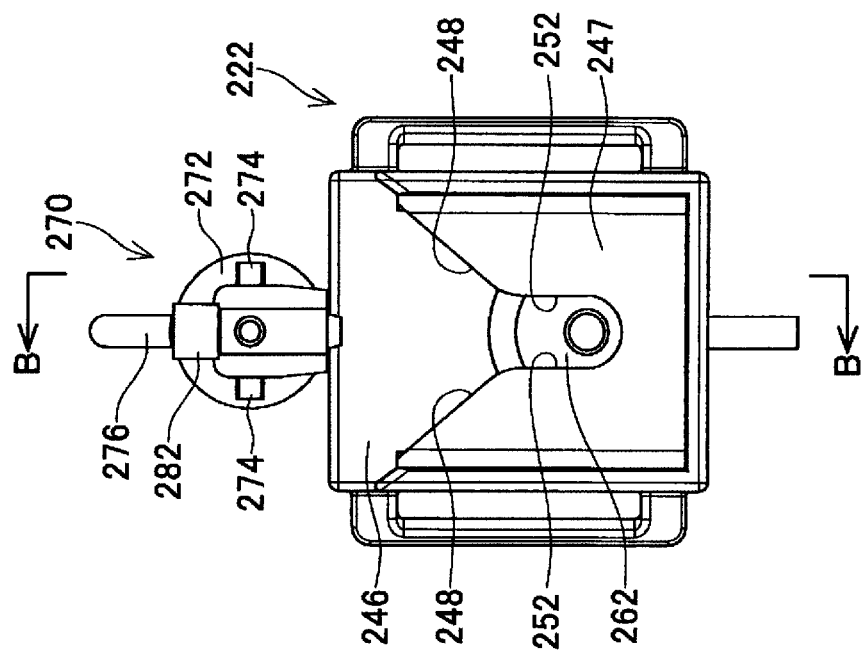
FIG. 18A
FIG. 18B

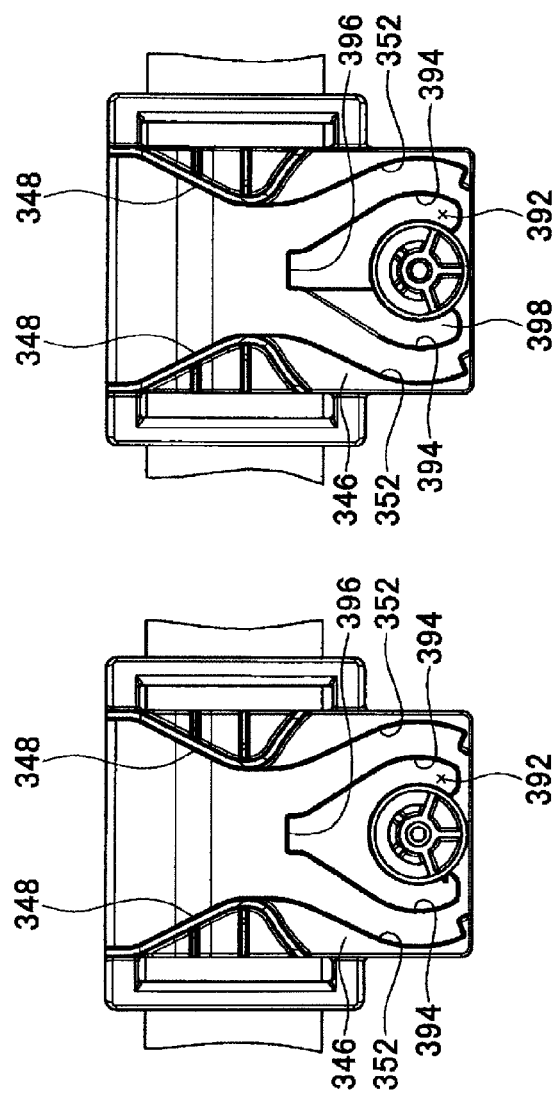

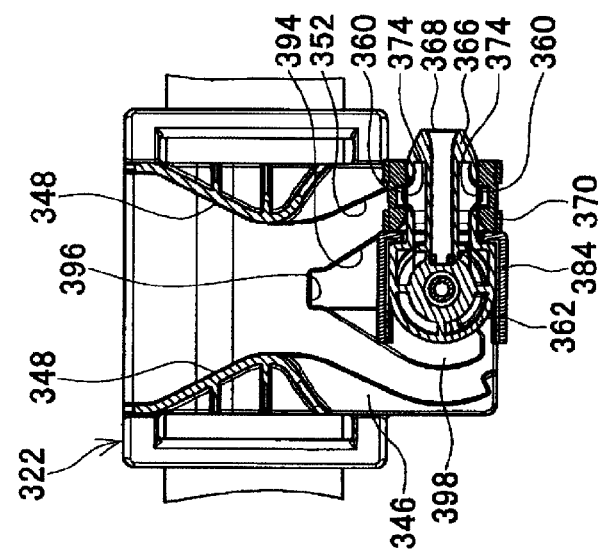
FIG. 27A
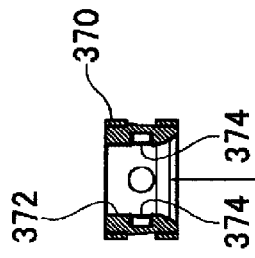
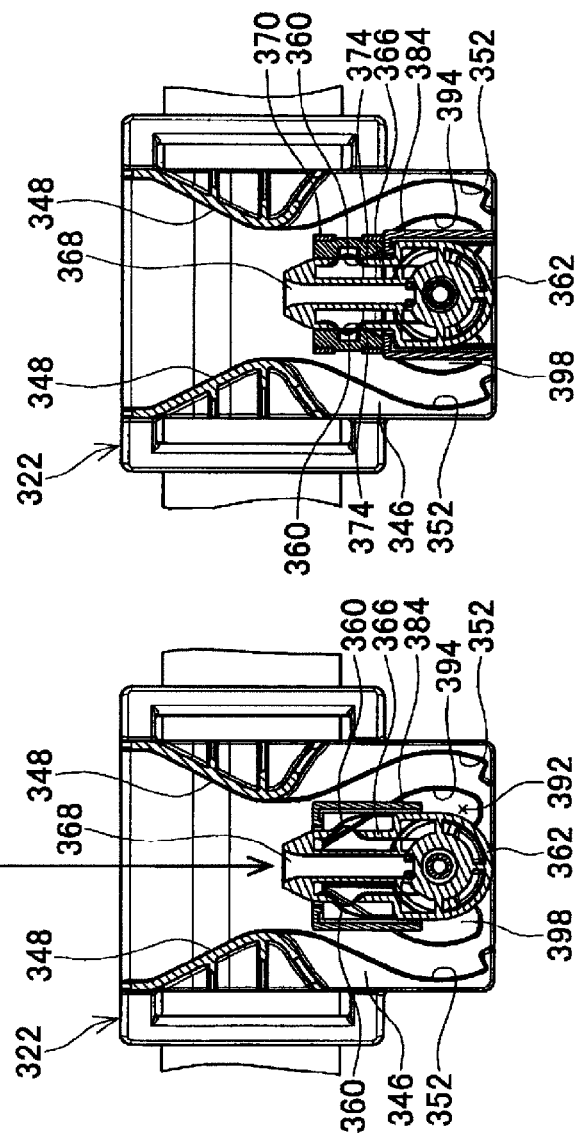
FIG. 27B
FIG. 27C

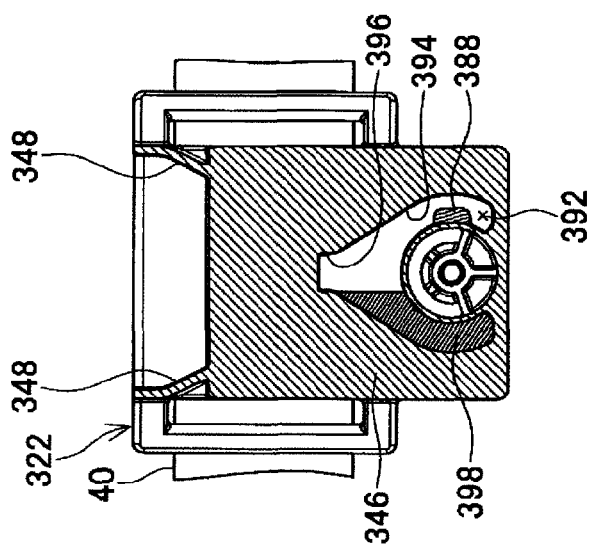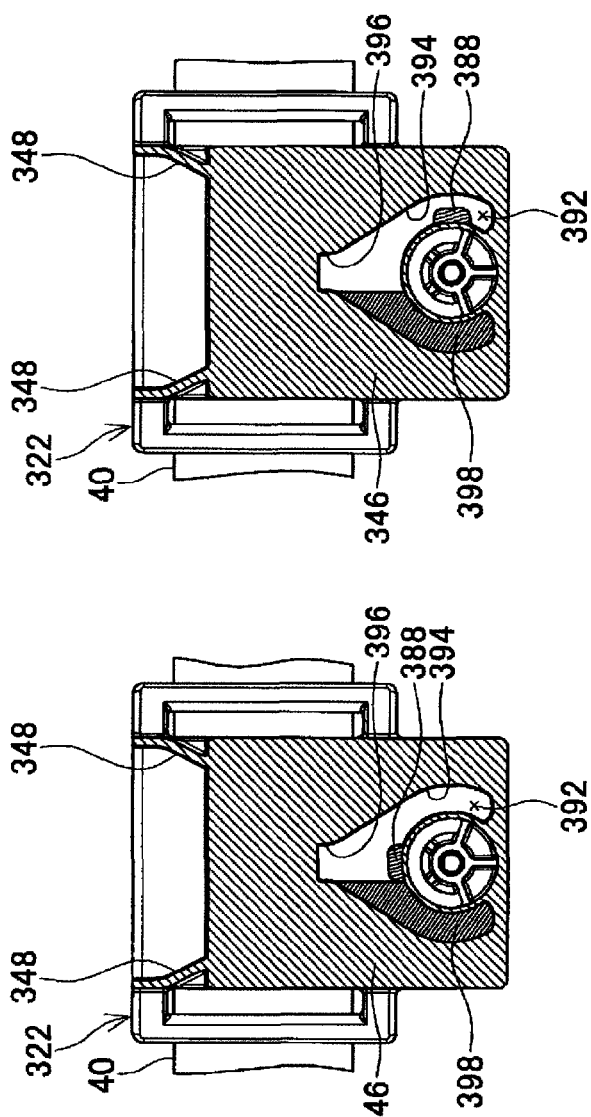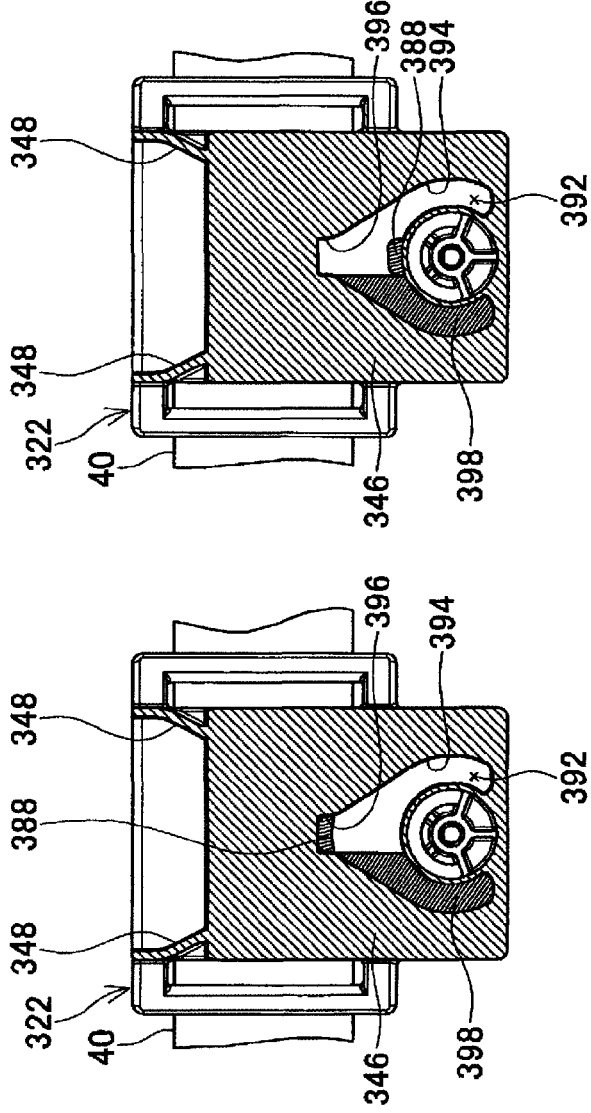

CHARGER FOR HAND-HELD POWER TOOL, POWER TOOL SYSTEM AND METHOD OF CHARGING A POWER TOOL BATTERY

CROSS-REFERENCE

This application is the U.S. National Stage of International Application No. PCT/JP2012/004605 filed on Jul. 19, 2012, which claims priority to U.S. provisional patent application No. 61/511,092 filed on Jul. 24, 2011, U.S. provisional patent application No. 61/581,950 filed on Dec. 30, 2011 and U.S. provisional patent application No. 61/664,928 filed on Jun. 27, 2012, the contents of which are incorporated herein by reference.

TECHNICAL FIELD

The present invention generally relates to a charger for a hand-held power tool system that utilizes a rechargeable battery as a power supply, to a power tool system that includes the charger, as well as to a method for charging the rechargeable battery using the charger.

BACKGROUND ART

A hand-held power tool (i.e. a cordless power tool) having a battery pack that serves as a power supply is disclosed in WO2006/044693A2. This power tool system comprises a hand-held power tool, which has the battery pack, and a charger, which charges the battery pack.

SUMMARY

Cordless (i.e. battery-powered) power tools eliminate the need to connect the power tool to an external power supply (i.e. to a commercial AC power source) when a user is using the hand-held power tool (hereinbelow, simply called a "power tool"). The user need only charge the battery pack before using the power tool. However, the charge storage capacity of a battery pack is limited, and the amount of work that the power tool can perform depends on the charge storage capacity. Therefore, the charge storage capacity of the battery pack is preferably large in order to provide a long usage time before charging is required. However, if the charge storage capacity of the battery pack is increased, but the battery chemistry is not changed, the size, weight, etc. of the battery pack must also increase. That is, while increasing the charge storage capacity of the battery pack increases the amount of work that the power tool can perform, doing so also makes the power tool more difficult (heavy, bulky, expensive, etc.) for the user to use, which is a problem.

It is therefore an object of the present teachings to disclose one or more solutions to the problem associated with the trade-off described above. In addition or in the alternative, the present teachings provide a technology that makes it possible to both increase the amount of work performed by a cordless power tool, as well as to improve the ease-of-use or convenience of the cordless power tool.

To this end, it is noted that a user typically uses a power tool intermittently, and the time during which the power tool is in continuous use is relatively short. Therefore, if it were possible that the battery pack could be charged frequently and/or in relatively small amounts during work intermissions (i.e. when the power tool is not in use), then it would be possible to avoid completely exhausting the battery pack even if the battery pack's charge storage capacity is relatively small. However, in order to achieve such frequent (re-)charging using previously known charging techniques, the charger must always be located near the user, which would restrict the movement of the user of the power tool, because the charger must remain at a fixed location in order to connect to an AC power source. That is, the advantage of a cordless power tool is that the user can use the power tool while, for example, moving to various locations and/or changing his or her stance. Therefore, because known chargers for power tools must be plugged into an AC power source (which is usually fixed in location or is at least not conveniently movable), it would difficult or at least very inconvenient to charge the battery pack frequently during work intermissions (e.g., when moving locations or changing stances) using known chargers.

Therefore, in one aspect of the present teachings, a charger for a hand-held power tool includes a power source interface, a charger base (main body) and a charging cradle (holding member) rotatably supported on the charger base. The rotatable charging cradle includes at least two charging output terminals electrically connected to the power source interface. The charger is preferably portable and wearable/carriable by the user.

Such a charger provides the advantage that it can be worn and conveniently operated by the user to frequently and/or intermittently recharge a battery pack during intermissions between power tool operations. Preferably, the battery pack need not be removed from the power tool during the charging operation. Because the charging cradle (holding member) is rotatable, the user can engage charging input terminals on the power tool and/or on the battery pack with the charging output terminals on the charger and then rotate the power tool and/or battery pack to a more convenient orientation for moving/walking around a job site with the power tool and battery pack being worn on the user's body, e.g., hanging on a belt worn around the user's waist or torso.

That is, in a further aspect of the present teachings, the charger is configured or adapted to be mounted/attached/worn on/to the user's body in an unobtrusive location. The charger is carriable by the user and can be worn as an accessory. According to this configuration, the charger can be disposed so as to be always close to the user even if the user moves to another location or changes stance. In addition, the charger preferably contains a portable power source, e.g., one or more battery cells, so as to permit unlimited movement of the user while using and recharging the cordless power tool.

In one embodiment of the present teachings, a hand-held power tool system comprises a power tool and a charger. The power tool preferably comprises an electric motor, a first battery pack, and charging input terminals. The electric motor is, for example, a motor or a solenoid, and is configured to drive a tool. The first battery pack is configured to supply driving current to the electric motor. The charging input terminals are configured such that they are capable of receiving charging power for charging the first battery pack. The charger preferably comprises a charger main body, a holding member (or charging cradle), and charging output terminals. The charger main body is configured such that it can be worn, mounted or attached on/to the user's body. The holding member is provided on the charger main body and is configured to attachably/detachably hold the power tool. The charging output terminals electrically connect to the charging input terminals of the power tool held by the holding member and are configured to output the charging power (current) to the first battery pack.

In such a wearable charger, the power tool is preferably easily attached to the holding member. Furthermore, the attitude or orientation of the power tool attached to the holding member preferably stabilizes (e.g., pivots or swings) such that the power tool does not interfere with the user's movements when the user is not using the power tool (i.e. when the power tool is mounted on the charger worn by the user).

Taking these points into consideration, in another embodiment of the present teachings, the holding member (charging cradle) is preferably supported such that it can rotate relative to the charger main body (base). In this case, the holding member is preferably urged toward a position (e.g., a first rotation position) at which the user can easily attach the power tool. The rotational position of the holding member at which the user can easily attach the power tool and the rotational position of the holding member at which the attitude or orientation of the attached power tool stabilizes are different from one another. Therefore, after the power tool has been attached to the holding member, the holding member preferably rotates or pivots from the first rotation position due to the weight of the power tool (i.e. due to gravity). Therefore, the attitude/orientation of the power tool attached to the holding member will stabilize due to the intrinsic weight of the power tool (i.e. due to gravity), and it thereby becomes easier for the user to move about. In addition, the power tool/battery pack are preferably free to swing or pivot relative to the charger main body (base) while the charging operation is taking place without interrupting the flow of current from the charger to the battery pack.

Further objects, embodiments, advantages and designs of the present teachings will become apparent to a person having ordinary skill in the art after reviewing the following detailed description and claims in view of the appended drawings.

BRIEF DESCRIPTION OF DRAWINGS

FIGS. 9A-9C show states wherein charging input terminals on the power tool side are connected to charging output terminals on the charger side when the power tool is attached to the charger main body according to the procedure shown in FIG. 8A through FIG. 8C.

FIGS. 13A-13D are external views of the charger main body of the third embodiment.

FIG. 15A shows the holding member at a normal position (i.e., a first rotation position), FIG. 15B shows the holding member rotated in the clockwise direction away from the normal position, and FIG. 15C shows the holding member rotated in the counterclockwise direction away from the normal position.

FIGS. 18A and 18B show the charging adapter (without the power tool) immediately before it is attached to the charger main body, according to the third embodiment. FIG. 18A is a front view. FIG. 18B is a cross sectional view taken along B-B line in FIG. 18A.

FIG. 19A is a front view. FIG. 19B is a cross sectional view taken along B-B line in FIG. 19A.

FIG. 20A shows the charging adapter before it is rotated, and FIG. 20B shows the charging adapter after it has been rotated.

In FIG. 22A, the holding member is at the normal position (i.e., the first rotation position), and a movable member is at a first location relative to a rotary shaft. In FIG. 22B, the holding member is at the normal position, and the movable member is at a second location relative to the rotary shaft. In FIG. 22C, the holding member has rotated clockwise away from the normal position together with the movable member at the second location.

FIGS. 23A, 23B, and 23C show the charger main body of the fourth embodiment during assembly. In FIG. 23A, the holding member and other movable members are omitted to show the internal components. In FIG. 23B, a rotation restricting member is attached to the housing cover. In FIG. 23C, the holding member and an urging member are further attached to the housing cover.

FIG. 26A shows the power tool immediately before it is attached to the charger main body. FIG. 26B shows the power tool immediately after it has been attached to the charger main body. FIG. 26C shows the power tool in the state wherein it has rotated downward, due to its intrinsic weight (gravity), after having been attached to the charger main body.

FIGS. 27A-27C show a progression of states wherein the power tool is attached to the charger main body according to the procedure described in FIG. 26A through FIG. 26C, such that the charging adapter engages with the holding member and the movable member moves from its first location to its second location.

FIGS. 29A-29C also show a progression of states wherein the power tool is attached to the charger main body according to the procedure described in FIG. 26A through FIG. 26C; in these views, a sliding projection of the movable member is shown moving within a hollow part of the charger main body.

DETAILED DESCRIPTION

Figure 1:
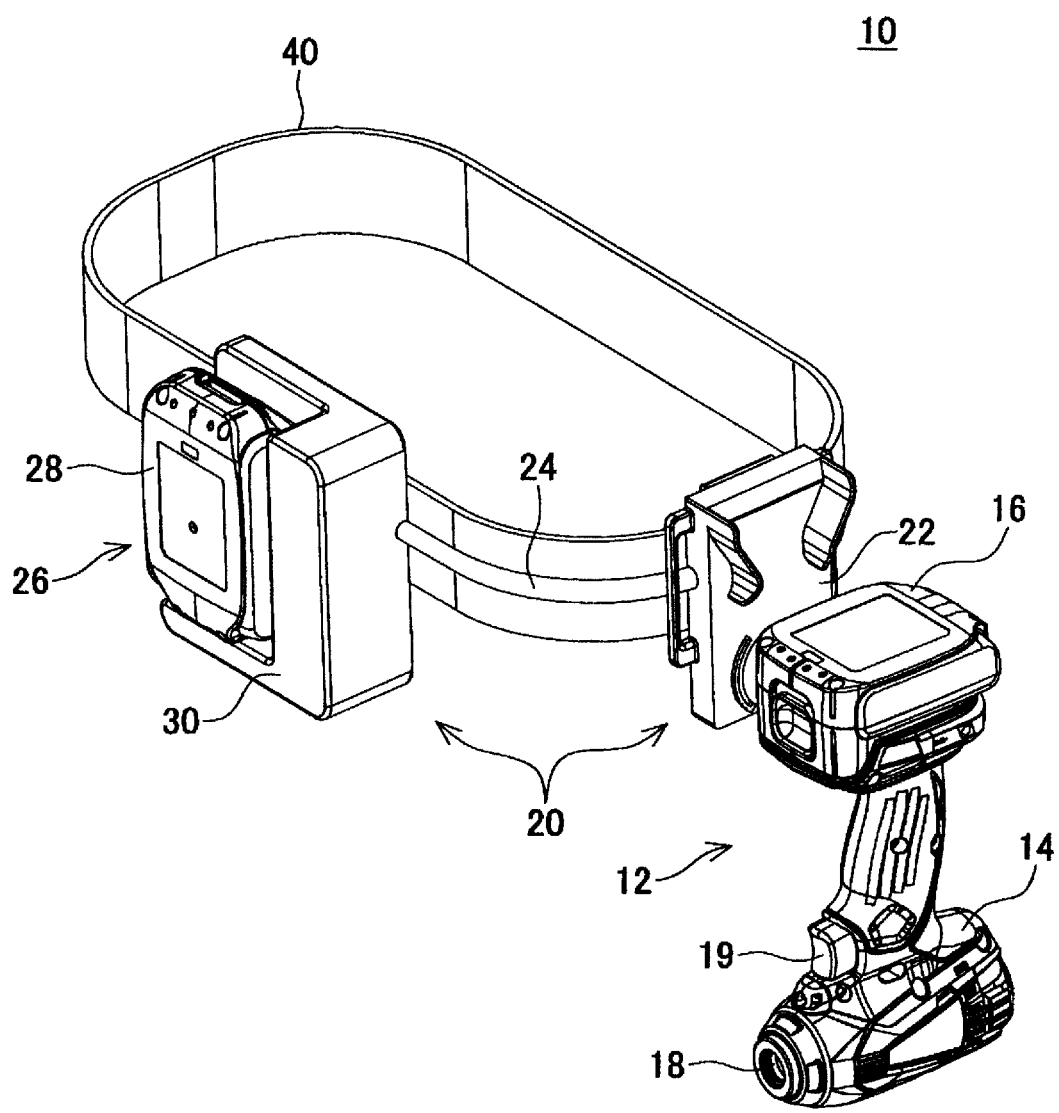
FIG. 1 is an external view of a power tool system of a first embodiment.

In one embodiment of the present teachings, the holding member (charging cradle) is preferably capable of rotating until the center of gravity of a power tool is located vertically below a rotary shaft of the holding member. When the center of gravity of the power tool is located vertically below the rotary shaft of the holding member, the power tool is in the most stable attitude or orientation. When the attitude or orientation of the power tool stabilizes, the user can move freely with the power tool mounted on his/her hip or waist (e.g., via a belt); furthermore, the holding member constantly tracks or follows the power tool if/when it swings, so that the electrical connection between the power tool and a charger also is stable (i.e. uninterrupted or continuous).

In one embodiment of the present teachings, it is preferable to provide a lock mechanism on the power tool or the charger, or both. The lock mechanism is preferably configured such that, when the holding member has rotated away from a first rotation (normal) position, the power tool can no longer be detached from the holding member. According to this configuration, even if, for example, the user moves or changes his or her stance, it is possible to prevent the power tool, which is attached to the charger, from accidentally or inadvertently coming off of the charger.

In the above-mentioned embodiment, the lock mechanism preferably has one or more lock walls provided on the charger main body. In this case, the lock wall(s) is (are) preferably formed at (a) position(s) at which, when the holding member has rotated away from the first rotation position, the lock wall(s) contact(s) the power tool, which is attached to the holding member. According to this structure, once the power tool has been attached to the holding member, the power tool can be locked to or in the charger automatically by use of a rotary mechanism of the holding member and the weight of the power tool.

In the above-mentioned embodiment, at least two lock walls are provided and at least a portion of each of the lock walls preferably extends in circumferential directions with respect to (around) the rotary shaft of the holding member. According to this configuration, even if the rotational position of the holding member relative to the charger main body changes, the gap(s) between the power tool and the lock wall(s) do(es) not change, and it is possible to prevent the power tool from rattling loudly, even if the user's movements cause the power tool to swing or pivot about the rotary shaft.

In one embodiment of the present teachings, when the power tool has been attached to the holding member, it is preferable that electrical connections between charging output terminals of the charger and charging input terminals of the power tool are maintained regardless of the rotational position of the holding member relative to the charger main body. According to this configuration, even when the power tool attached to the holding member swings or pivots back and forth, the charging can continue without interruption.

In the above-mentioned embodiment, the charging output terminals and the charging input terminals may be one or more sets of contact type connection terminals. In this case, the charging output terminals are preferably provided on the holding member and the charging input terminals are provided on the charging adapter. In this configuration, once the power tool has been attached to the holding member, the charging output terminals and the charging input terminals make physical contact and electrically connect.

Alternatively, the charging output terminals and the charging input terminals may be one or more sets of non-contact type connection terminals. In this case, it is preferable to adopt a configuration wherein, once the power tool has been attached to the holding member, the charging output terminals and the charging input terminals are proximate enough to one another for the charging output terminals to wirelessly transmit power to the charging input terminals, e.g., via induction coils.

In one embodiment of the present teachings, the attitude or orientation of the user's wrist when the power tool is attached to the holding member, which is at the first rotation (normal) position, is preferably the same as or close to the attitude the user's wrist would be in when the user lowers his or her hand holding the power tool in a natural or comfortable manner. According to this configuration, the user can easily attach the power tool to the holding member of the charger without having to make any special movements.

In one embodiment of the present teachings, at least a portion of the holding member preferably opposes the charger main body across a gap. In this case, the charging output terminals are preferably disposed in that gap. According to this configuration, the charging output terminals, which output charging power, are not exposed to the outside and are thereby protected.

In one embodiment of the present teachings, either the power tool or the holding member preferably has a protruding part and the other preferably has a receiving part that receives the protruding part. For example, the protruding part can generally have the shape of a plate, bar or rod, e.g., a square, rectangular or polygonal projection, with a narrowed or tapered tip. In this case, the receiving part can have a receiving hole that receives the selected shape of the protruding part. Alternatively, the protruding part can have the shape of a rounded or curved disk. In this case, the receiving part can have a groove or other receptacle that is configured to receive the selected disk shape. However, the protruding part and the receiving part may have any other complementary shapes or structures and they are not limited to the above-mentioned embodiments.

In one embodiment of the present teachings, the charger preferably comprises a battery apparatus. The battery apparatus stores electric power (charge) for supplying the charging current (power) to the charging output terminals. According to this configuration, a battery pack of the power tool can be charged without the need of an external power supply (e.g., an AC electrical outlet or a portable generator). As a result, the user can move over a wider area while using the cordless power tool without requiring an AC-powered charger nearby to recharge a depleted battery pack.

In the above-mentioned embodiment, the battery apparatus preferably comprises: a second battery pack, which has at least one internal primary battery, secondary battery or fuel cell, and a battery interface, which is electrically connected to the charging output terminals. The battery interface is configured or adapted to detachably attach to the second battery pack. According to this configuration, when the charge of the second battery pack is exhausted or depleted, the second battery pack is exchanged with another charged second battery pack, and thereby the power tool can be continue to be frequently charged during work intermissions.

In the above-mentioned embodiment, the second battery pack is preferably also attachable directly to the power tool. Thus, for example, when the power tool is operated continuously for a long time, the drive current can be supplied directly to the power tool by directly attaching such a second battery pack having a comparatively large charge storage capacity to the power tool. This embodiment provides the advantage that the user can use two differently sized battery packs to operate the power tool. A smaller battery pack may be normally attached to the power tool, thereby providing a lighter-weight power tool for repeated operations and reducing user fatigue from holding the power tool. In this case, the larger battery pack can be attached to the charger (battery interface) in order to supply charging current to the smaller battery pack. That is, e.g., the heavier battery pack can be mounted on the user's belt, thereby reducing user fatigue while providing extended power tool operation without the need to connect the battery packs to an AC-powered charger. However, in case the user temporarily needs a larger power supply or the smaller battery pack becomes depleted, the user can attach the larger battery pack directly to the power tool in order to continue the power tool operation.

In each of the above-mentioned embodiments, the charger main body and the battery apparatus can preferably be fixed (attached) to the user's hip, waist or torso using a common belt. According to this configuration, the user can put on the charger main body and the battery apparatus simultaneously by simply attaching the belt around the user's mid-section. While the battery interface is also attached to the belt, it may instead be attached to or worn on the user's body using another apparatus, such as e.g., a backpack, an arm band, a leg band, a necklace, etc. An electric cord between the battery interface and the charger main body preferably has sufficient length in such embodiments to allow a greater separation between the battery interface (apparatus) and the charger main body.

In each of the above-mentioned embodiments, the charger main body is preferably disposed on either the left side or the right side of the user's body depending upon the handedness of the user. Locating the charger main body on the side of the user's body makes it easy and convenient for the user to attach the power tool to the charger main body. That is, the charger main body may function similar to a hip-mounted gun holster that enables the user to simply downwardly slide the power tool into the charger main body along the side of the user's body after each power tool usage. If the user is right handed, the charger main body should be disposed on the right side of the user's body; on the other hand, if the user is left handed, the charger main body should be disposed on the left side of the user's body.

In one embodiment of the present teachings, the power tool is preferably configured such that it can be attached to and detached from the first battery pack. However, in another embodiment, a configuration may be adopted wherein the power tool battery is built into the power tool and is not normally attachable or detachable.

In one embodiment of the present teachings, the power tool preferably comprises a charging adapter. The charging adapter is attached to the tool main body or the first battery pack of the power tool, such that the tool main body or the first battery pack of the power tool can be attached to and detached from the charger main body.

In one embodiment of the present teachings, the hand-held power tool system may comprise the hand-held power tool and the charger. In this case, the power tool may comprise an electric motor (a motor or a solenoid) that drives the tool, the first battery pack, which supplies the drive current to the electric motor, and charging input terminals, which receive the charging current (power) for charging the first battery pack. The charger may comprise: the charger main body, which is mountable on or attachable to the body of the user; the holding member, which is provided on the charger main body and attachably/detachably holds the power tool; and charging output terminals, which electrically connect to the charging input terminals of the power tool held by the holding member and output the charging current (power) to the first battery pack. Furthermore, in this power tool system, the power tool or the charger, or both, can further comprise an urging or biasing member, which urges or biases the power tool attached to the holding member in the direction or towards the position in which the power tool is detachable from the holding member. According to such a configuration, when it is time to use the power tool, the user can easily detach the power tool from the holding member.

The above-mentioned urging or biasing member may be provided on the charger. In this case, the urging member may be supported by the holding member. Although it is only one non-limiting example of the present teachings, the urging member may be a coil spring, another type of spring or a resiliently elastic material.

The charger may further comprise a movable member, which is capable of moving between a first location and a second location relative to the holding member and is urged or biased toward the first location by the urging member. In this case, a configuration may be adopted wherein, when the power tool is being attached to the holding member, the movable member moves from the first location to the second location, and when the power tool is being detached from the holding member, the movable member moves from the second location to the first location. The movable member may be configured such that it contacts the power tool either directly or indirectly.

In the above-mentioned embodiment, the holding member may be supported such that it can rotate relative to the charger main body. In this case, a configuration may be adopted wherein, when the holding member is at the first rotation position (i.e. its normal position when the power tool is not attached thereto), the power tool can be attached to and detached from the holding member and, when the holding member rotates away from the first rotation position, the power tool can no longer be detached from the holding member. Furthermore, a configuration may be adopted wherein the movable member moves from the first location to the second location as the holding member rotates away from the first rotation position, and the movable member moves from the second location to the first location as the holding member rotates towards the first rotation position. Furthermore, it is also possible to adopt a configuration wherein the holding member is urged toward the first rotation position by virtue of the urging member urging the movable member toward the first location.

In the above-mentioned embodiment, the charger main body may have one or more slide surfaces, against or along which the movable member slides when the movable member rotates together with the holding member. In this case, over at least a portion of the slide surface(s), the distance from the rotary shaft of the holding member to the slide surface(s) may vary along the circumferential directions of the rotary shaft such that the portion at which the movable member makes contact is maximally distanced (spaced) when the holding member is at the first rotation position. According to such a configuration, the holding member is urged toward the first rotation position by virtue of the movable member moving between the first location and the second location in accordance with the rotational position of the holding member and by virtue of the holding member urging the movable member toward the first location.

The above-mentioned slide surface(s) may have a recessed part at the portion where the movable member makes contact when the holding member is at the first rotation position. According to such a configuration, the movable member engages with the recessed part of the slide surfaces when the rotatable holding member is at the first rotation position. When the power tool is not attached to the holding member, the holding member is maintained at the first rotation position, and therefore the user can easily attach the power tool to the holding member. In addition, it is also possible to prevent the holding member from rotating unexpectedly because the recessed part locks or latches the position of the movable member, thereby preventing rotation of the holding member.

The above-mentioned movable member may be configured such that the movable member covers at least a portion of the holding member when the movable member is at the first location, and the movable member exposes at least a portion of the holding member when the movable member is at the second location. According to such a configuration, the holding member is protected by the movable member, which makes it possible to prevent damage to the holding member, in particular to charging output terminal disposed on the holding member as will be discussed below.

That is, a configuration may be adopted wherein the charging output terminals are provided on the holding member, the movable member covers the charging output terminals when the movable member is at the first location, and the movable member exposes the charging output terminals when the movable member is at the second location. According to such a configuration, the charging output terminals are protected by the movable member when the power tool is not mounted in the charger main body, which makes it possible to prevent damage to the charging output terminals.

The above-mentioned holding member may be configured such that it can rotate in either the one direction (e.g., clockwise) or the other direction (e.g., counterclockwise) away from the first rotation position. According to such a configuration, the holding member can be configured such that it can be used by either a right handed user or a left handed user. This is because the direction in which the holding member rotates depends on whether a right handed user mounts the charger main body on the right side of his/her body or a left handed user mounts the charger main body on the left side of his/her body.

In such embodiments, the charger may further comprise a rotational direction limiting (preventing) member, which can selectively limit the direction in which the holding member rotates away from the first rotation position to either the one direction or the other direction, i.e. either clockwise or counterclockwise. According to such a configuration, the user can restrict, in accordance with his or her handedness, the holding member from rotating in an unnecessary rotational direction.

In one embodiment of the present teachings, the hand-held power tool system may comprise the hand-held power tool and the charger. In this case, the power tool may comprise an electric motor (a motor or a solenoid) that drives the tool, the first battery pack, which supplies the drive current to the electric motor, and the charging input terminals, which receive the charging current (power) for charging the first battery pack. The charger may comprise: the charger main body, which is mountable on or attachable to the body of the user; the holding member, which is provided on the charger main body and attachably/detachably holds the power tool; and the charging output terminals, which are electrically connectable to the charging power input terminals of the power tool held by the holding member and output the charging current (power) to the first battery pack. Furthermore, in this power tool system, the charger preferably further comprises the movable member. In this case, a configuration may be adopted wherein the movable member: (i) can move between the first location and the second location relative to the holding member, (ii) covers at least a portion of the holding member when the movable member is at the first location, and (iii) exposes at least a portion of the holding member when the movable member is at the second location. According to such a configuration, the holding member is protected by the movable member, which makes it possible to prevent damage to the holding member, or to a component disposed on or in it, e.g., charging output terminals, when the power tool is not mounted in the charger main body.

In the above-mentioned embodiment, the charging output terminals may be provided on the holding member. In this case, a configuration may be adopted wherein the movable member covers the charging output terminals when the movable member is at the first location, and exposes the charging output terminals when the movable member is at the second location. According to such a configuration, the charging output terminals are protected by the movable member, which makes it possible to prevent damage to the charging output terminals when the power tool is not mounted in the charger main body.

In the above-mentioned embodiment, the movable member may have a wiping surface that wipes or scrapes one or more surfaces of the charging output terminals when the movable member moves between the first location and the second location. According to such a configuration, it is possible to prevent foreign matter from adhering to the charging output terminals (or to remove the foreign matter if it has adhered thereto) and to maintain maintenance-free and satisfactory contact between the charging output terminals and the charging input terminals.

First Embodiment

A power tool system 10 of a first embodiment will now be explained with reference to the drawings. As shown in FIG. 1, the power tool system 10 comprises a hand-held power tool 12 and a charger 20. The power tool 12 comprises a tool main body 14 and a first battery pack 16. The tool main body 14 has an internal motor, which rotationally drives a tool and a tool shaft or chuck 18. The first battery pack 16 has a plurality of internal secondary batteries (e.g., lithium-ion cells) and supplies the drive current to the motor in response to the user's operation of a trigger 19. In the present embodiment, the first battery pack 16 can be attached to and detached from the tool main body 14. However, in place of the attachable/detachable first battery pack 16, one or a plurality of secondary battery cells may be directly built into the tool main body 14.

The charger 20 comprises a charger main body (base) 22 and a battery power supply 26. The charger main body 22 and the battery power supply 26 can be fixed or attached to (e.g., hooked onto) a hip belt 40 to be worn by the user. In this way, the user can put on and carry the charger 20 while moving (e.g., while working). If the user is right handed, then the charger main body 22 should be disposed on the right side of the user's body; on the other hand, if the user is left handed, then the charger main body 22 should be disposed on the left side of the user's body. In such arrangements, the user can easily and conveniently attach the power tool 12 to and detach the power tool 12 from the charger main body 22. In addition, the battery power supply 26 is preferably disposed on or at the back of the user so that it does not interfere with the user's work, although the battery power supply 26 may be disposed at any other convenient or non-obstructive position on the user's body. That is, one or more parts of the charger 20 is (are) not limited to being fixed or attached to the hip belt 40, and may instead be fixable or attachable to some other accessory or clothing of the user, such as a back pack, a pants pocket, a shirt pocket, a necklace, etc. Alternatively, one or more parts of the charger 20 may be fixable directly to the user's body such as via an arm band (strap), a leg band (strap), etc. The power tool 12 may include a charging adapter, which is further explained below, and can be attached to and detached from the charger main body 22. The charger main body 22 supplies the charging power to the attached power tool 12 for charging the first battery pack 16.

The battery power supply 26 comprises a second battery pack 28 and a battery (power source) interface 30. A plurality of secondary battery cells (e.g., lithium-ion cells) is built into or disposed within the second battery pack 28. The second battery pack 28 can be attached to and detached from the battery interface 30. That is, the second battery pack 28 has two or more terminals configured or adapted to electrically connect with corresponding terminals of the battery (power source) interface 20. Furthermore, the second battery pack 28 preferably outputs a voltage between 10-40 volts, more preferably between 18-36 volts, even more preferably between 25-36 volts. The second battery pack 28 also preferably outputs a current greater than 0.7 amps, more preferably greater than 1.0 amp, more preferably greater than 3.0 amp, even more preferably greater than 10.0 amp.

The battery interface 30 is permanently or detachably fixable or attachable to the hip belt 40. The battery interface 30 is electrically connected to the charger main body 22 through an electrical cord 24. In addition, the battery interface 30 is electrically connected to the attached second battery pack 28. Electric power discharged by the second battery pack 28 is supplied to the charger main body 22 through the battery interface 30 and the electrical cord 24. The electric power supplied to the charger main body 22 is supplied to the power tool 12, and thereby the first battery pack 16 of the power tool 12 is charged. Accordingly, the charger 20 of the present embodiment can charge the power tool 12 without the need of an external power supply (e.g., an electrical outlet connected to a commercial power supply or a portable generator). Furthermore, in the present embodiment, while the battery power supply 26 is independent of or separate from the charger main body 22, it may be formed integrally therewith. Alternatively, in place of the attachable/detachable second battery pack 28, at least one secondary battery may be built into the charger main body 22 or the battery power supply 26. Alternatively, the charger 20 may directly receive electric power from an external power supply without having a battery power supply 26.

Although it is only one non-limiting example of the present teachings, in the present embodiment, a battery pack that is manufactured for a power tool is used as the second battery pack 28 of the battery power supply 26. Therefore, the second battery pack 28 is attached directly to the tool main body 14 instead of to the first battery pack 16, and can supply the drive current to the tool main body 14. In this case, the first battery pack 16 and the second battery pack 28 may be the same product with equal capacity and voltage, or may be separate products wherein the capacity and/or the voltage is (are) different.

Figure 2:
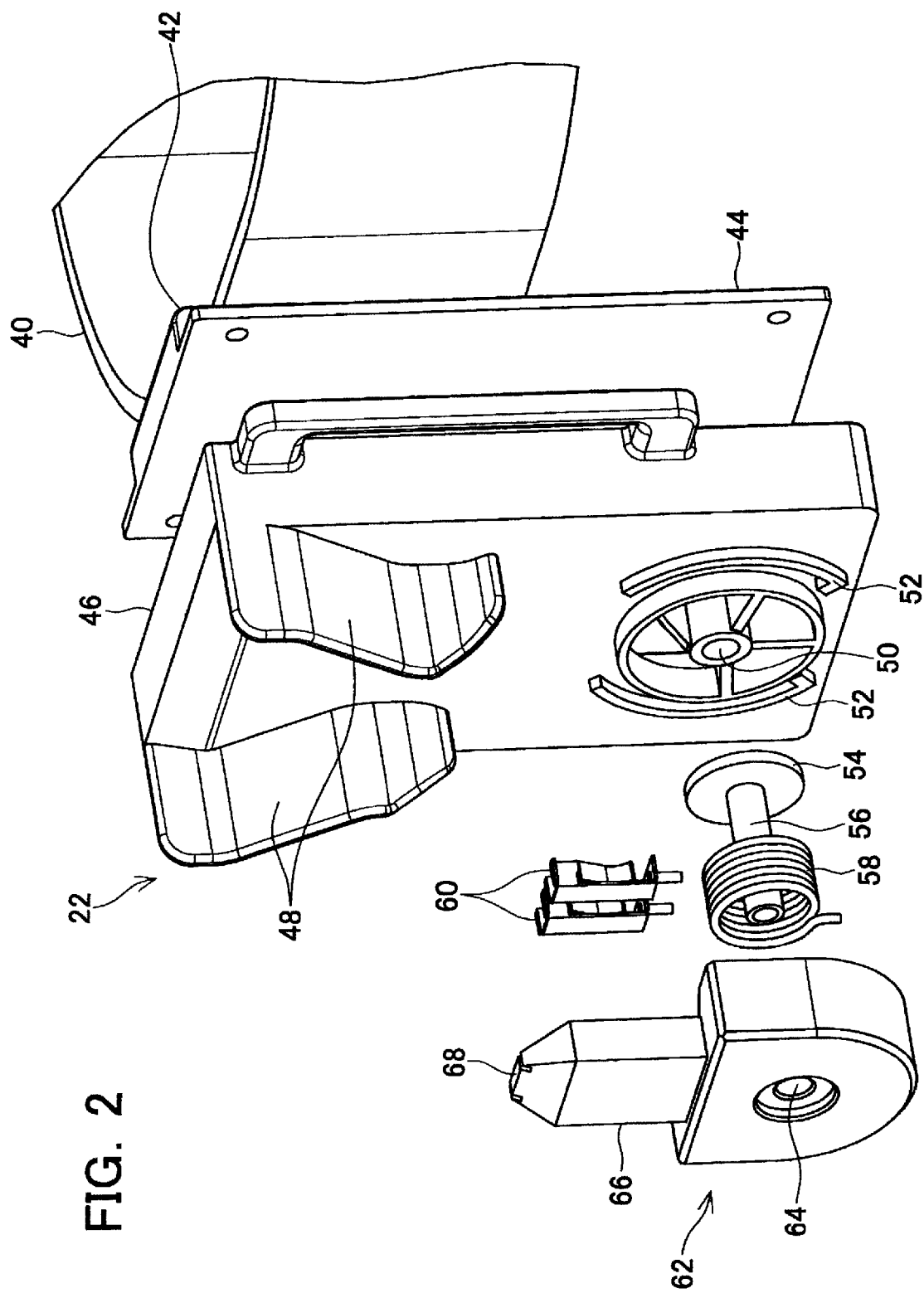
FIG. 2 is an exploded view of a charger main body of the first embodiment.

A representative structure of the charger main body (base) 22 will now be explained with reference to FIG. 2 and FIG. 3. The charger main body 22 comprises a housing cover 46 affixed to a housing plate 44. A belt hook 42 is configured to engage (hang over) the hip belt 40 and is provided on the housing plate 44. A holding member (cradle) 62 is provided on the housing cover 46. The holding member 62 is supported by a shaft 56 and is rotatable relative to the housing cover 46. The shaft 56 is inserted through a hole 50, which is formed in the housing cover 46, into a center hole 64, which is formed in the holding member 62. Furthermore, a flange 54 is located at a base end of the shaft 56 and is disposed on the inner side of the housing cover 46. A torsion spring 58 is provided between the housing cover 46 and the holding member 62. One end of the torsion spring 58 is fixed to the housing cover 46, and the other end of the torsion spring 58 is fixed to the holding member 62. The elastic force of the torsion spring 58 holds the holding member 62 at a normal position (i.e., the first rotation position). When the holding member 62 rotates from the normal position, the torsion spring 58 urges the holding member 62 toward (to return to) the normal position. Thus, the charger main body 22 and rotatable holding member 62 may be considered as a type of rotatable charging cradle.

A protruding part 66 is formed in or on the holding member 62. The protruding part 66 is generally plate shaped and a tip 68 thereof tapers. The protruding part 66 extends in the radial direction of the rotary shaft 56 (i.e., the center hole 64) of the holding member 62. As discussed below, the protruding part 66 of the holding member 62 is insertable into a receiving part, which is formed on the power tool 12, to thereby attach the power tool 12 to the charger main body 22. When the holding member 62 is at the normal position, the tip 68 of the protruding part 66 is located upward, i.e., extends in the vertical direction. Therefore, the user can easily and conveniently attach the power tool 12 to the charger main body 22 as will be further discussed below. The holding member 62 is configured such that the power tool 12 can be attached in only one specific orientation.

Figure 3:
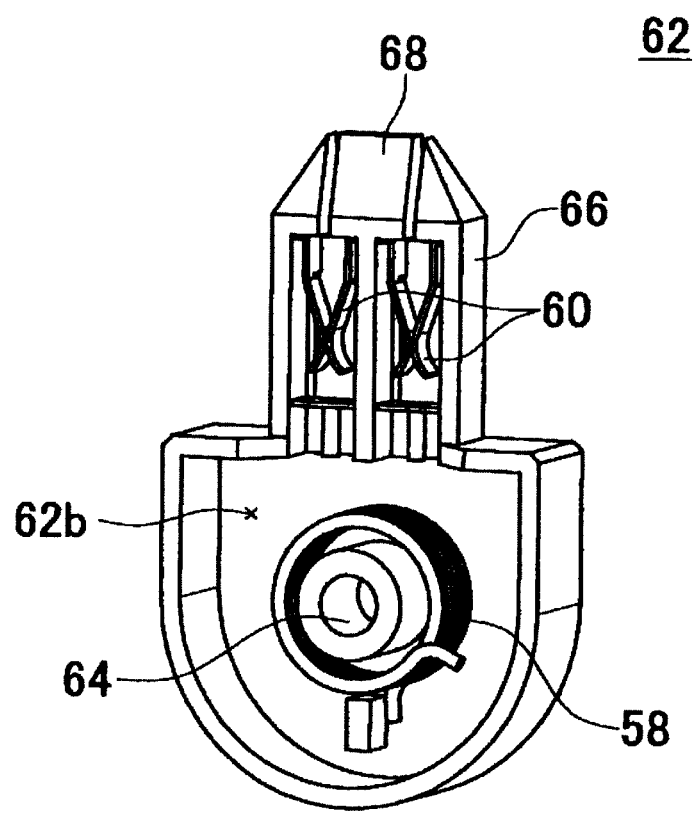
FIG. 3 shows a rear surface of a holding member.

As shown in FIG. 3, charging output terminals 60 are provided on the holding member 62, which is rotatably attached to the charger main body 22. The charging output terminals 60 are configured or adapted to output the charging current (power) to the power tool 12. When the user attaches the power tool 12 to the charger main body 22, the charging output terminals 60 electrically connect to the power tool 12. The charging output terminals 60 of the present embodiment include a pair of contact type terminals made of metal and are disposed in the projecting part 66 at a rear surface 62b of the holding member 62. The rear surface 62b of the holding member 62 opposes a front surface of the charger main body 22 across a gap and the charging output terminals 60 are disposed in that gap. According to this configuration, the charging output terminals 60 are not exposed to the outside environment, and thereby are protected.

Referring back to FIG. 2, guides 48 are provided on the front surface of the housing cover 46. When the user attaches the power tool 12 to the charger main body 22, the guides 48 guide the power tool 12 toward the holding member 62. The guides 48 of the present embodiment include a pair of walls that generally extends in the vertical directions. Further, the spacing between the guides 48 is wider at its upper part than at its lower part. However, the configuration of the guides 48 is not limited thereto and any shape capable of assisting the user to bring the power tool 12 into contact with the protruding part 66 is encompassed by the present teachings.

In addition, lock walls 52 are provided on the front surface of the housing cover 48. The lock walls 52 extend arcuately around the hole 50, which supports the shaft 56. More preferably, the lock walls 52 extend along the rotational direction of the holding member 62. The lock walls 52 are formed on both the left and right sides of the hole 50 (i.e., of the rotary shaft 56 of the holding member 62), and are not formed in the area above the hole 50. That is, the lock walls 52 are not formed in the direction in which the power tool 12 will normally be attached to the protruding part 66. As discussed below, the lock walls 52 constitute part of the lock mechanism, which is designed to prevent the power tool 12 from coming off of the holding member 62. Furthermore, while the lock walls 52 are preferably formed around at least a portion of the circumference of the rotary shaft 56 of the holding member 62, they need not necessarily be formed arcuately.

Figure 6:
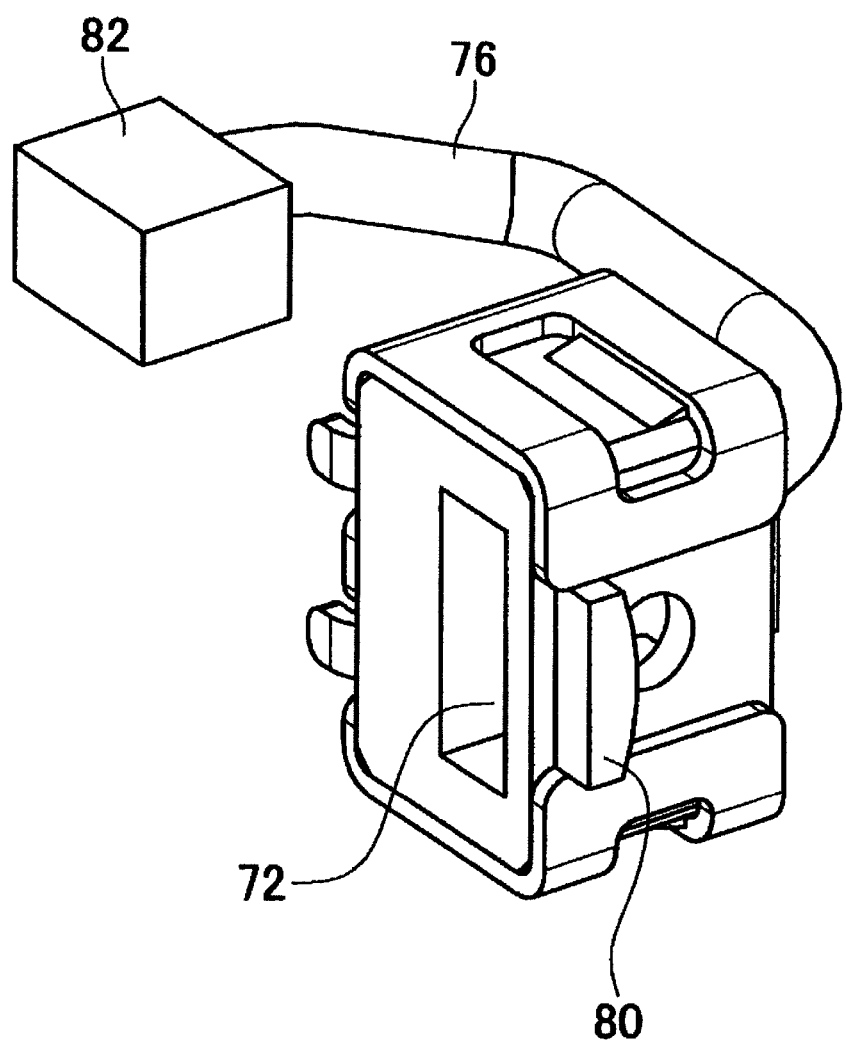
FIG. 6 shows the charging adapter of the first embodiment in the state wherein the power tool is detached.

The configuration of the pertinent portions of the representative power tool 12 will now be explained with reference to FIGS. 4A-4C, 5A, 5B and 6. The power tool 12 comprises a charging adapter 70 that is detachably attachable to the power tool 12. As shown in FIG. 6, the charging adapter 70 comprises a connector 82 connected to an electrical cord 76. The connector 82 is physically and electrically connectable to the tool main body 14, such that the charging adapter 70 is electrically connectable to the power tool 12 (i.e., the first battery pack 16) through the electrical cord 76.

Figure 4C:
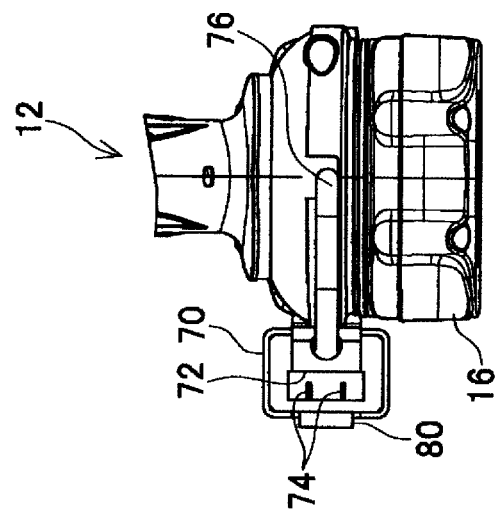
FIGS. 4A, 4B, 4C are a front view, a side view, and a rear view, respectively, of a power tool (one portion thereof) wherein a charging adapter of the first embodiment is attached.
Figure 4B:
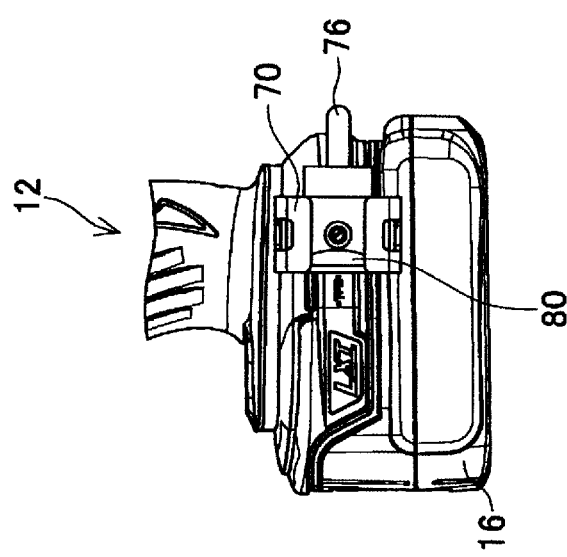
Figure 4A:
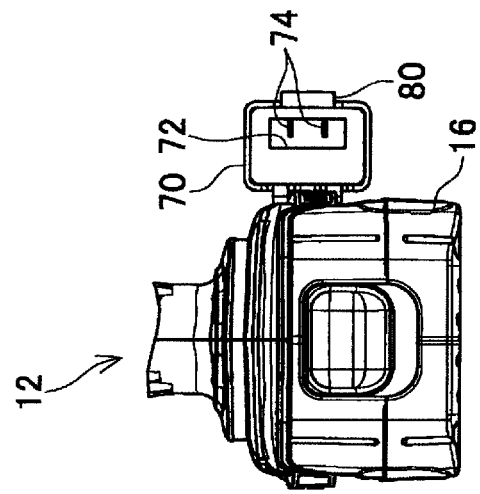
Figure 5A:
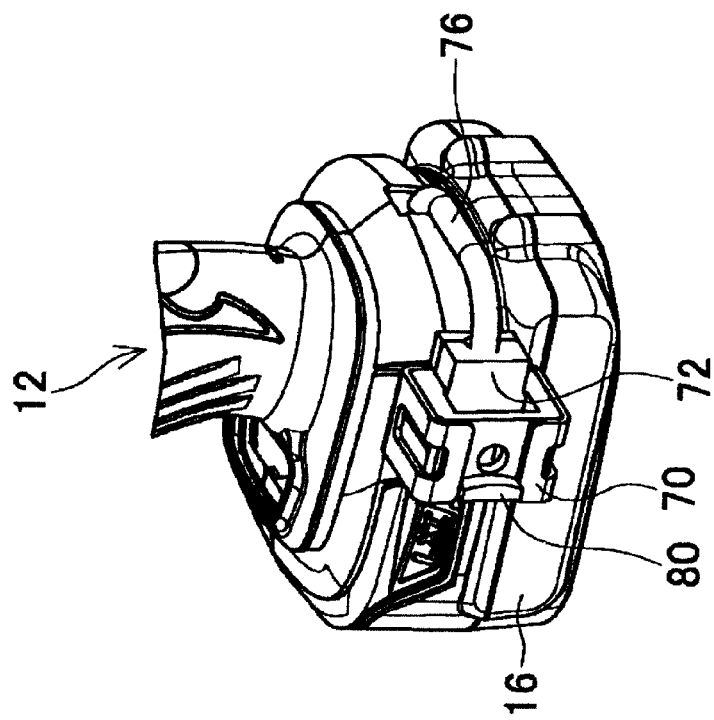
FIGS. 5A and 5B are oblique views of the power tool (one portion thereof) wherein the charging adapter of the first embodiment is attached.
Figure 5B:
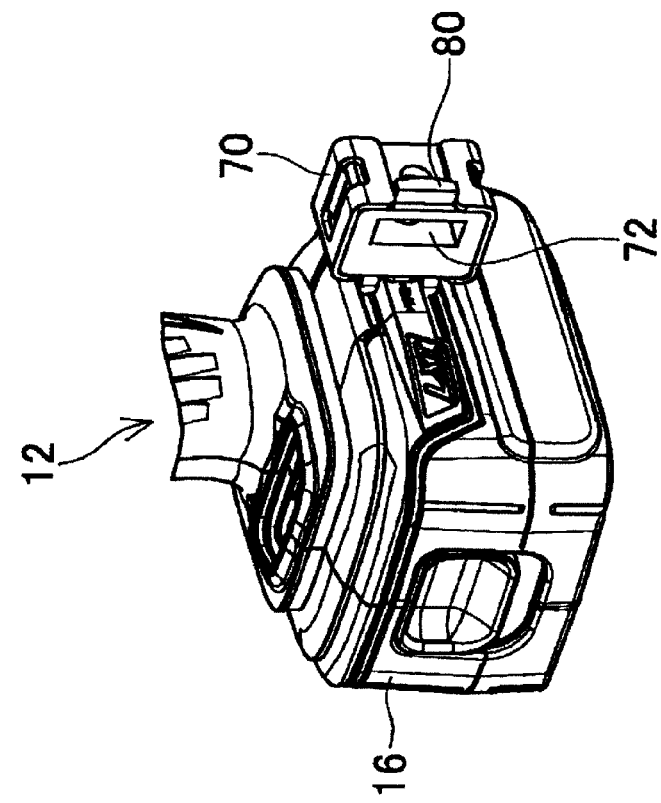

The charging adapter 70 can be fixed to either the left or the right side of the power tool 12 in accordance with the user's handedness. A receiving hole 72 is formed in the charging adapter 70. The receiving hole 72 is configured to receive the protruding part 66 of the charger main body 22 with a small clearance therebetween. Charging input terminals 74 are provided inside the receiving hole 72, as shown in FIGS. 4A and 4C. The charging input terminals 74 are configured to receive the charging current (power) from the charger 20. When the user attaches the power tool 12 to the charger main body 22, the charging input terminals 74 electrically connect to the charging output terminals 60 of the charger main body 22. The charging input terminals 74 of the present embodiment include a pair of contact type terminals that are made of metal. The charging input terminals 74 are located inside the receiving hole 72, and therefore are not exposed to the outside, and thereby are protected. Furthermore, the charging output terminals 60 and the charging input terminals 74 may instead be noncontact type (e.g., wireless type) terminals, for example, electromagnetic induction coils that enable power to be transmitted from the charging main body 22 to the power tool 12 via an alternating electromagnetic field.

A lock projection 80 is formed in the outer surface of the charging adapter 70. A lock mechanism may be formed by the lock projection 80 and the above-described lock walls 52. When the lock projection 80 contacts the lock walls 52, it prevents the power tool 12 from coming off of the holding member 62. The representative lock mechanism will be explained in further detail below.

Figure 7A:
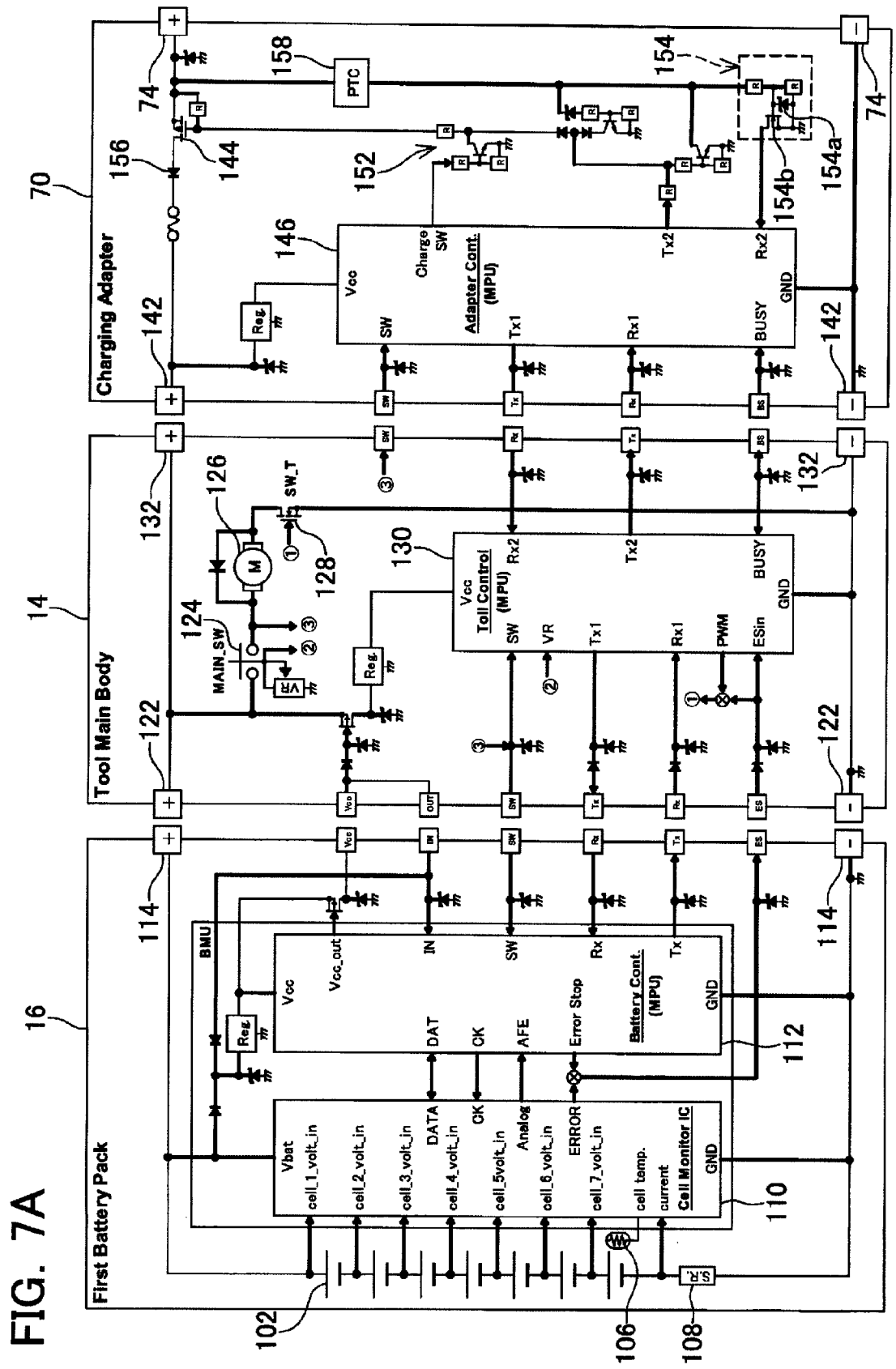
FIG. 7A is a circuit block diagram of the power tool of the first embodiment, the power tool comprising a second battery pack and the charging adapter.

A representative circuit configuration of the power tool system 10 will now be explained. First, a representative circuit configuration of the power tool 12 will be explained with reference to FIG. 7A. The first battery pack 16 of the power tool 12 comprises a plurality of secondary battery cells 102. The secondary battery cells 102 are connected in series to a pair of power output terminals 114. Although it is only one non-limiting example of the present teachings, each of the secondary battery cells 102 is preferably a lithium-ion cell. The first battery pack 16 comprises a cell monitor circuit 110, which monitors the voltage, the temperature, and the electric (discharge) current of the plurality of secondary battery cells 102. A temperature sensor 106, which measures the temperature of the secondary battery cells 102, and a shunt resistor 108, which measures the electric (discharge) current of the secondary battery cells 102, are connected to the cell monitor circuit 110. In addition, each electrode of each of the secondary battery cells 102 is likewise connected to the cell monitor circuit 110. The first battery pack 16 further comprises a battery controller 112. The battery controller 112 is connected to the cell monitor circuit 110 and controls the charging and discharging of the secondary battery cells 102 in accordance with the detected voltage, temperature, and electric current of the secondary battery cells 102. However, the battery controller 112 does not directly control the charging and discharging of the secondary battery cells 102. Instead, the battery controller 112 outputs a control signal to the tool main body 14 as needed, and, in accordance with this control signal, the tool main body 14 directly controls the discharging of the secondary battery cells 102. In this system, there is no need to provide a semiconductor switch inside the first battery pack 16 for electrically disconnecting the secondary battery cells 102.

The tool main body 14 comprises a motor 126 connected to a pair of power input terminals 122. The pair of power input terminals 122 is electrically connectable to the pair of power output terminals 114 of the first battery pack 16, and receives the current (power) discharged from the first battery pack 16. The motor 126 drives the tool, which is attached to the tool shaft or chuck 18, using the electric power from the first battery pack 16. A main switch 124 and a semiconductor switch 128 (e.g., a FET) are provided between the power input terminals 122 and the motor 126. The main switch 124 is connected to the trigger 19 and outputs a signal in response to the user's operation of the trigger 19. The tool main body 14 comprises a tool controller 130. The tool controller 130 uses pulse width modulation ("PWM") to control the semiconductor switch 128 in accordance with the output signal from the main switch 124. In addition, the semiconductor switch 128 can be forcibly turned off in response to a stop signal from the battery controller 112, e.g., in case a battery temperature, voltage or current discharge limit is/are reached. The tool main body 14 further comprises a pair of adapter connection terminals 132, which are respectively connectable, i.e. one-to-one, to the pair of power input terminals 122. The pair of adapter connection terminals 132 is electrically connected to the charging adapter 70 and receives the charging current (power) from the charger 20. This charging current (power) is supplied to the first battery pack 16 through the tool main body 14.

The charging adapter 70 comprises a pair of tool connection terminals 142 that are provided on the connector 82 of the charging adapter 70 shown in FIG. 6. The pair of tool connection terminals 142 is connected, one-to-one, to the pair of charging input terminals 74 of the charging adapter 70. In addition, the pair of tool connection terminals 142 is electrically connected to the pair of adapter connection terminals 132 of the tool main body 14. Thus, the charging current (power) from the charger 20 is supplied to the tool main body 14 through the charging adapter 70. The charging adapter 70 further comprises an adapter controller 146 that is communicatively connected to, i.e. is in electrical communication with, the tool controller 130. The adapter controller 146 is connected to a gate of a semiconductor switch 144 (e.g., a FET) via a drive circuit 152. The adapter controller 146 is configured or adapted to turn the semiconductor switch 144 on and off, to thereby start and stop the charging as needed.

The charging adapter 70 comprises a charger detection circuit 154 that is connected to the adapter controller 146. The charger detection circuit 154 comprises a zener diode 154a and a transistor 154b. The zener diode 154a is connected between the charging input terminals 74 via a positive temperature characteristic (PTC) thermistor 158. When the charging adapter 70 is attached to the charger 20, a voltage from the charger 20 is applied across the charging input terminals 74, and a prescribed voltage is also generated by the zener diode 154a. The voltage generated by the zener diode 154a is applied across the source and gate of the transistor 154b, which turns on. The drain of the transistor 154b is connected to the adapter controller 146, and a prescribed signal (i.e., ground or floating) is input to the adapter controller 146 in accordance with the ON/OFF state of the transistor 154b. Thus, the charger detection circuit 154 detects whether the charging adapter 70 is attached to the charger 20 by monitoring the voltage between the charging input terminals 74. The detection result of the charger detection circuit 154 is input to the adapter controller 146 and is transmitted from the adapter controller 146 to the tool controller 130 as well as from the tool controller 130 to the battery controller 112.

A diode 156 is interposed (connected) between the charger detection circuit 154 and the positive electrode side (+) tool connection terminal 142. The diode 156 is oriented so as to permit current to flow from the positive electrode side (+) charging input terminal 74 to the positive electrode side (+) tool connection terminal 142 and to inhibit the flow of a reverse current. Because the voltage from the first battery pack 16 is applied across the tool connection terminals 142, if the diode 156 were absent, then the charger detection circuit 154 would detect the voltage from the battery pack 16 and mistakenly determine that the charger 20 is connected. That is, the diode 156 is provided to prevent such a mistaken determination. Furthermore, when the charging adapter 70 is detached from the charger 20, the diode 156 ensures that the voltage between the charging input terminals 74 promptly returns to zero without being affected by the voltage from the first battery pack 18. Therefore, when the user detaches the power tool 12 from the charger 20, that change in circumstance is immediately detected by the charger detection circuit 154. As a result, the adapter controller 146, the tool controller 130, and the battery controller 112 can rapidly switch from a charging operation to a discharging operation so that the user can promptly start using the power tool 12.

Figure 7B:
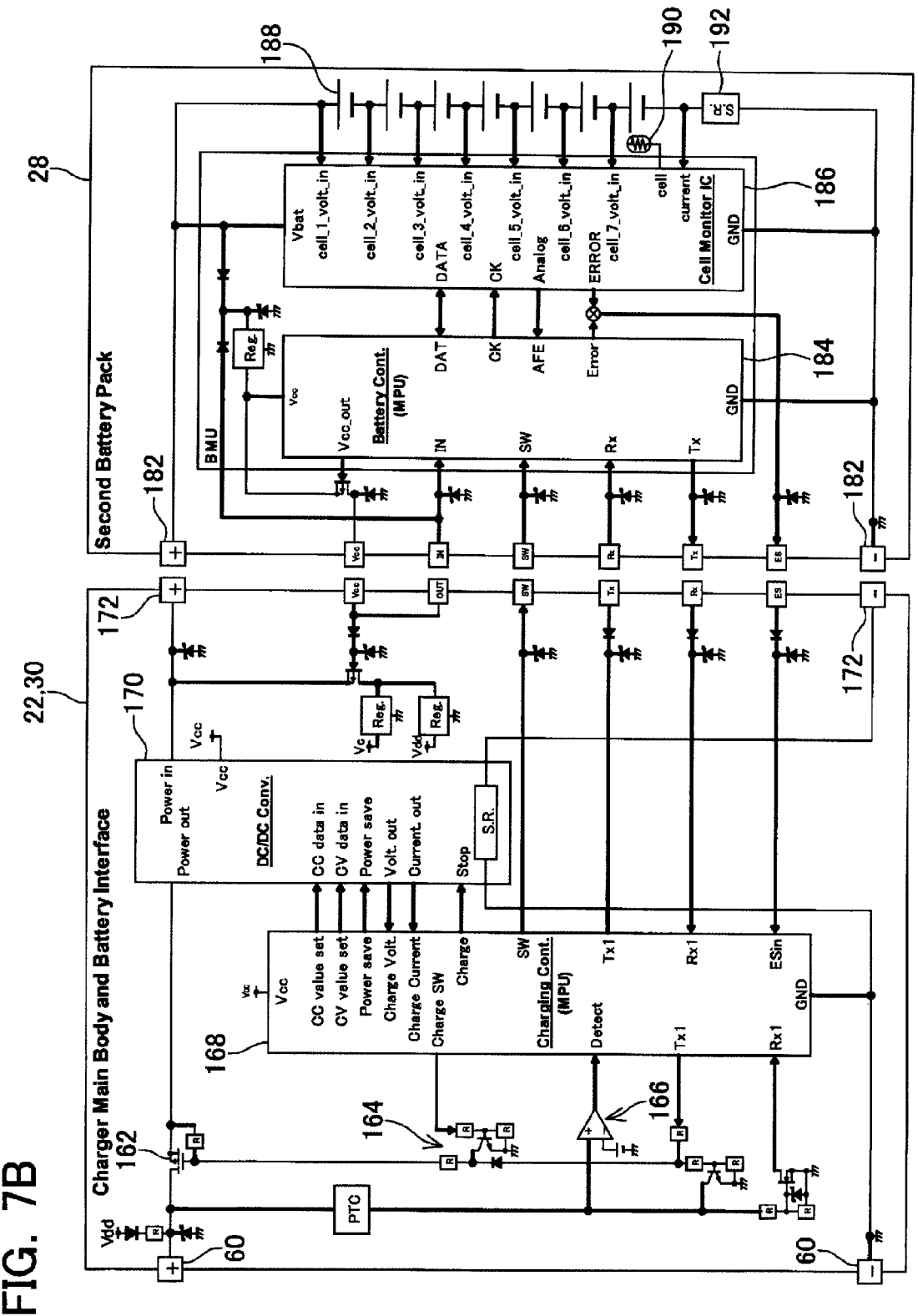
FIG. 7B is a circuit block diagram of a charger of the first embodiment, the charger comprising a first battery pack, a battery interface, and the charger main body.

Next, a representative circuit configuration of the charger 20 will be explained with reference to FIG. 7B. The pair of charging output terminals 60 is provided on the charger main body 22 and a pair of power input terminals 172 is provided on the battery interface 30. The pair of power input terminals 172 is electrically connected to the second battery pack 28 and receives the current (power) discharged from the second battery pack 28. The pair of power input terminals 172 is connected to the pair of charging output terminals 60 via a semiconductor switch 162 (e.g., a FET) and a DC/DC converter 170. The voltage of the current (power) discharged from the second battery pack 28 is lowered or raised by the DC/DC converter 170 as needed, and is then output from the pair of charging output terminals 60 to the charging adapter 70. Because the charger main body 22 comprises the DC/DC converter 170, the rated voltage of the second battery pack 28 may differ from the rated voltage of the first battery pack 16. The charger main body 22 further comprises a charging controller 168. The charging controller 168 can communicatively connect to, i.e. can be in electrical communication with, the adapter controller 146 of the charging adapter 70. Furthermore, the charging controller 168 and the adapter controller 146 can communicate data through the charging output terminals 60 and the charging input terminals 74 without a connection line for data communication. The charging controller 168 is connected to the gate of the semiconductor switch 162 via a drive circuit 164. The charging controller 168 can turn the semiconductor switch 162 on and off to thereby start and stop the charging as needed. A tool detection circuit 166 is connected to the charging controller 168. The tool detection circuit 166 detects whether the charger main body 22 is attached to the power tool 12 by monitoring the voltage between the charging output terminals 60.

The second battery pack 28 of the charger 20 comprises a plurality of secondary battery cells 188 and a pair of power output terminals 182. The plurality of secondary battery cells 188 is preferably connected in series to the pair of power output terminals 182, although various arrangements, e.g., series and/or parallel connections, of the battery cells 188 is possible in accordance with the present teachings. The pair of power output terminals 182 is electrically connected to the pair of power input terminals 172 of the battery interface 30 and outputs the current (power) discharged from the secondary battery cells 188 to the battery interface 30. Each of the secondary battery cells 188 is, for example, a lithium-ion cell. The second battery pack 28 comprises a cell monitor circuit 186, which monitors the voltage, the temperature, and the electric current of the plurality of secondary battery cells 188. A temperature sensor 190, which measures the temperature of the secondary battery cells 188, and a shunt resistor 192, which measures the electric current of the secondary battery cells 188, are connected to the cell monitor circuit 186. In addition, each of the electrodes of each of the secondary battery cells 188 is also connected to the cell monitor circuit 186. The second battery pack 28 further comprises a battery controller 184. The battery controller 184 is connected to the cell monitor circuit 186 and controls the discharging of the secondary battery cells 188 in accordance with the detected voltage, temperature, and electric current of the secondary battery cells 188. However, the battery controller 184 does not directly control the discharging of the secondary battery cells 188. Instead, the battery controller 184 outputs a control signal as needed to the charging controller 168, which, in accordance with this control signal, directly controls the discharging of the secondary battery cells 188. In this system, there is no need to provide a semiconductor switch inside the second battery pack 28 in order to electrically disconnect the secondary battery cells 188.

Figure 8A:
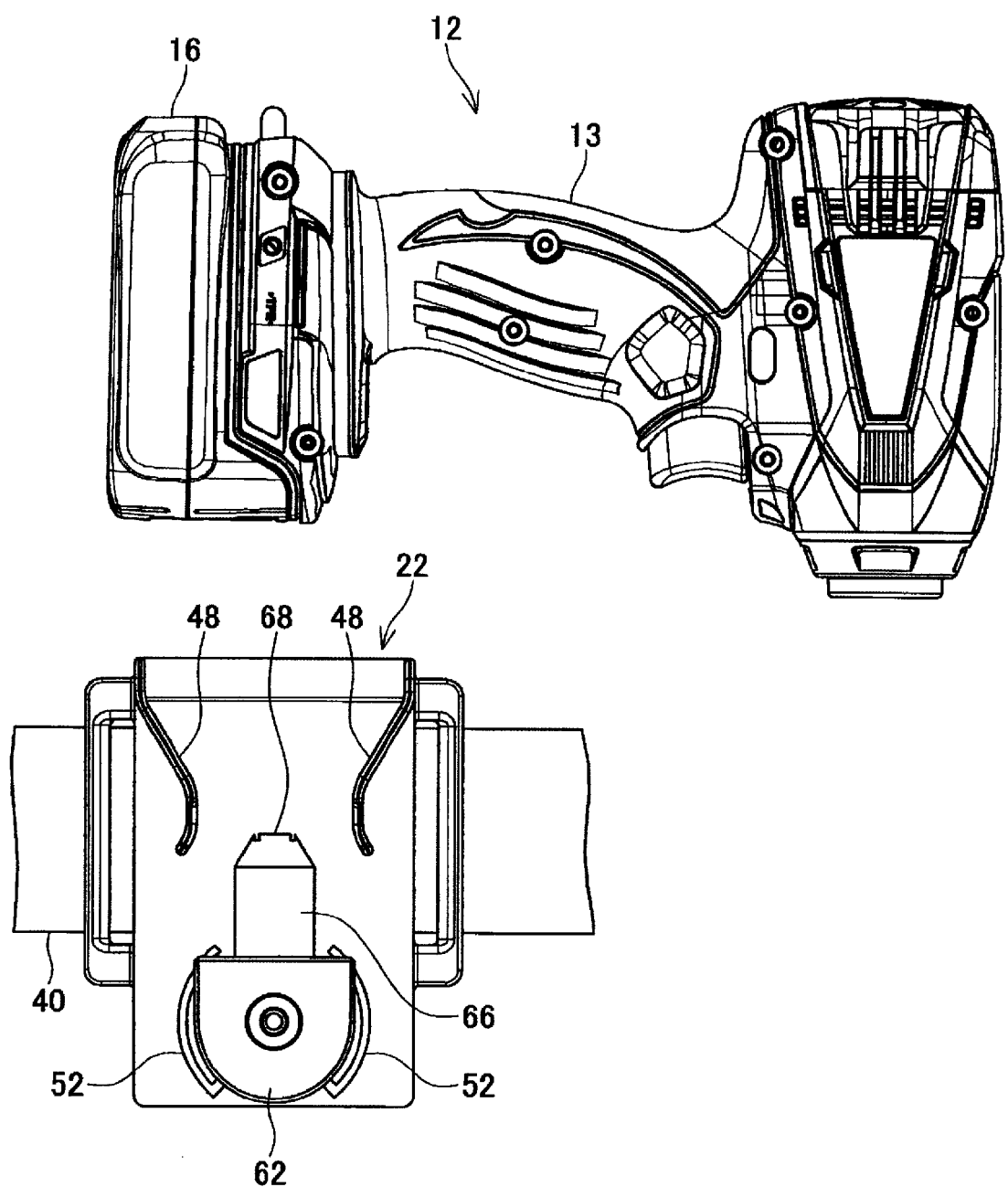
FIG. 8A shows the power tool immediately before it is attached to the charger main body, according to the first embodiment.
Figure 10C:
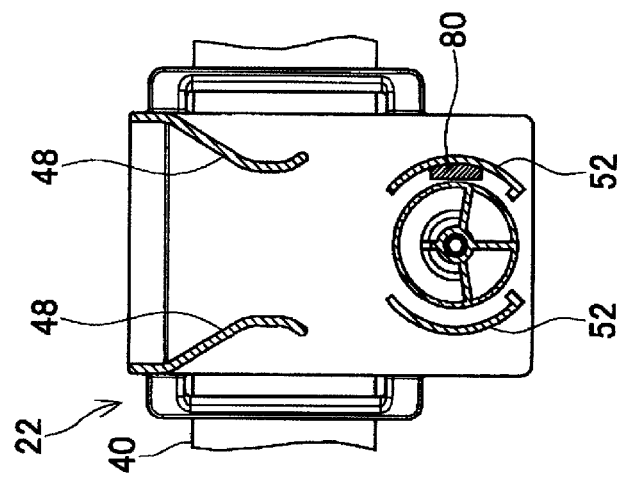
FIGS. 10A-10C show states wherein a lock projection on the power tool side is locked by lock walls on the charger side when the power tool is attached to the charger main body according to the procedure shown in FIG. 8A through FIG. 8C.
Figure 10B:
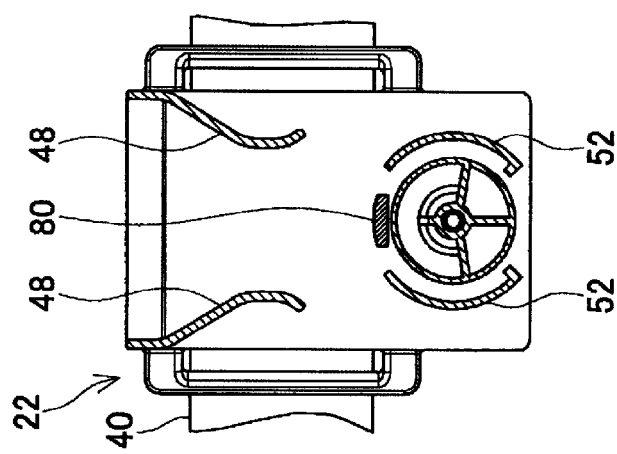
Figure 10A:
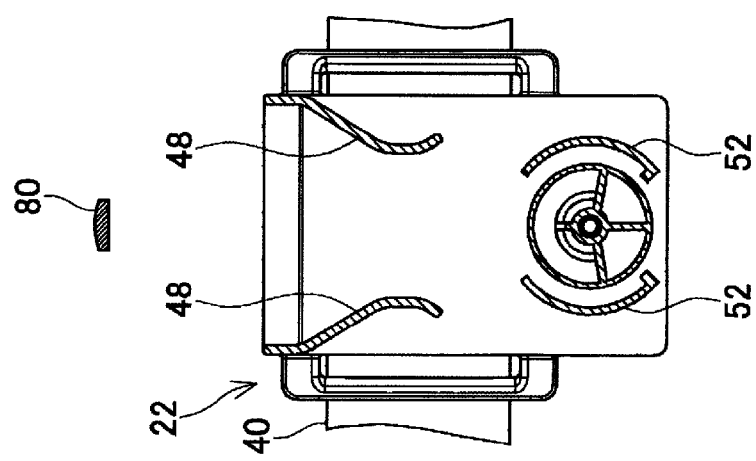

Referring now to FIGS. 8A-8C, 9A-9C and 10A-10C, a representative method for attaching the power tool 12 to the charger main body 22 will be explained. FIG. 8A shows a state immediately before the power tool 12 is attached to the charger main body 22. The charger main body 22 is fixed to the hip belt 40, which is worn by the user, and the power tool 12 is held in the user's right hand. (The user's body and right hand are not shown for clarity purposes.) As also shown in FIG. 8A, when the user lowers his or her right hand, which is holding the power tool 12, in natural or normal position, a grip 13 of the power tool 12 becomes substantially horizontal, and the power tool 12 becomes laterally oriented. In the charger main body 22, the holding member 62 is maintained at its normal position by the torsion spring 58, such that the tip 68 of the protruding part 66 is oriented upward (vertical). At this time, as shown in FIG. 9A, the charging adapter 70 of the power tool 12 is at a position that is spaced apart from the charger main body 22. Furthermore, the charging input terminals 74 of the charging adapter 70 and the charging output terminals 60 of the charger main body 22 are not in contact with one another. In addition, as shown in FIG. 10A, the lock projection 80 of the charging adapter 70 is also positioned spaced apart from the charger main body 22.

Figure 8B:
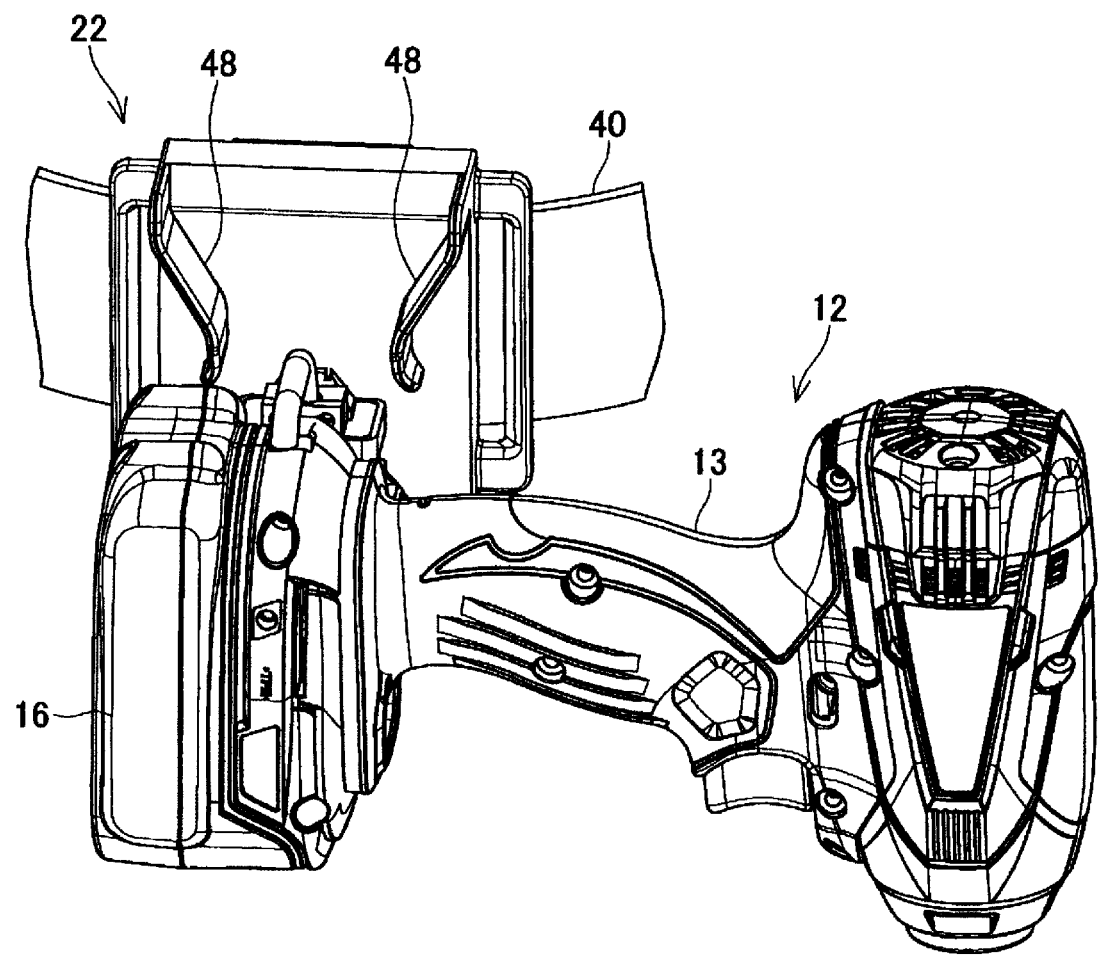
FIG. 8B shows the power tool immediately after it has been attached to the charger main body, according to the first embodiment.

FIG. 8B shows a state immediately after the power tool 12 has been attached to the charger main body 22. The user can attach the power tool 12 to the charger main body 22 by naturally lowering his or her right hand, which holds the power tool 12. At this time, the charging adapter 70 of the power tool 12 is guided by the guides 48. As shown in FIG. 9B, the protruding part 66 of the holding member 62 is thereby inserted into the receiving hole 72 of the charging adapter 70, and the charging input terminals 74 of the charging adapter 70 come into contact with the charging output terminals 60 of the charger main body 22. Thereby, the charging input terminals 74 and the charging output terminals 60 are electrically connected and the charging of the first battery pack 16 is started. The fact that the charging adapter 70 of the power tool 12 can be attached to the holding member 62 in only one specific orientation prohibits the reverse connection of the charging input terminals 74 and the charging output terminals 60. At this time, as shown in FIG. 10B, the lock projection 80 of the charging adapter 70 is positioned on the charger main body 22. However, the lock projection 80 is still not in contact with the lock walls 52 of the charger main body 22.

Figure 8C:
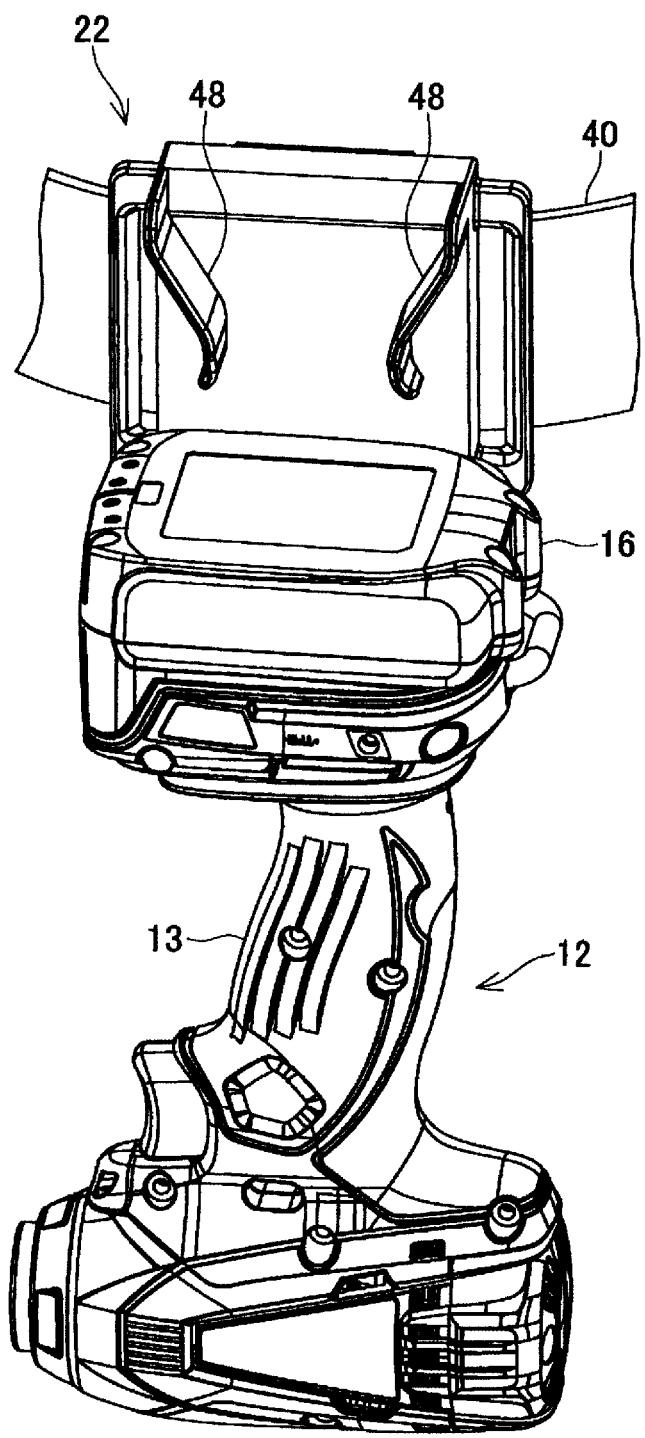
FIG. 8C shows the power tool in the state wherein it has rotated downward by virtue of its intrinsic weight after being attached to the charger main body, according to the first embodiment.

FIG. 8C shows a state wherein the power tool 12, which is attached to the charger main body 22, has rotated downward owing to its intrinsic weight (i.e. due to gravity). That is, if the user releases his or her hand from the power tool 12 after the power tool 12 has been attached to the charger main body 22, the power tool 12, together with the holding member 62, will rotate downward owing to its intrinsic weight (gravity). The center of gravity of the power tool 12 moves to a location vertically below the rotary shaft 56 of the holding member 62, and the attitude of the power tool 12 is stable. As shown in FIG. 9C, because the charging adapter 70 of the power tool 12 and the holding member 62 rotate together, the electrical connection between the charging input terminals 74 and the charging output terminals 60 is maintained even while the power tool 12 rotates. That is, charging is not interrupted even if the power tool 12 swings while it is hanging from the holding member 62. As shown in FIG. 10C, the downward rotation of the power tool 12 positions the lock projection 80 on the inner side of the lock walls 52 of the charger main body 22 and brings the lock projection 80 into contact with the inner sides of the lock walls 52. Consequently, the charging adapter 70 no longer can come off of the protruding part 66 of the holding member 62 and the power tool 12 is prevented from coming off of the charger main body 22. Because the lock walls 52 are formed arcuately, the gaps between the lock projection 80 and the lock walls 52 do not vary (or the lock projection 80 and the lock walls 52 stay in continuous contact), even if the power tool 12 swings. Therefore, the power tool 12 will not rattle when it swings.

The explanation above assumes that the user is right handed; however, because the holding member 62 can rotate in both directions, a left-handed user can also use the system 10 of the present embodiment. In this case, the charger main body 22 is worn on the left side of the user's body, and the charging adapter 70 is fixed to the side surface on the opposite side of the power tool 12.

Second Embodiment

Figure 11:
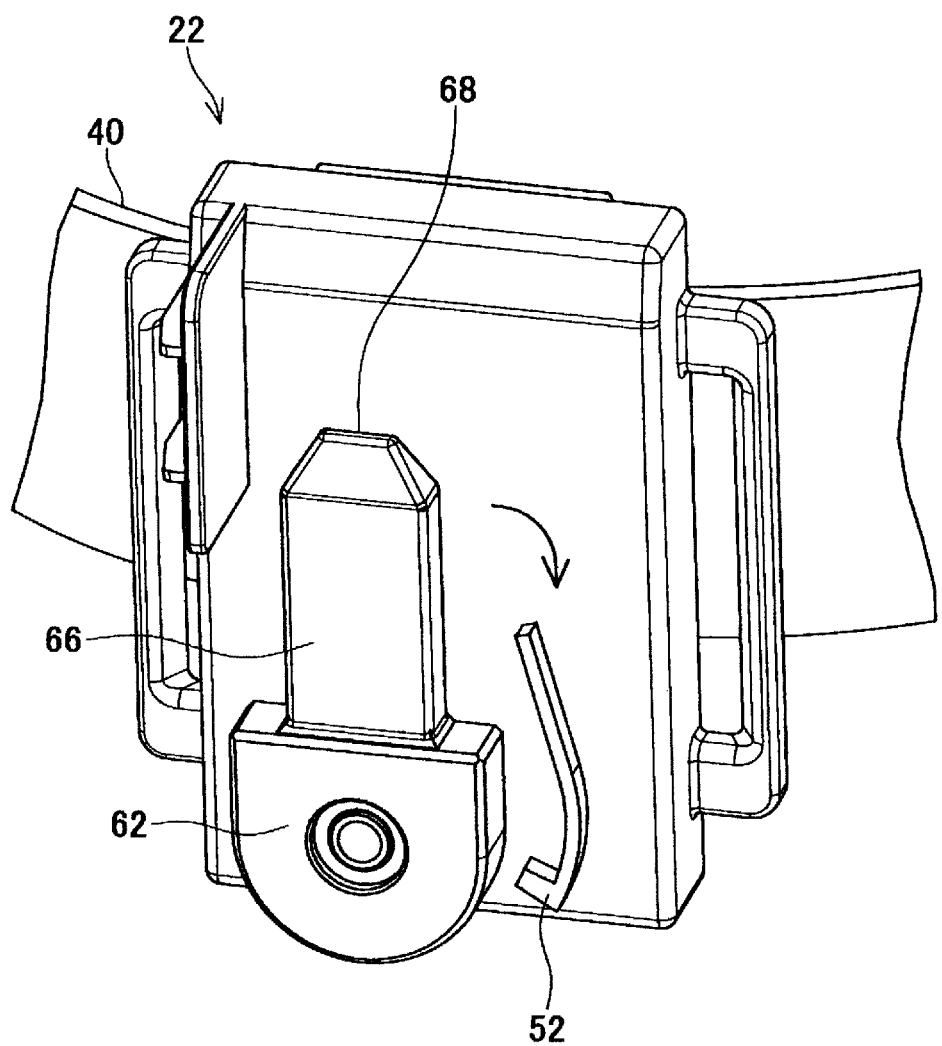
FIG. 11 is an external view of the charger main body of a second embodiment.

A power tool system of a second embodiment will now be explained with reference to FIG. 11. The system of the present embodiment differs from the system 10 of the first embodiment only in the structure of the charger main body 22. As shown in FIG. 11, the charger main body 22 of the present embodiment is specialized for right-handed users, and the holding member 62 can rotate in only one direction. Of course, it is also possible to implement a charger main body that is specialized for left-handed users by reversing, with bilateral symmetry, the structure of the charger main body 22 of the present embodiment.

Third Embodiment

A power tool system 210 of a third embodiment will now be explained with reference to FIGS. 12-20. The system 210 of the present embodiment differs from the system 10 of the first embodiment in that the system 210 comprises a charger main body (base) 222 and a charging adapter 270. The power tool 12 is not modified. In addition, although not shown, a battery power supply is connected to the charger main body 222 via an electrical cord. The circuit structure of the present embodiment is also substantially the same as that of the first embodiment. In particular, it is noted that the battery power supply may utilize the same second battery pack 28 as the first embodiment described above.

Figure 12A:
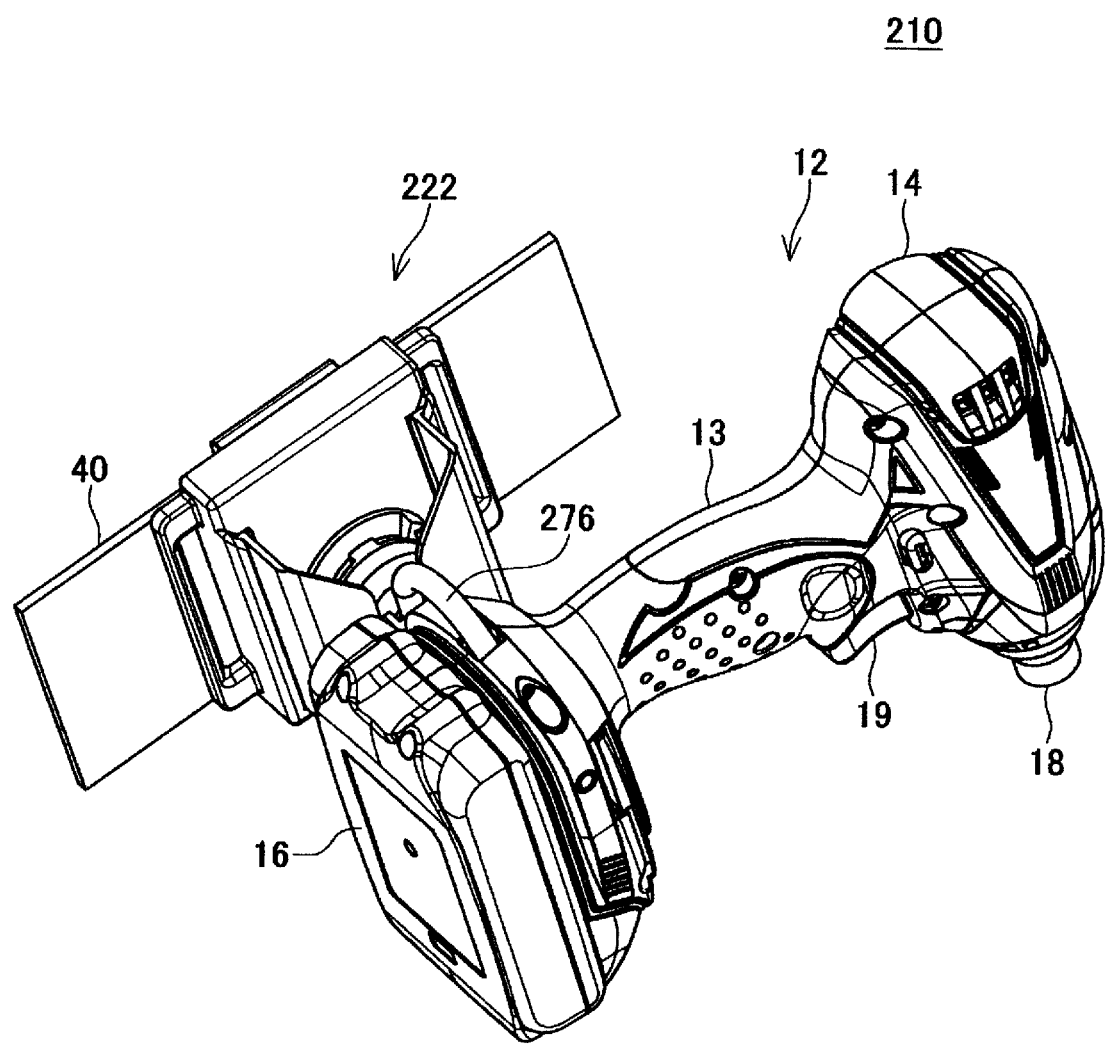
FIG. 12A is an external view of the power tool system (one portion thereof) of a third embodiment, and shows the power tool immediately after it has been attached to the charger main body.
Figure 12B:
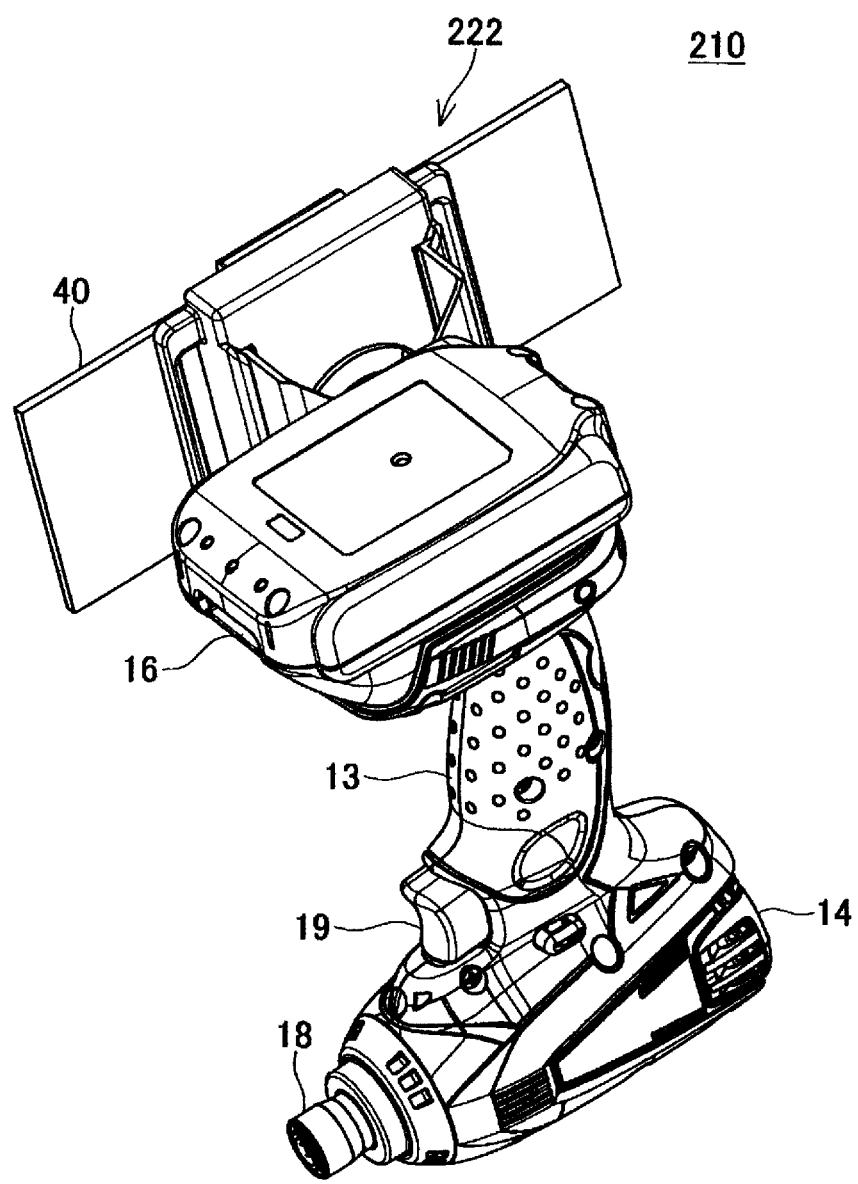
FIG. 12B is an external view of the power tool system (one portion thereof) of the third embodiment and shows a state wherein the power tool has rotated downward by virtue of its intrinsic weight (gravity) after being attached to the charger main body.

As shown in FIGS. 12A and 12B, in the system 210 of the present embodiment, the power tool 12, which has the charging adapter 270 attached thereto (discussed below), also can be attached to and detached from the charger main body 222. After being attached to the charger main body 222, the power tool 12 can rotate downward due to its intrinsic weight (i.e. by gravity). Furthermore, when the power tool 12 is attached to the charger main body 222, the power tool 12 is electrically connected to the charger main body 222, and the charging of the first battery pack 16 starts.

As shown in FIGS. 13A-13D and FIG. 14, the charger main body 222 comprises a housing cover 246 fixed to a housing plate 244. A belt hook 242 is configured or adapted to engage with (hang over) the hip belt 40 and is provided on the housing plate 244. A holding member 262 is provided on the housing cover 246. The holding member 262 is supported by a shaft 256 and can rotate relative to the housing cover 246. A torsion spring (not shown) is provided between the housing cover 246 and the holding member 262 similar to the first embodiment. The torsion spring thus urges the holding member 262 toward its normal position (i.e., the first rotation position).

A receiving groove 266 is provided on the holding member 262 and has a semicircular shape that is capable of receiving a disk shaped protruding part 272 of the power tool 12. Therefore, the holding member 262 is configured to receive the protruding part 272 of the power tool 12, which is further discussed below, and thereby hold the power tool 12. When the holding member 262 is at the normal (rotation) position, the receiving groove 266 is upwardly (vertically) open. Accordingly, the user can easily mate the protruding part 272 of the power tool 12 with the receiving groove 266 of the charger main body 222 by downwardly moving the power tool 12.

Figure 14:
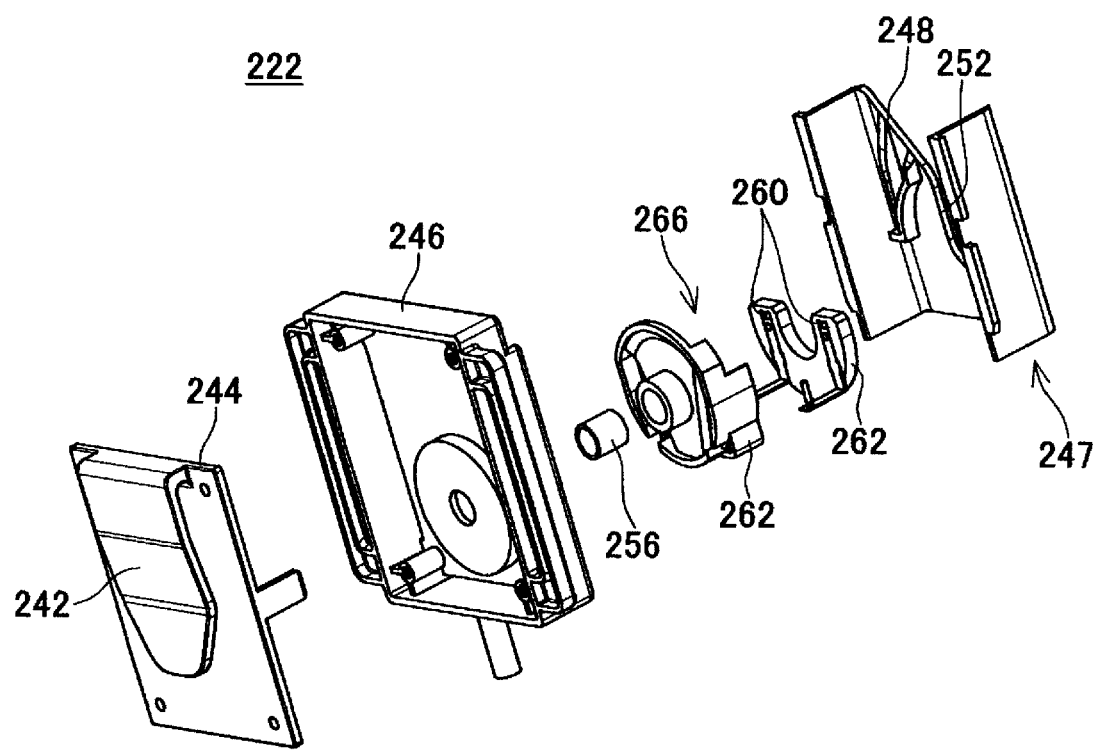
FIG. 14 is an exploded view of the charger main body of the third embodiment.

Charging output terminals 260 are provided on the charger main body 222 as shown in FIG. 13A. The charging output terminals 260 are configured or adapted to output the charging current (power) to the power tool 12. When the user attaches the power tool 12 to the charger main body 222, the charging output terminals 260 electrically connect to the power tool 12. The charging output terminals 260 of the present embodiment include a pair of contact type terminals made of metal. As shown in FIG. 14, the charging output terminals 260 are disposed inside the receiving groove 266 of the holding member 262. According to this configuration, the charging output terminals 260 are not exposed to the outside, and thereby are protected.

The charger main body 222 further comprises a guide cover 247. The guide cover 247 is fixed to the housing cover 246 and partially covers the holding member 262. An upper part of the guide cover 247 is notched in a V-shape, the edges of which constitute guides 248. When the user attaches the power tool 12 to the charger main body 222 by downwardly lowering the power tool 12, the guides 248 guide the power tool 12 toward the holding member 262.

Figure 15A:
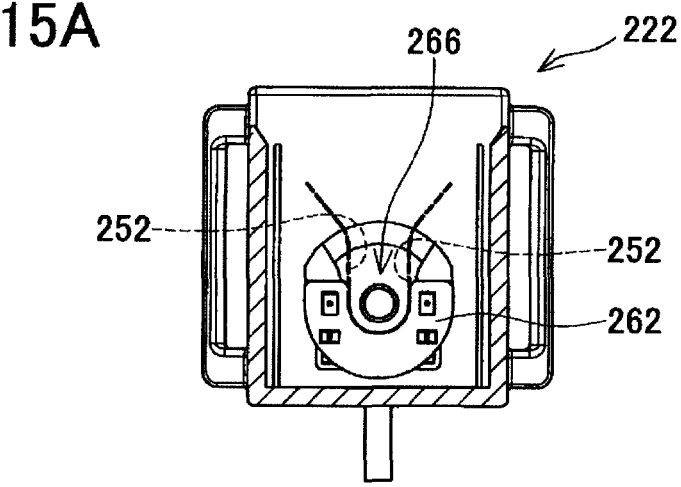
FIGS. 15A-15C show the charger main body of the third embodiment with an outer cover removed to show the internal components.
Figure 15B:
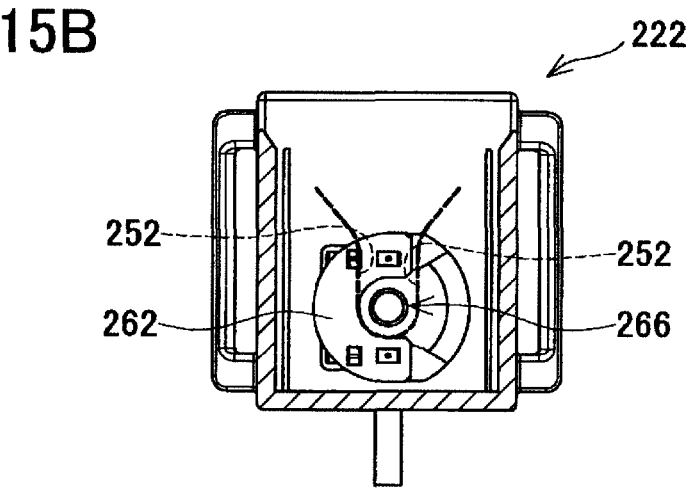
Figure 15C:
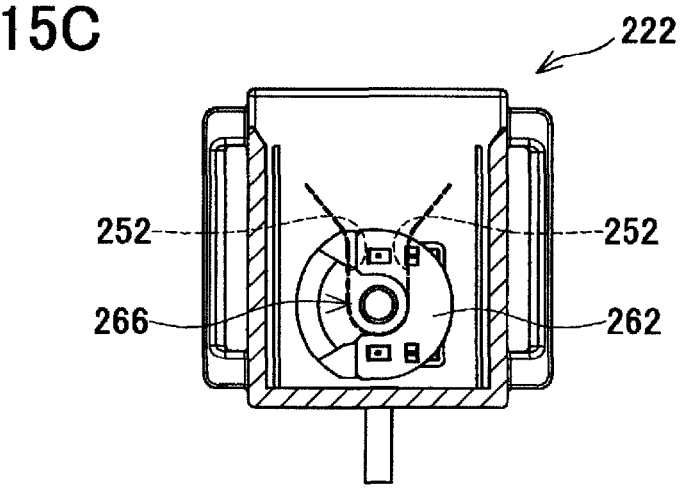
Figure 16A:
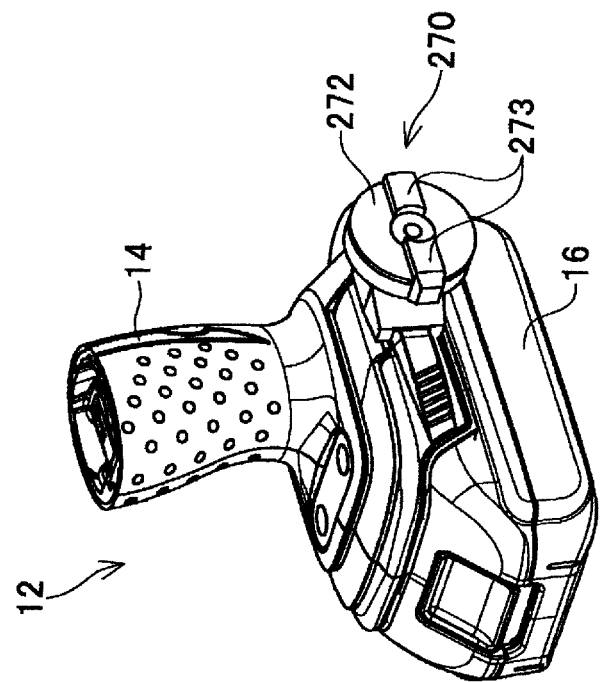
FIGS. 16A, 16B are oblique views of the power tool (one portion thereof) wherein the charging adapter of the third embodiment has been attached.
Figure 16B:
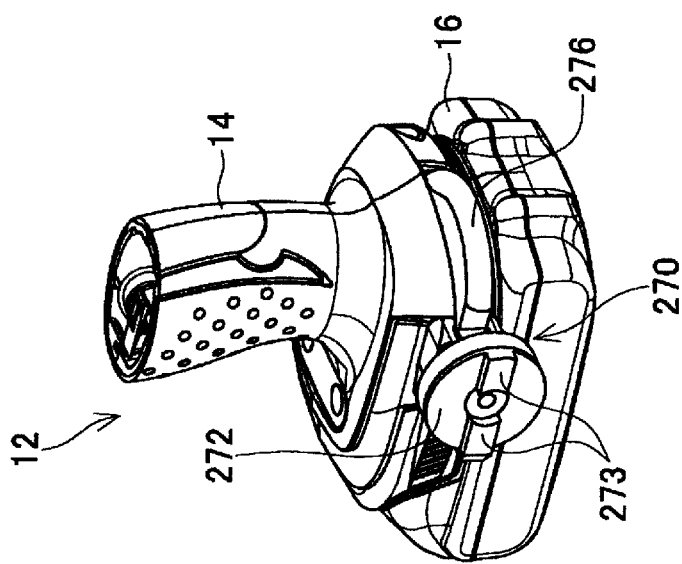

A slot is formed in the guide cover 247 and extends downward continuously from the lower ends of the guides 248. The left and right edges of the slot constitute lock walls 252 according to the present embodiment. The lock walls 252 are located on both the left and right sides of the rotary shaft 256 of the holding member 262. The lock walls 252 constitute part of the lock mechanism of the present embodiment and prevent the power tool 12 from coming off of the holding member 262. As shown in FIG. 15A, when the holding member 262 is disposed in or at its normal position, the receiving groove 266 of the holding member 262 is upwardly (vertically) open. The lock walls 252 are not present above the holding member 262. Therefore, when the holding member 262 is disposed in or at its normal position, the power tool 12 can be attached to and detached from the holding member 262. Moreover, as shown in FIGS. 15B, 15C, when the holding member 262 rotates in the clockwise direction or the counterclockwise direction from the normal position, the receiving groove 266 of the holding member 262 is open to the side. The lock walls 252 are formed on either side of the holding member 262. Accordingly, when the holding member 262 rotates from the normal position, the power tool 12 can no longer come off of the holding member 262.

Figure 17A:
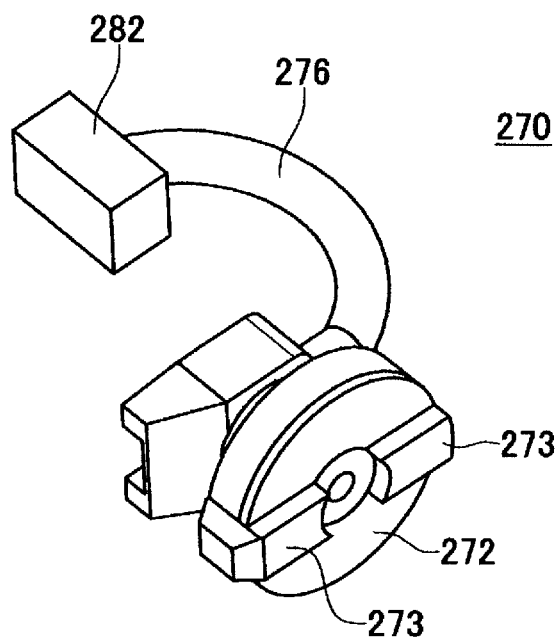
FIG. 17A is an external view of the charging adapter of the third embodiment.
Figure 17B:
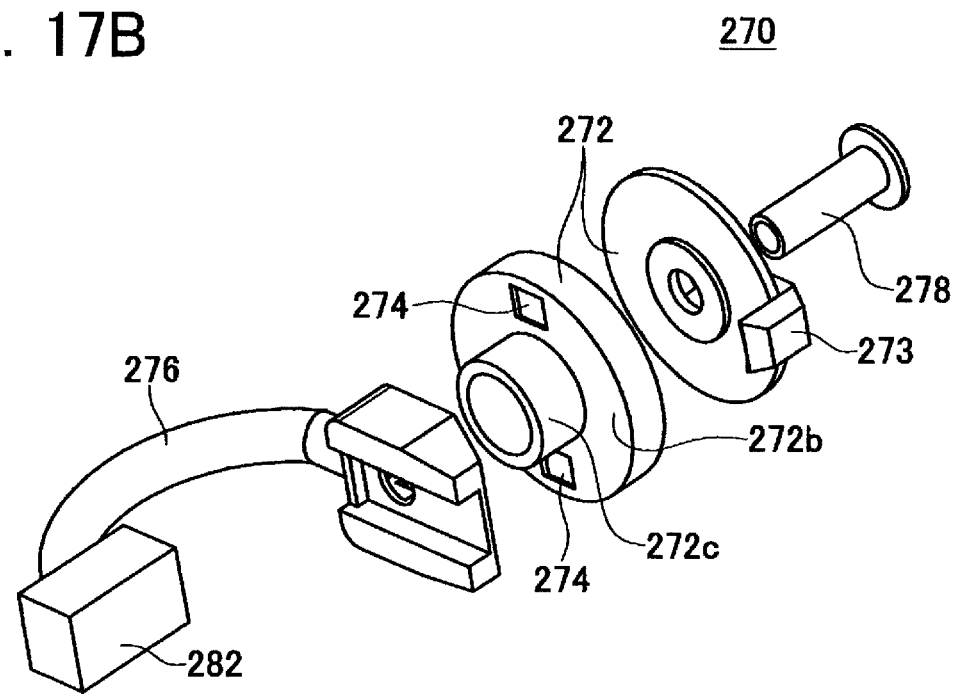
FIG. 17B is an exploded view of the charging adapter of the third embodiment.

Referring now to FIGS. 16A, 16B, 17A and 17B, a representative configuration of the charging adapter 270 of the present embodiment will be explained. The charging adapter 270 can be attached to and detached from the power tool 12. As shown in FIGS. 17A and 17B, the charging adapter 270 comprises a connector 282 connected to an electrical cord 276. The connector 282 is physically and electrically connectable to the tool main body 14, such that the charging adapter 270 is electrically connected to the power tool 12 (i.e., the first battery pack 16) through the electrical cord 276.

The charging adapter 270 is fixable to either the right or left sides of the power tool 12 in accordance with the user's handedness. The protruding part 272 is formed in the charging adapter 270 and has a disk shape, as was noted above. Ribs 273 extend in the radial direction and are disposed on the front surface of the protruding part 272. The protruding part 272 is supported by a shaft 278. When the power tool 12 is attached to the charger main body 222, the protruding part 272 mates with the receiving groove 266 of the holding member 262. At this time, the ribs 273 of the protruding part 272 engage with the holding member 262, thereby fixing the protruding part 272 at a prescribed rotational angle to the holding member 262.

Charging input terminals 274 are provided on a rear surface 272b of the protruding part 272. When the user attaches the power tool 12 to the charger main body 22, the charging input terminals 274 electrically connect to the charging output terminals 260 of the charger main body 222. The charging input terminals 274 of the present embodiment include a pair of contact type terminals made of metal that are located on the rear surface 272b of the protruding part 272. In this case, the charging input terminals 274 are not exposed to the outside, and are thereby protected. However, the charging output terminals 260 and the charging input terminals 274 may instead be noncontact type (i.e., wireless type) terminals, for example, they may be electromagnetic induction coils similar to the alternate embodiment of the first embodiment.

As shown in FIGS. 18A and 18B, immediately before the power tool 12 is attached to the charger main body 222, the holding member 262 of the charger main body 222 is maintained at the normal position by the torsion spring. At this time, the receiving groove 266 of the holding member 262 is facing upward. The charging adapter 270 of the power tool 12 is at a position that is spaced apart from the charger main body 222, and the charging input terminals 274 of the charging adapter 270 and the charging output terminals 260 of the charger main body 222 are not in contact with one another. When the user attaches the power tool 12 to the charger main body 222 and downwardly moves the power tool 12, the guides 248 guide the charging adapter 270 (i.e., the power tool 12) to the holding member 262.

Figure 19B:
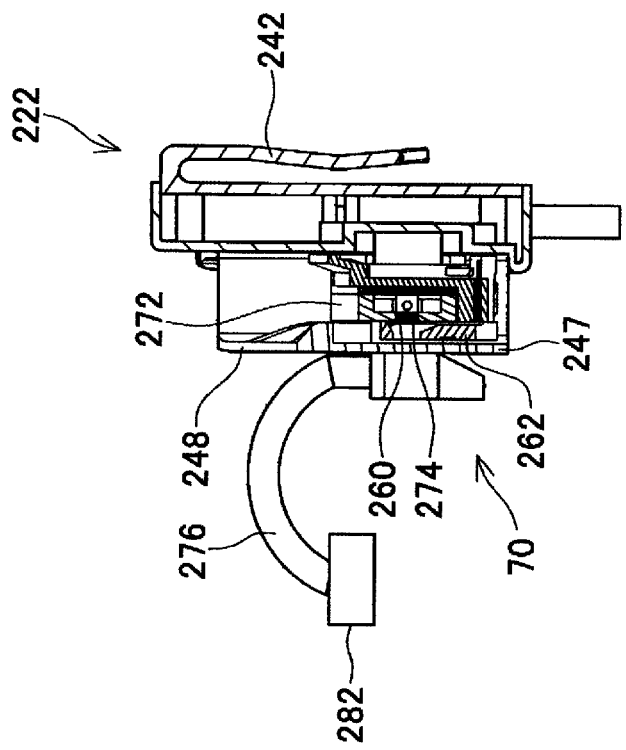
FIGS. 19A and 19B show the charging adapter (without the power tool) immediately after it has been attached to the charger main body, according to the third embodiment.
Figure 19A:
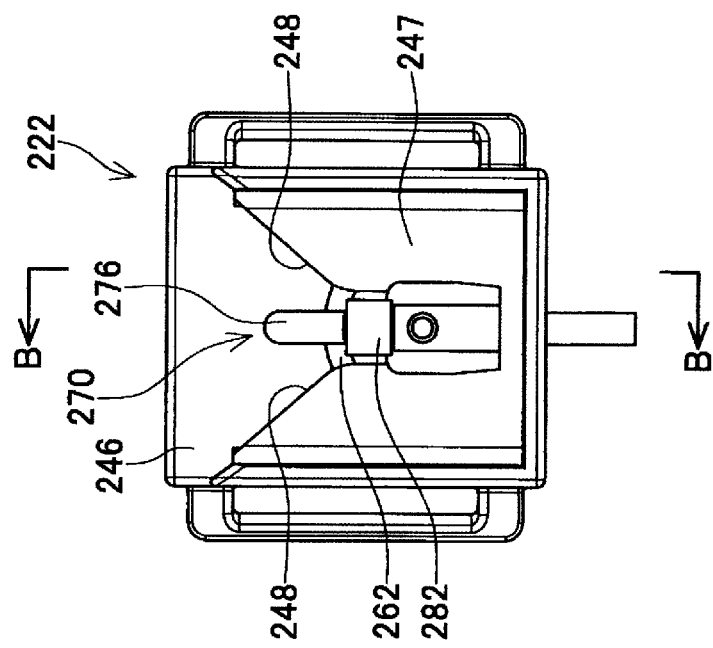

As shown in FIGS. 19A and 19B, when the power tool 12 is attached to the charger main body 222, the protruding part 272 of the charging adapter 270 mates with the receiving groove 266 of the holding member 262. Therefore, the charging input terminals 274 of the charging adapter 270 contact the charging output terminals 260 of the charger main body 22. The charging input terminals 274 and the charging output terminals 260 are electrically connected, and the charging of the first battery pack 16 is started. Because the protruding part 272 is discoidal, the protruding part 272 can mate with the receiving groove 266 of the holding member 262 even without the user paying much attention to the position, the orientation, and the like of the power tool 12.

Figure 20A:
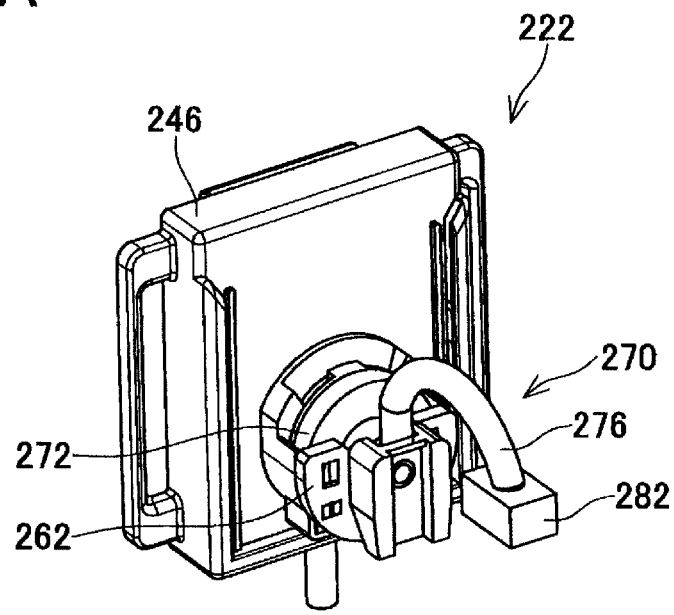
FIG. 20A and FIG. 20B show states wherein the charging adapter, which is attached to the charger main body, is rotated by virtue of the weight of the power tool.
Figure 20B:
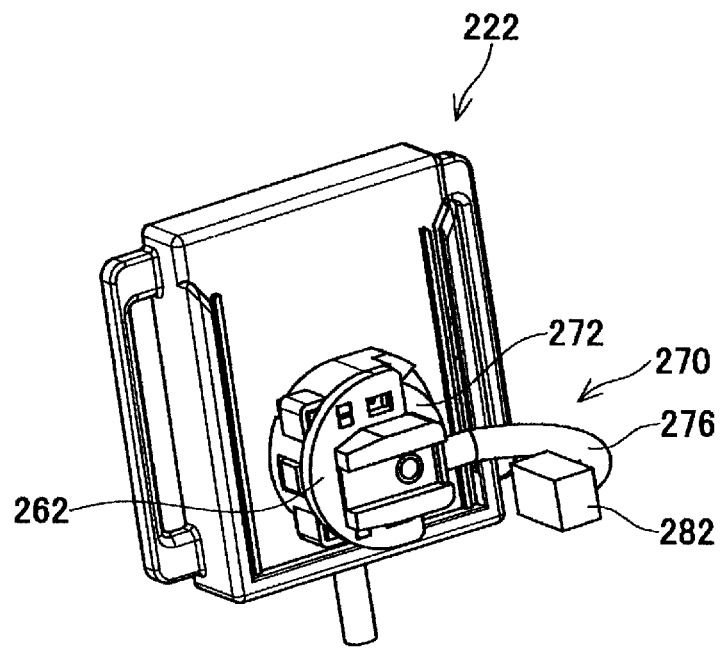

As shown in FIGS. 20A, 20B, the charging adapter 270 is held by the holding member 262 and rotates (refer to FIG. 12B) together with the power tool 12 owing to the intrinsic weight of the power tool 12 (i.e. due to gravity). The holding member 262 faces sideways, and a shaft portion 272c of the protruding part 272 of the charging adapter 270 opposes the lock walls 252. The protruding part 272 of the charging adapter 270 is thereby prohibited from coming off of the receiving groove 266 of the holding member 62, and the power tool 12 is prevented from coming off of the charger main body 222.

Fourth Embodiment

The power tool system according to a fourth embodiment will now be explained with reference to FIGS. 21-29. The system of the present embodiment differs from the system 10 of the first embodiment primarily in the configuration of a charger main body 322 (refer to FIGS. 21, 22A-22C, 23A-23C, 24A and 24B) and the configuration of a charging adapter 370 (refer to FIGS. 25A-25E). Other aspects of the configuration are substantially unchanged. Although not shown, the battery power supply is connected to the charger main body 322 via the electrical cord, as in the first embodiment shown in FIG. 1. In addition, the circuit structure of the present embodiment may be substantially identical to that of the first embodiment shown in FIGS. 7A and 7B.

Figure 21:
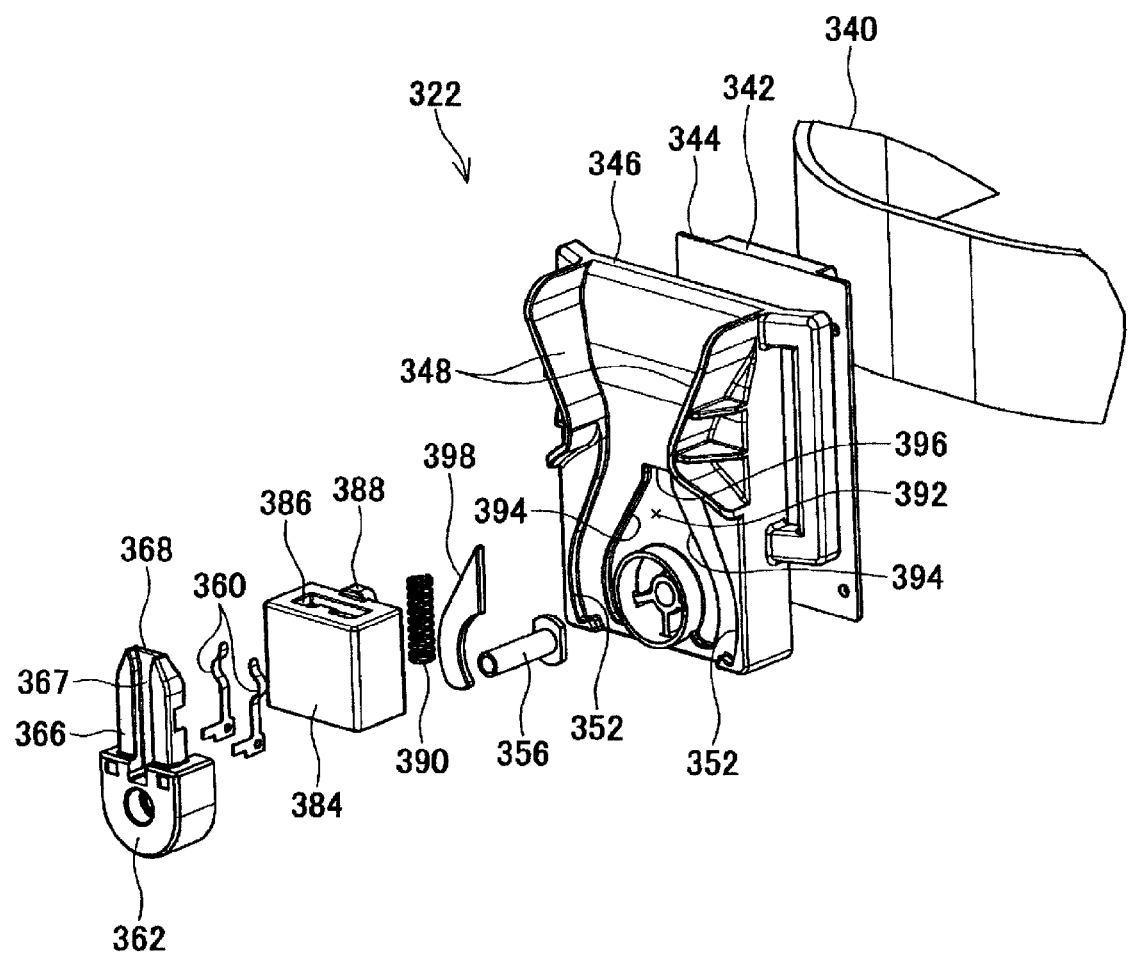
FIG. 21 is an exploded view of the charger main body according to a fourth embodiment.

As shown in FIG. 21, similar to the first embodiment, the charger main body (base) 322 comprises a belt hook 342 configured or adapted to be detachably attached to (or engaged with) a belt 340 worn around the hip of the user, a housing plate 344 and a housing cover 346. A pair of guides 348 and a pair of lock walls 352 are provided on the housing cover 346. The pair of guides 348 and the pair of lock walls 352 are each formed in mirror symmetry along a vertical line between them (refer to FIG. 23A).

As shown in FIG. 21, similar to the first embodiment, a holding member (cradle) 362 is provided on the charger main body 322. The holding member 362 is supported by a shaft 356 and is rotatable relative to the housing cover 346. That is, the shaft 356 is the rotary shaft (i.e., the center of rotation) of the holding member 362. The holding member 362 also has a protruding part 366 that extends in the radial direction of the rotary shaft 356 of the holding member 362. A tip 368 of the protruding part 366 tapers. The protruding part 366 is configured or adapted to be inserted into the charging adapter 370, which is fixed to the power tool 12, to thereby attach the power tool 12 to the charger main body 322. The holding member 362 is urged toward its normal position (i.e., the first rotation position) such that the tip 368 of the protruding part 366 is positioned upward (vertically). The holding member 362 is configured or adapted such that it can rotate from the normal position in either the one direction (i.e., the clockwise direction) or the other direction (i.e., the counterclockwise direction). In the present embodiment, the torsion spring 58 explained in the first embodiment is not provided.

As shown in FIG. 21, similar to the first embodiment, charging output terminals 360 are (pivotably) provided on the charger main body 322. The charging output terminals 360 are configured or adapted to output the charging current (power) to the power tool 12. Although it is only one non-limiting example of the present teachings, the charging output terminals 360 include a pair of contact type terminals made of metal that are disposed on both side surfaces of the protruding part 366 of the holding member 362 (e.g., refer to FIG. 22B). Therefore, the arrangement of the pair of charging output terminals 360 differs from the arrangement in the first embodiment.

Figure 22A:
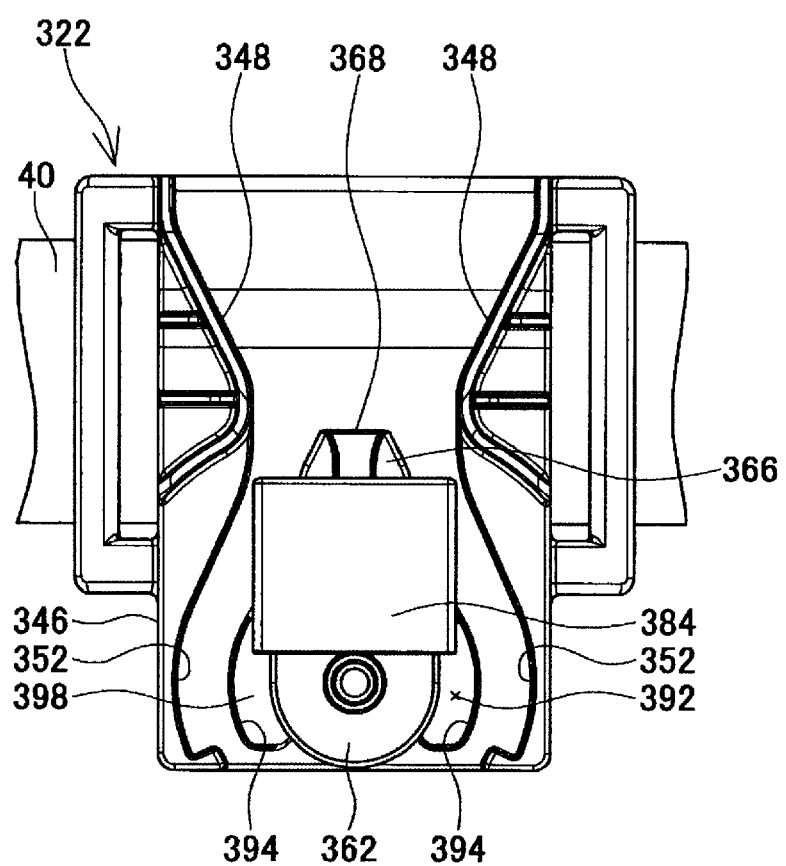
FIGS. 22A, 22B, and 22C show the charger main body of the fourth embodiment.
Figure 22B:
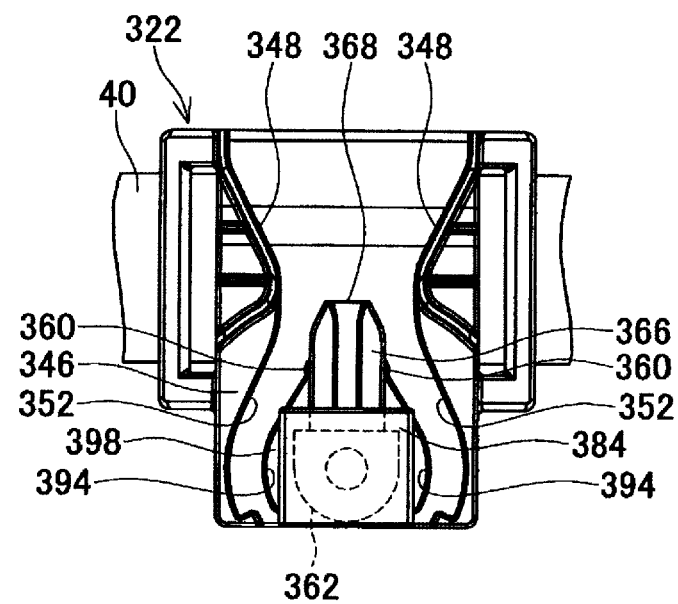
Figure 22C:
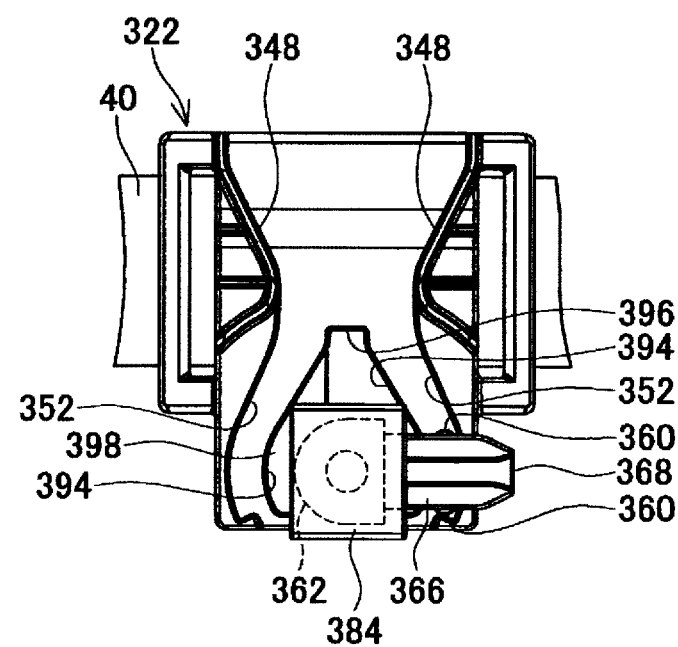

As shown in FIG. 21 and FIGS. 22A-22C, unlike in the first embodiment, a movable member 384 is provided on the charger main body 322. The movable member 384 is slidably supported by the holding member 362, and covers at least a portion of the protruding part 366 of the holding member 362. That is, the movable member 384 is configured or adapted such that it can slide relative to the holding member 362. For this purpose, the protruding part 366 of the holding member 362 is inserted into a through hole 386 of the movable member 384. The movable member 384 is capable of moving from a (top or distal) first location (refer to FIG. 22A), where a portion of the protruding part 366 is covered, downward to a second (bottom or proximal) location (refer to FIG. 22B), where the above-mentioned portion of the protruding part 366 is exposed. When the movable member 384 is at the first location, the pair of charging output terminals 360 is shielded by the movable member 384. On the other hand, when the movable member 384 is at the second location, the pair of charging output terminals 360 is exposed. According to such a configuration, the holding member 362 and the charging output terminals 360 are protected by the movable member 384 when the power tool 12 is not being charged, which prevents damage to the holding member 362 and the charging output terminals 360. As shown in FIG. 22C, the movable member 384 can rotate together with the holding member 362.

Unlike in the first embodiment, an urging member 390 is provided on the charger main body 322. The urging member 390 may comprise a spring, e.g., a compression spring, or another resiliently elastic material that returns to its normal shape or form after a load is removed from it. The urging member 390 is supported by the holding member 362. In greater detail, as shown in FIG. 23C, the urging member 390 is disposed inside a groove 367, which is formed in the holding member 362. The groove 367 extends in the radial direction along the protruding part 366. The urging member 390 is positioned between the movable member 384 and the holding member 362 and is configured to urge the movable member 384 toward the first location regardless of the rotational position of the holding member 362.

As shown in FIG. 21, the movable member 384 further comprises a sliding projection 388, which protrudes toward the housing cover 346. Furthermore, a hollow or recessed part 392 is formed or defined in the housing cover 346 and receives or accommodates the sliding projection 388 of the movable member 384. The hollow part 392 has a laterally symmetric shape (i.e. it exhibits mirror symmetry along a vertical line). As shown in FIG. 24B, by holding or retaining the sliding projection 388 of the movable member 384 inside the hollow part 392, the movable member 384 is prevented from coming off of the holding member 362. Circumferential edges 394 of the hollow part 392 are slide surfaces, against or along which the sliding projection 388 slides in order to follow the rotation of the holding member 362. A distance R (refer to FIG. 24B) from the rotary shaft 356 of the holding member 362 to the slide surface 394 in the radial direction of the rotary shaft 356 varies along the circumferential direction of the rotary shaft 356 over at least part of each of the slide surfaces 394. Specifically, the distance R is maximal at a portion 396 at which the sliding projection 388 makes contact when the holding member 362 is disposed at the normal position, and the distance R decreases as the holding member 362 becomes more spaced apart from the portion 396.

Figure 24A:
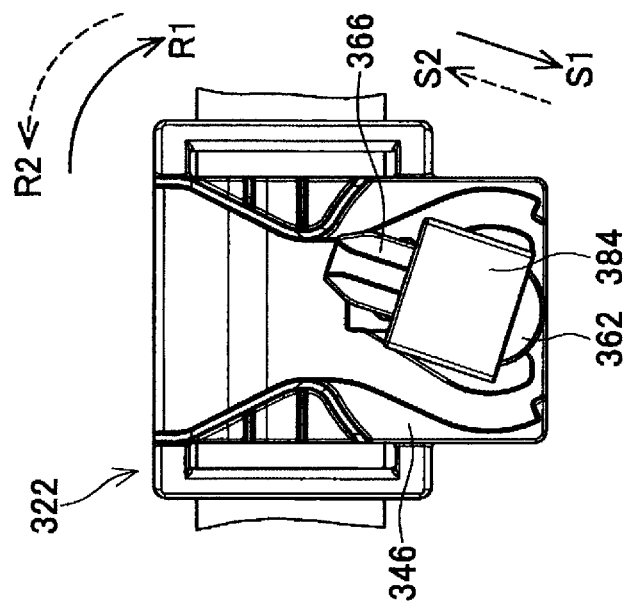
FIGS. 24A and 24B show, according to the fourth embodiment, a mechanism that couples rotational motion of the holding member and sliding motion of the movable member.
Figure 24B:
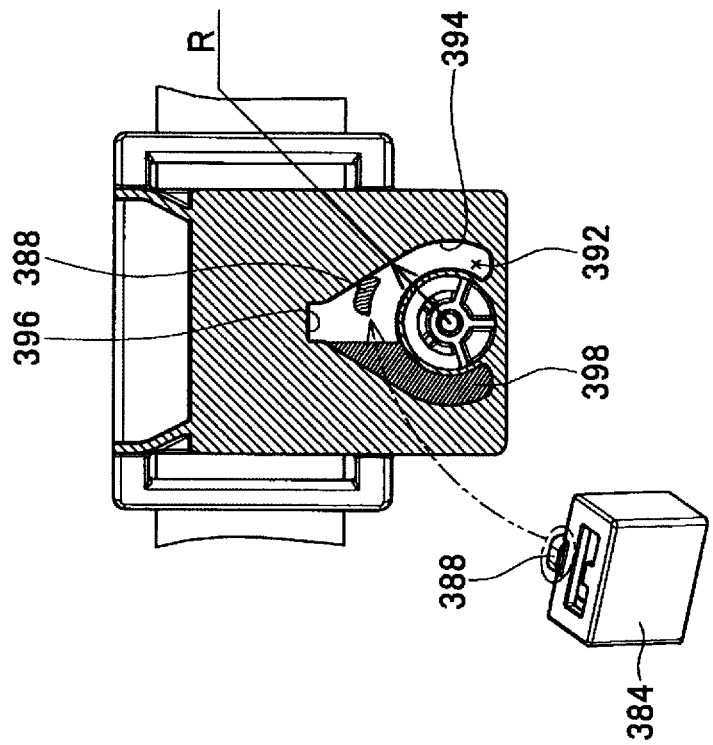

According to such a configuration, as shown in FIG. 24A, when the power tool 12 is not attached and the holding member 362 rotates (in direction R1) away from the normal position (i.e., from the vertical position), the movable member 384 moves (in direction S1) from the first location to the second location. Moreover, when the holding member 362 rotates (in direction R2) toward the normal position, the movable member 384 moves (in direction S2) from the second location to the first location. That is, the rotational motion of the holding member 362 is coupled to (i.e. it influences) the sliding motion of the movable member 384. As discussed above, the movable member 384 is urged by the urging member 390 toward the first location. As a result, the holding member 362 also is urged by the same urging member 390 toward the normal position.

Furthermore, a recessed part 396, which is recessed in the radial direction of the rotary shaft 356, is formed at the vertically uppermost part of the slide surfaces 394, i.e. at the portion that the sliding projection 388 contacts when the holding member 362 is at the normal position. When the holding member 362 is at the normal position, the sliding projection 388 of the movable member 384 fits into the recessed part 396. Thus, when the power tool 12 is detached, the holding member 362 can be stably maintained at the normal position by the interference-fit of the sliding projection 388 and the recessed part 396.

A rotation restricting member (e.g., a stop) 398 is provided in the hollow part 392. The rotation-restricting member 398 can be attached to and detached from the hollow part 392. When the rotation-restricting member 398 is attached to the hollow part 392, the holding member 362 is restricted to rotating from the normal position in only one direction. That is, when the rotation restricting member 398 is attached to a left side portion of the hollow part 392 as shown in FIG. 24B, the holding member 362 is permitted to rotate away from the normal position only in the clockwise direction (refer to FIGS. 23B, 24B). In contrast, when the rotation-restricting member 398 is attached to a right side portion of the hollow part 392 (not shown), the holding member 362 is permitted to rotate away from the normal position only in the counterclockwise direction. If the user is right handed and thus the charging main body 322 will be worn on the user's right side, the rotation restricting member 398 should be attached to the left side portion of the hollow part 392 as shown in FIG. 24B so that the power tool 12 is rotatable only in the user's forward direction. On the other hand, if the user is left handed and thus the charging main body 322 will be worn on the user's left side, then the rotation-restricting member 398 should be attached to the right side portion of the hollow part 392.

Figure 25B:
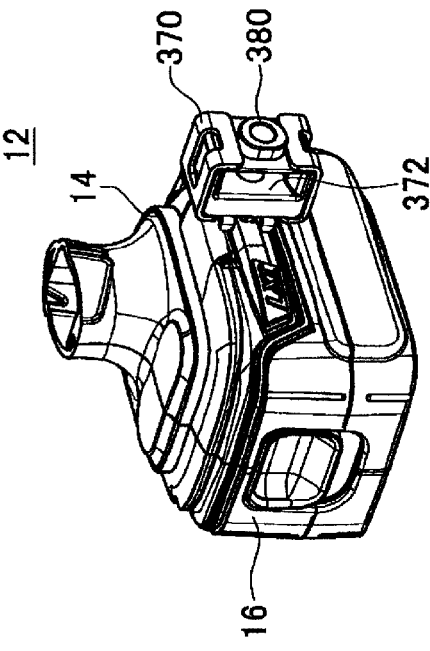
FIGS. 25A-25E show various perspective and lateral views of the power tool and the charging adapter of the fourth embodiment.
Figure 25A:
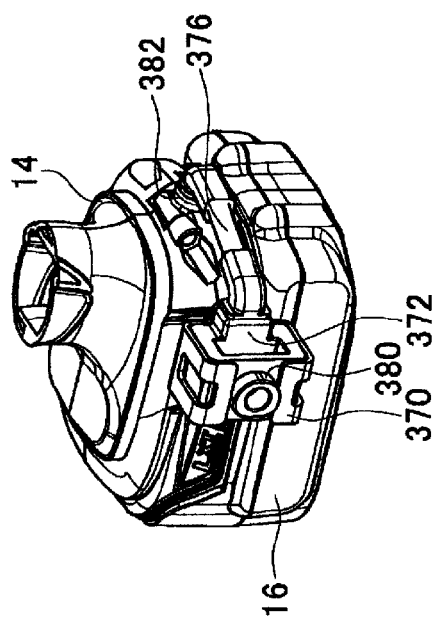
Figure 25E:
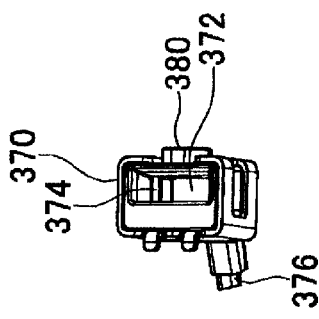
Figure 25D:
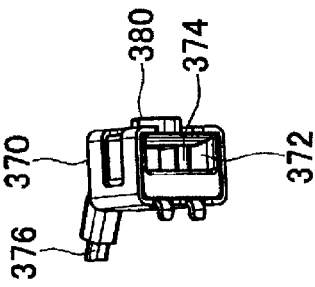
Figure 25C:
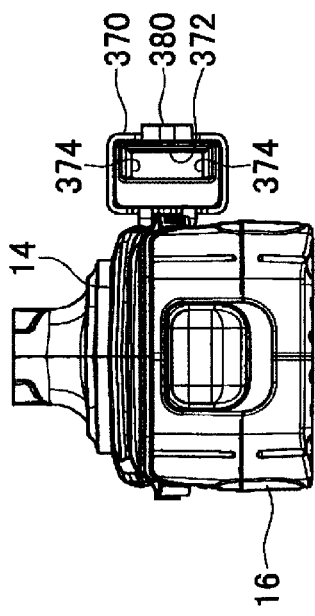

The configuration of the charging adapter 370 of the present embodiment will now be explained with reference to FIGS. 25A-25E. Similar to the preceding embodiments, the charging adapter 370 is preferably configured to be attached to and detached from the power tool 12. As shown in FIGS. 25A and 25B, the charging adapter 370 is electrically connected to the tool body 14 via an electrical cord 376. A connector 382 is connected to the tip of the electrical cord 376 such that the electrical cord 376 can be rotated with respect to the tool body 14. Thus, a right-handed user can rotate the charging adapter 370, using the connector 382 as a fulcrum, and fix the charging adapter 370 to a left side surface of the tool body 14 such that the charging adapter 370 is located on the left side of the tool body 14. Moreover, a left-handed user can rotate the charging adapter 370, using the connector 382 as a fulcrum, and fix the connector 382 to a right side surface of the tool body 14 such that the charging adapter 370 is located on the right side of the tool body 14. By virtue of the connector 382 rotatably supporting the electrical cord 376, the electrical cord 376 can be disposed along a side surface of the tool body 14 regardless of which side surface of the tool body 14 the user attaches the charging adapter 370 to.

The charging adapter 370 has a receiving hole 372 configured to receive and accommodate the protruding part 366 of the charger main body 322, e.g., with a small clearance. Charging input terminals 374 are provided inside the receiving hole 372 and are configured or adapted receive the charging current (power) from the charger 20. In one example, the charging input terminals 374 of the present embodiment include a pair of contact type terminals made of metal that are respectively disposed on an upper side inner surface and a lower side inner surface—one terminal per surface—of the receiving hole 372. That is, the arrangement of the pair of charging input terminals 374 is modified from the arrangement of the first embodiment.

A lock projection 380 is formed or defined on the outer surface of the charging adapter 370. As in the first embodiment, a lock mechanism may include the lock projection 380 and the lock walls 352 discussed above.

Figure 26C:
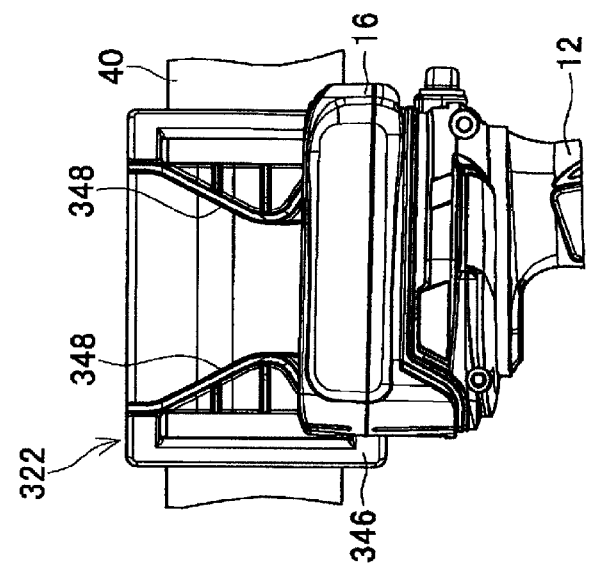
FIGS. 26A-26C show, according to the fourth embodiment, various lateral views of the power tool being attached to the charger main body.
Figure 26B:
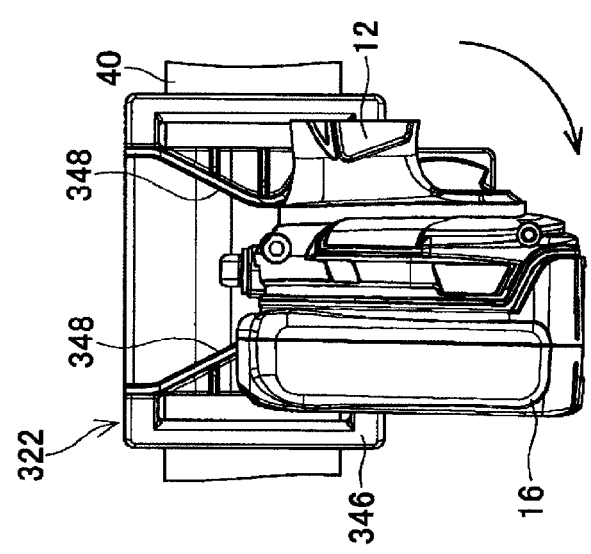
Figure 26A:
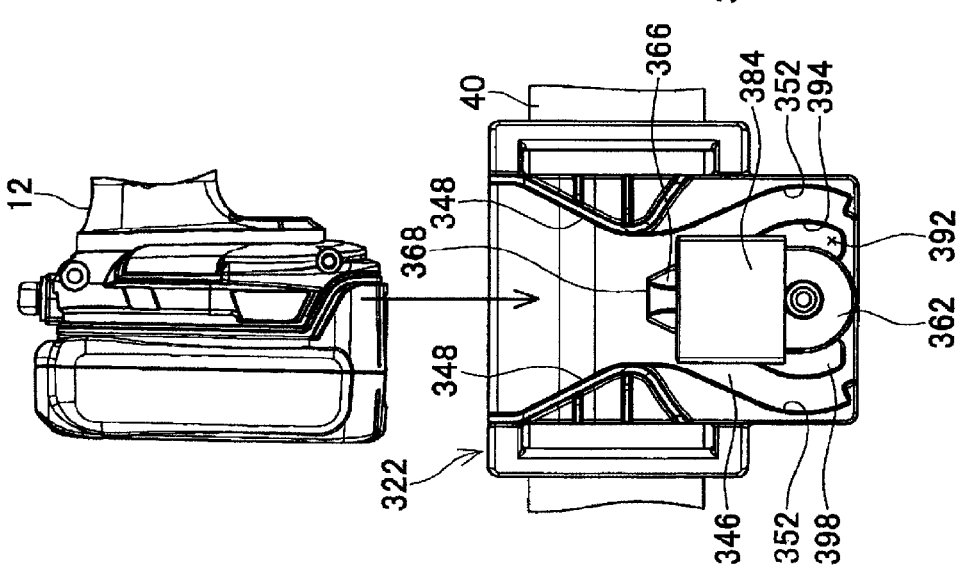
Figure 28A:
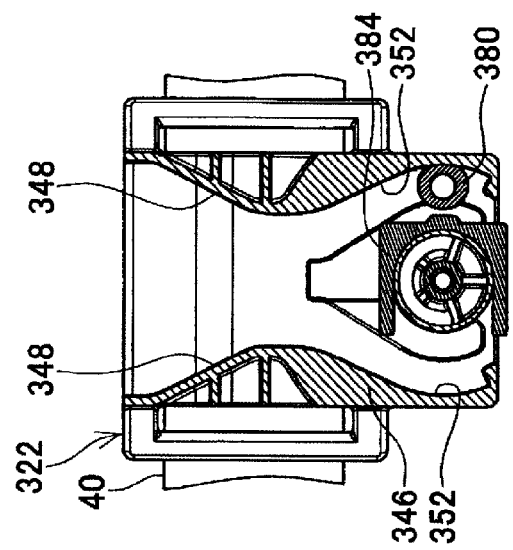
FIGS. 28A-28C also show a progression of states wherein the power tool is attached to the charger main body according to the procedure described in FIG. 26A through FIG. 26C; in these views, a lock projection of the power tool is shown moving relative to the lock walls of the charger main body.

FIG. 26A shows a state immediately before the user attaches the power tool 12 to the charger main body 322. At this time, as shown in FIG. 27A, the charging adapter 370 of the power tool 12 is at a position that is spaced apart from (above) the charger main body 322. The movable member 384 of the charger main body 322 is at the first location where it shields the charging output terminals 360. In addition, as shown in FIG. 28A, the lock projection 380 of the charging adapter 370 is also at a position that is spaced apart from (above) the charger main body 322. Furthermore, as shown in FIG. 29A, the sliding projection 388 of the movable member 384 is interference-fit in the recessed part 396 defined at the top of the slide surfaces 394, such that the holding member 362 is maintained at the normal position.

Figure 28B:
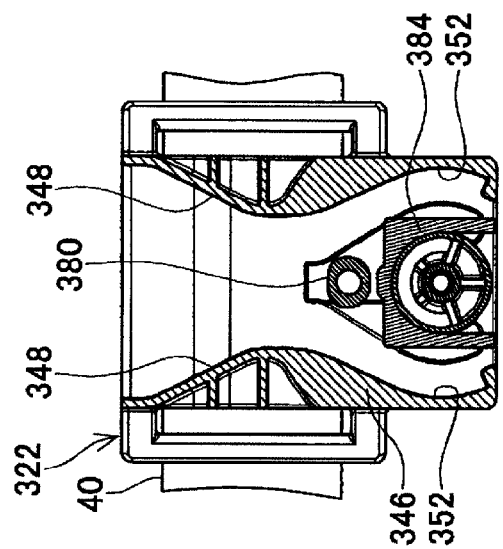

FIG. 26B shows a state immediately after the power tool 12 has been attached to the charger main body 322. At this time, as shown in FIG. 27B, the protruding part 366 of the holding member 362 is inserted into the receiving hole 372 of the charging adapter 370, and the charging input terminals 374 of the charging adapter 370 contact the charging output terminals 360 of the charger main body 322, such that the charging operation can begin. The movable member 384 has been pushed downwardly by the charging adapter 370 and has moved to its second location. When the movable member 384 moves to the second location, at least a portion of an inner surface of the through hole 386 of the movable member 384 wipes or scrapes the surfaces of the charging output terminals 360. Therefore, any foreign matter adhered to the charging output terminals 360 is dislodged and removed. As shown in FIG. 28B, the lock projection 380 of the charging adapter 370 is still not in contact with the lock walls 352 of the charger main body 322. As shown in FIG. 29B, by virtue of the movable member 384 moving to the second location, the sliding projection 388 of the movable member 384 separates from the recessed part 396 of the slide surfaces 394. As a result, the holding member 362 becomes rotatable.

Figure 28C:
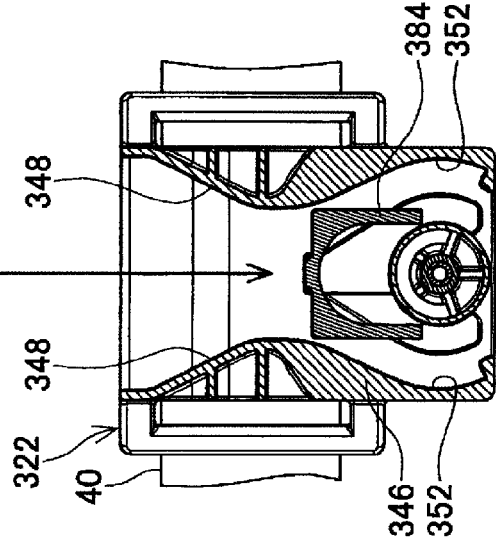

FIG. 26C shows a state wherein the power tool 12, which is attached to the charger main body 322, has rotated downward due to its intrinsic weight (i.e. due to gravity). At this time, as shown in FIG. 27C, the charging adapter 370 and the holding member 362 rotate together, and therefore the electrical connection between the charging input terminals 374 and the charging output terminals 360 is maintained. Namely, the charging operation is not interrupted by the rotation of the power tool 12. As shown in FIG. 28C, by virtue of the rotation of the power tool 12, the lock projection 380 of the charging adapter 370 comes into contact with the inner sides of the lock walls 352 of the charger main body 322. Consequently, the power tool 12 becomes locked in the charger main body 322 so that it can not fall off. At this time, as shown in FIG. 29C, the sliding projection 388 of the movable member 384 is spaced apart from the slide surfaces 394 of the charger main body 322. Accordingly, the rotation of the holding member 362 and the power tool 12 is not hindered by the sliding projection 388.

In order to detach the power tool 12 from the charger main body 322, the above-described procedure is simply reversed. More specifically, the (right-handed) user rotates the power tool 12, which is suspended from the charger main body 322, counterclockwise (i.e., from the position shown in FIG. 26C to the position shown in FIG. 26B). Subsequently, the power tool 12 is extracted or withdrawn upward from the charger main body 322 (i.e., from the position shown in FIG. 26B to the position shown in FIG. 26A). In the state shown in FIG. 26B, the power tool 12 is urged, together with the movable member 384, upward by the urging member 390. That is, the urging member 390 urges the power tool 12, which is attached to the holding member 362, in the direction that causes the power tool 12 to detach from the holding member 362, thereby providing a force that assists the user's lifting movement. As a result, the user can detach the power tool 12 from the charger main body 322 more easily (i.e. with the application of less lifting force to the power tool 12) than if the urging member 390 did not supply this power tool removal assisting force. Thus, in the present embodiment, a configuration is adopted wherein the same urging member 390 urges the movable member 384 toward the first location and urges the holding member 362 toward the normal position and wherein the urging is in the direction in which the power tool 12 detaches.

Although the charger main body 22, 222, 322 is described shown as being physically separate, but electronically connectable, with the battery interface 30 in the above-described representative embodiments, of course, these components may also be designed so as to be physically connected with no seams therebetween. In addition, although a separate charging adapter 70, 270, 370 has been provided in the representative embodiments for conducting charging current to the battery pack 16, of course, the charging input terminals may instead be directly affixed on or in the battery pack 16, thereby eliminating the need for a separate charging adapter.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved portable chargers, power tools, power tool systems and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Further embodiments disclosed herein include, but are not limited to:

1. A hand-held power tool system, comprising:

a hand-held power tool that comprises an electric motor (e.g., a motor or a solenoid) configured or adapted to drive a tool, a first battery pack configured or adapted to supply a drive current to the electric motor, and charging input terminals configured to receive charging power for charging the first battery pack; and a charger that comprises a charger main body configured or adapted to be worn on a user's body, a holding member provided on the charger main body and configured or adapted to attachably/detachably hold the power tool, and charging output terminals configured to be electrically connected to the charging input terminals when the power tool is held by the holding member and to output the charging power to the first battery pack.

2. A power tool system according to embodiment 1, wherein:

the holding member is supported on the charger main body such that it is rotatable relative to the charger main body and is urged toward a first rotation position, the holding member being further configured or adapted such that:

when the holding member is at the first rotation position, the power tool is attachable to and detachable from the holding member; and when the power tool is attached to the holding member, the holding member is caused to rotatable away from the first rotation position by the weight of the power tool.

3. A power tool system according to embodiment 2, wherein:

the holding member is rotatable until a center of gravity of the power tool is positioned vertically below a rotary shaft of the holding member.

4. A power tool system according to embodiment 2 or embodiment 3, wherein the holding member is configured or adapted such that:
when the holding member has rotated away from the first rotation position, a lock mechanism prevents the power tool from detaching from the holding member, the lock mechanism being provided on the power tool and/or on the charger.

5. A power tool system according to embodiment 4, wherein:
the lock mechanism has lock walls provided on the charger main body; and
the lock walls are formed or defined at a position such that the lock walls contact the power tool, which is attached to the holding member, when the holding member has rotated away from the first rotation position.

6. A power tool system according to embodiment 5, wherein:
at least a portion of each of the lock walls extends in a circumferential direction with respect to the rotary shaft of the holding member.

7. A power tool system according to any one of embodiments 2 to 6, wherein the holding member is configured or adapted such that:
when the power tool is attached to the holding member, an electrical connection between the charging output terminals and the charging input terminals is maintained regardless of the rotational position of the holding member relative to the charger main body.

8. A power tool system according to embodiment 7, wherein:
the charging output terminals and the charging input terminals constitute a set of contact type connection terminals;
the charging output terminals are provided on the holding member; and
the charging output terminals and the charging input terminals physically contact one another when the power tool is attached to the holding member.

9. A power tool system according to embodiment 7, wherein:
the charging output terminals and the charging input terminals constitute a set of noncontact type connection terminals; and
when the power tool is attached to the holding member, the charging output terminals and the charging input terminals are proximate enough to one another to permit wireless power transmission from the charging output terminals to the charging input terminals.

10. A power tool system according to any one of embodiments 2 to 9, wherein the holding member is configured or adapted such that:
the attitude of the user's wrist when the power tool attaches to the holding member, which is at the first rotation position, is close to the attitude of the user's wrist when the user naturally lowers his or her hand, which holds the power tool.

11. A power tool system according to any one of embodiments 1 to 10, wherein:
at least part of the holding member opposes the charger main body across a gap; and
the charging output terminals are disposed in the gap.

12. A power tool system according to any one of embodiments 1 to 11, wherein:
either the power tool or the holding member includes a protruding part and the other has a hole, a groove, or some other receiving part configured or adapted to receive the protruding part.

13. A power tool system according to embodiment 12, wherein:
the protruding part has an elongated plate shape, whose tip is narrowed; and
the receiving part has a receiving hole, which receives the elongated plate shape.

14. A power tool system according to embodiment 12, wherein:
the protruding part has a disk shape; and
the receiving shape part has a receiving groove configured or adapted to receive the disk shape.

15. A power tool system according to any one of embodiments 1 to 14, wherein:
the charger further comprises a battery apparatus configured or adapted to supply the charging power to the charging output terminals.

16. A power tool system according to embodiment 15, wherein:
the battery apparatus comprises:
a second battery pack, which has at least one internal primary battery, secondary battery or fuel cell; and
a battery interface, to which the second battery pack is attachable and from which the second battery pack is detachable, the battery interface being electrically connected to the charging output terminals.

17. A power tool system according to embodiment 16, wherein:
the second battery pack is directly attachable to the power tool and is configured or adapted to directly supply the drive current to the power tool.

18. A power tool system according to any one of embodiments 15 to 17, wherein:
the charger main body and the battery apparatus are fixable to the user's hip using a common belt.

19. A power tool system according to any one of embodiments 15 to 18, wherein:
the battery apparatus has at least one secondary battery and is integrally formed with or built into the charger main body.

20. A power tool system according to any one of embodiments 1 to 19, wherein:
the power tool is attachable to the holding member in only one specific orientation.

21. A power tool system according to any one of embodiments 1 to 20, wherein:
the charger main body is configured or adapted to be disposed on either the left or the right side of the user's body.

22. A power tool system according to any one of embodiments 1 to 21, wherein:
the power tool is configured or adapted such that the battery pack can be attached thereto or detached therefrom.

23. A power tool system according to any one of embodiments 1 to 22, wherein at least one element selected from the group consisting of the power tool and the charger further comprises an urging member configured or adapted to urge the power tool attached to the holding member in a direction to be detached from the holding member.

24. A power tool system according to any one of embodiments 1 to 23, wherein:
the charger further comprises a movable member; and
the movable member is configured or adapted to move between a first location and a second location relative to the holding member, to cover at least a portion of the holding member when the movable member is disposed at the first location, and to expose at least a portion of the holding member when the movable member is disposed at the second location.

25. A charger of a hand-held power tool, comprising:
a charger main body configured or adapted to be worn on a user's body;
a holding member configured or adapted to attachably/detachably hold the power tool; and
charging output terminals configured to output charging power.

26. A hand-held power tool system, comprising:
a hand-held power tool that comprises an electric motor (e.g., a motor or a solenoid) configured or adapted to drive a tool, a first battery pack configured or adapted to supply drive current to the electric motor, and charging input terminals configured or adapted to receive charging power for charging the first battery pack; and
a charger that comprises a charger main body configured or adapted to be mounted on the body of a user, a holding member provided on the charger main body and configured or adapted to attachably/detachably hold the power tool, and charging output terminals configured or adapted to electrically connect to the charging input terminals when the power tool is held by the holding member and to output the charging power to the first battery pack;
wherein,
at least one element selected from the group consisting of the power tool and the charger further comprises an urging member configured or adapted to urge the power tool attached to the holding member in a direction to be detached from the holding member.

27. A power tool system according to embodiment 26, wherein:
the urging member is provided on the charger.

28. A power tool system according to embodiment 26, wherein:
the urging member is supported by the holding member.

29. A power tool system according to embodiment 27, wherein:
the charger further comprises a movable member configured or adapted to move between a first location and a second location relative to the holding member, the urging member urging the movable member towards the first location, the movable member being further configured or adapted such that:
while the power tool is being attached to the holding member, the movable member moves from the first location to the second location; and
while the power tool is being detached from the holding member, the movable member moves from the second location to the first location.

30. A power tool system according to embodiment 29, wherein:
the holding member is supported such that it can rotate relative to the charger main body and is configured or adapted such that:
when the holding member is disposed at a first rotation position, the power tool is attachable to and detachable from the holding member;
when the holding member is rotated away from the first rotation position, the power tool is no longer detachable from the holding member;
the movable member is configured or adapted to move from the first location to the second location following rotation of the holding member away from the first position, and the movable member is configured or adapted to move from the second location to the first location following rotation of the holding member towards the first position; and
the holding member is urged toward the first rotation position by virtue of the urging member urging the movable member toward the first location.

31. A power tool system according to embodiment 30, wherein:
the charger main body has a slide surface configured or adapted such that the movable member, which rotates together with the holding member, is slidable against or along the slide surface; and
over at least a portion of the slide surface, a distance from a rotary shaft of the holding member to the slide surface varies along circumferential directions of the rotary shaft such that the distance is maximal at a portion at which the movable member makes contact when the holding member is disposed at the first rotation position.

32. A power tool system according to embodiment 31, wherein:
the slide surface has a recessed part at the portion at which the movable member makes contact when the holding member is disposed at the first rotation position.

33. A power tool system according to any one of embodiments 29 to 32, wherein:
the movable member covers at least part of the holding member when the movable member is disposed at the first location and exposes at least part of the holding member when the movable member is disposed at the second location.

34. A power tool system according to embodiment 33, wherein:
the charging output terminals are provided on the holding member; and
the movable member covers the charging output terminals when the movable member is disposed at the first location and exposes the charging output terminals when the movable member is disposed at the second location.

35. A power tool system according to any one of embodiments 29 to 34, wherein:
the charger is configured or adapted such that the holding member is rotatable away from the first rotation position in either one direction or the other direction.

36. A power tool system according to embodiment 35, wherein:
the charger further comprises a rotational direction limiting member configured to selectively limit the direction in which the holding member rotates away from the first rotation position to only the one direction or only the other direction.

37. A hand-held power tool system, comprising:
a hand-held power tool that comprises an electric motor (e.g., a motor or a solenoid) configured or adapted to drive a tool, a first battery pack configured or adapted to supply drive current to the electric motor, and charging input terminals configured to receive charging current (power) for charging the first battery pack; and
a charger that comprises a charger main body, which is mountable on the body of a user, a holding member provided on the charger main body and configured or adapted to attachably/detachably hold the power tool, and charging output terminals configured to electrically connect the charging power input terminals of the power tool held by the holding member and to output the charging current (power) to the first battery pack;
wherein,
the charger further comprises a movable member; and the movable member is configured or adapted to move between a first location and a second location relative to the holding member, to cover at least a portion of the holding member when the movable member is disposed at the first location, and to expose at least a portion of the holding member when the movable member is disposed at the second location.

38. A power tool system according to embodiment 37, wherein:
the charging output terminals are provided on the holding member; and
the movable member is configured or adapted to cover the charging output terminals when the movable member is disposed at the first location and to expose the charging output terminals when the movable member is disposed at the second location.

39. A power tool system according to embodiment 37, wherein:
the movable member has a wiping surface configured or adapted to wipe respective surfaces of the charging output terminals when the moveable member moves between the first location and the second location.

40. A power tool system according to any one of embodiments 37 to 39, wherein: the charger further comprises an urging member configured or adapted to urge the movable member toward the first location, and the movable member is configured or adapted such that:
while the power tool is being attached to the holding member, the movable member moves from the first location to the second location; and
while the power tool is being detached from the holding member, the movable member moves from the second location to the first location.

41. A charger for a hand-held power tool, comprising:
a power source interface,
a charger base and
a charging cradle rotatably supported on the charger base, the rotatable charging cradle including at least two charging output terminals electrically connected to the power source interface.

42. A charger according to embodiment 41, further comprising:
at least one battery cell electrically connected to the power source interface and configured or adapted to supply a charging current to the charging output terminals.

43. A charger according to embodiment 42, wherein the at least one battery cell is disposed in a charger battery pack having terminals configured or adapted to be electrically connectable with, and electrically disconnectable from, corresponding terminals of the power source interface, the charger battery pack being configured or adapted to output a voltage between 10-40 volts, more preferably between 18-36 volts, even more preferably between 25-36 volts.

44. A charger according to embodiment 43, wherein the charger battery pack is configured or adapted to output a charging current of at least 0.7 amps, more preferably at least 1.0 amp, more preferably at least 3.0 amp, even more preferable at least 10 amp.

45. A charger according to any one of embodiments 41-45, further comprising:
means for detachably attaching the power source interface and the charger base to a user's body.

46. A charger according to embodiment 45, wherein the attaching means comprises at least one hook.

47. A charger according to embodiment 45 or 46, wherein the attaching means comprises a belt, a strap or a harness configured or adapted to be worn on the user's body.

48. A charger according to any one of embodiments 41-47, further comprising an urging member configured or adapted to urge the charging cradle towards a first rotational position, at which charging input terminals of the hand-held power tool are attachable to the rotatable charging cradle.

49. A charger according to any one of embodiments 41-48, wherein the rotatable charging cradle is configured such that the charging output terminals are exposed by rotation of the charging cradle relative to the charger base away from the first rotational position.

50. A charger according to embodiment 49, further comprising a movable cover configured or adapted to cover the charging output terminals when the charging cradle is at the first rotational position and to uncover the charging output terminals when the charging cradle is rotated away from the first rotational position.

51. A charger according to embodiment 50, wherein the movable cover is slidable relative to the charging cradle between a first location that covers the charging output terminals and a second location that uncovers the charging output terminals.

52. A charger according to any one of embodiments 41-51, further comprising a first lock mechanism configured or adapted to prevent the hand-held power tool from being detached from the charging cradle when the charging cradle is not disposed at the first rotational position, the hand-held power tool being detachable from the charging cradle at the first rotational position.

53. A charger according to any one of embodiments 41-52, further comprising a second lock mechanism configured or adapted to prevent the charging cradle from rotating away from the first rotational position when the hand-held power tool is not mounted on the charging cradle, wherein the second lock mechanism is configured to be released by insertion of a portion of the hand-held power tool into or around the charging cradle.

54. A charger according to any one of embodiments 41-53, further comprising means for wiping the surfaces of the charging output terminals when the charging cradle is rotated away from the first rotational position.

55. A charger according to any one of embodiments 41-54, further comprising a charging controller (e.g., at least one microprocessor) attached to the charger base, the charging controller being configured or adapted to control the voltage and/or the current of the charging current supplied to the charging output terminals.

56. A charger according to any one of embodiments 41-55, wherein the charging cradle is pivotable by at least 90 degrees relative to the charger base, but preferably less than 180 degrees.

57. A charger according to any one of embodiments 41-56, further comprising at least one guide disposed on the charger base and configured or adapted to guide charging input terminals of the hand-held power tool towards the charging cradle.

58. A charger according to any one of embodiments 41-57, wherein the hand-held power tool is freely pivotable relative to the charger base when the hand-held power tool is electrically connected to the charging cradle.

60. A power tool system comprising:
the charger according to any one of embodiments 41-58, and
a hand-held power tool comprising:
charging input terminals configured or adapted to electronically connect to the charging output terminals and
at least one battery cell electrically connected with the charging input terminals.

61. A power tool system according to embodiment 60, wherein the charger battery pack is configured or adapted to store sufficient energy to fully recharge the at least one battery cell of the hand-held power tool at least one time, more preferably at least five times and even more preferably at least ten times.

62. A power tool system according to embodiment 61, wherein the power tool further comprises a charging adapter that includes the charging input terminals, the charging adapter being configured to conduct the charging current between the charger and the at least one battery cell.

63. A power tool system according to any one of embodiments 60-62, wherein the at least one battery cell is disposed in a power tool battery pack that is physically attachable to and detachable from a housing of the power tool.

64. A power tool system according to embodiment 63, wherein the charging adapter is configured to be physically attached to the power tool housing and/or to the power tool battery pack.

65. A power tool system according to embodiment 63 or 64, wherein the power tool battery pack is chargeable while the power tool battery pack is connected to the power tool housing.

66. A power tool system according to any one of embodiments 60-65, wherein the power tool is an electric driver drill, an electric hammer driver drill, an electric impact driver, an electric impact wrench, an electric screwdriver or an electric grinder.

71. A charger for a hand-held power tool, comprising:
a battery pack interface,
a charger main body and
a holding member rotatably supported on the charger main body, the rotatable holding member including at least two charging output terminals electrically connected to the battery pack interface.

72. A charger according to embodiment 71, further comprising:
at least one battery cell electrically connected to the battery pack interface and configured or adapted to supply a charging current to the charging output terminals.

73. A charger according to embodiment 72, wherein the at least one battery cell is disposed in a charger battery pack having terminals configured or adapted to be electrically connectable with, and electrically disconnectable from, corresponding terminals of the battery pack interface, the charger battery pack being configured or adapted to output a voltage between 10-40 volts, more preferably between 18-36 volts, even more preferably between 25-36 volts.

74. A charger according to embodiment 73, wherein the charger battery pack is configured or adapted to output a charging current of at least 0.7 amps, more preferably at least 1.0 amp, more preferably at least 3.0 amp, even more preferable at least 10 amp.

75. A charger according to any one of embodiments 71-75, further comprising:
means for detachably attaching the battery pack interface and the charger main body to a user's body.

76. A charger according to embodiment 75, wherein the attaching means comprises at least one hook.

77. A charger according to embodiment 75 or 76, wherein the attaching means comprises a belt, a strap or a harness configured or adapted to be worn on the user's body.

78. A charger according to any one of embodiments 71-77, further comprising an urging member configured or adapted to urge the charger main body towards a first rotational position, at which charging input terminals of the hand-held power tool are attachable to the rotatable holding member.

79. A charger according to any one of embodiments 71-78, wherein the rotatable holding member is configured such that the charging output terminals are exposed by rotation of the holding member relative to the charger main body away from the first rotational position.

80. A charger according to embodiment 79, further comprising a movable member configured or adapted to cover the charging output terminals when the holding member is at the first rotational position and to uncover the charging output terminals when the holding member is rotated away from the first rotational position.

81. A charger according to embodiment 80, wherein the movable member is slidable relative to the holding member between a first location that covers the charging output terminals and a second location that uncovers the charging output terminals.

82. A charger according to any one of embodiments 71-81, further comprising a first lock mechanism configured or adapted to prevent the hand-held power tool from being detached from the holding member when the holding member is not disposed at the first rotational position, the hand-held power tool being detachable from the holding member at the first rotational position.

83. A charger according to any one of embodiments 71-82, further comprising a second lock mechanism configured or adapted to prevent the holding member from rotating away from the first rotational position when the hand-held power tool is not mounted on the holding member, wherein the second lock mechanism is configured to be released by insertion of a portion of the hand-held power tool into or around the holding member.

84. A charger according to any one of embodiments 71-83, further comprising means for wiping the surfaces of the charging output terminals when the holding member is rotated away from the first rotational position.

85. A charger according to any one of embodiments 71-84, further comprising a charging controller (e.g., at least one microprocessor) attached to the charger main body, the charging controller being configured or adapted to control the voltage and/or the current of the charging current supplied to the charging output terminals.

86. A charger according to any one of embodiments 71-85, wherein the holding member is pivotable by at least 90 degrees relative to the charger main body, but preferably less than 180 degrees.

87. A charger according to any one of embodiments 71-86, further comprising at least one guide disposed on the charger main body and configured or adapted to guide charging input terminals of the hand-held power tool towards the holding member.

88. A charger according to any one of embodiments 71-87, wherein the hand-held power tool is freely pivotable relative to the charger main body when the hand-held power tool is electrically connected to the holding member.

90. A power tool system comprising:
the charger according to any one of embodiments 71-88, and
a hand-held power tool comprising:
charging input terminals configured or adapted to electronically connect to the charging output terminals and
at least one battery cell electrically connected with the charging input terminals.

91. A power tool system according to embodiment 90, wherein the charger battery pack is configured or adapted to store sufficient energy to fully recharge the at least one battery cell of the hand-held power tool at least one time, more preferably at least five times and even more preferably at least ten times.

92. A power tool system according to embodiment 91, wherein the power tool further comprises a charging adapter that includes the charging input terminals, the charging adapter being configured to conduct the charging current between the charger and the at least one battery cell.

93. A power tool system according to any one of embodiments 90-92, wherein the at least one battery cell is disposed in a power tool battery pack that is physically attachable to and detachable from a housing of the power tool.

94. A power tool system according to embodiment 93, wherein the charging adapter is configured to be physically attached to the power tool housing and/or to the power tool battery pack.

95. A power tool system according to embodiment 93 or 64, wherein the power tool battery pack is chargeable while the power tool battery pack is connected to the power tool housing.

96. A power tool system according to any one of embodiments 90-95, wherein the power tool is an electric driver drill, an electric hammer driver drill, an electric impact driver, an electric impact wrench, an electric screwdriver or an electric grinder.

REFERENCE SIGNS LIST 10, 210: System
12: Hand-held power tool
13: Grip
14: Tool main body
16: First battery pack
18: Tool shaft
19: Trigger
20: Charger
22, 222: Charger main body (base)
24: Electrical cord
26: Battery power supply
28: Second battery pack
30: Battery interface
40: Hip belt
42, 242: Belt hook
44, 244: Housing plate
46, 246: Housing cover
48, 248: Guides
50: Hole of housing cover
52, 252: Lock walls
54: Flange of shaft
56, 256: Shaft
58: Torsion spring
60, 260: Charging output terminals
62, 262: Holding member
64: Center hole of holding member
66: Protruding part
68: Tip of protruding part
70, 270: Charging adapter
72: Receiving hole of charging adapter
74, 274: Charging input terminals
76, 276: Electrical cord
80: Lock projection of charging adapter
82, 282: Connectors
102: Secondary battery cell
106: Temperature sensor
108: Shunt resistor
110: Cell monitor circuit
112: Battery controller
114: Power output terminal
122: Power input terminal
124: Main switch
126: Motor
128: Semiconductor switch
130: Tool controller
132: Adapter connection terminal
142: Tool connection terminal
144: Semiconductor switch
146: Adapter controller
152: Drive circuit
154: Charger detection circuit
154a: Zener diode
154b: Transistor
156: Diode
158: PTC thermistor
162: Semiconductor switch
164: Drive circuit
166: Tool detection circuit
168: Charging controller
170: Converter
172: Power input terminal
182: Power output terminal
184: Battery controller
186: Cell monitor circuit
188: Secondary battery cell
190: Temperature sensor
192: Shunt resistor
247: Guide cover
266: Receiving groove
272: Protruding part
273: Rib
278: Shaft
282: Connector
322: Charger main body (base)
340: Hip belt
342: Belt hook
344: Housing plate
346: Housing cover
348: Guide
352: Lock wall
356: Shaft
360: Charging output terminal
362: Holding member
366: Protruding part
367: Groove of protruding part
368: Tip of protruding part
370: Charging adapter
372: Receiving hole of charging adapter
374: Charging input terminal
376: Electrical cord
380: Lock projection of charging adapter
382: Connector
384: Movable member (cover)
386: Through hole of movable member
388: Sliding projection of movable member
390: Urging member
392: Hollow part
394: Slide surface
396: Recessed part of slide surface
398: Rotation restricting member

The invention claimed is:
1. A charger for a hand-held power tool, comprising:
a power source interface,
a charger base, a charging cradle rotatably supported on the charger base, the rotatable charging cradle including at least two charging output terminals electrically connected to the power source interface, and at least one guide disposed on the charger base and configured to guide charging input terminals of the hand-held power tool towards the charging cradle.

2. The charger according to claim 1, further comprising: at least one battery cell electrically connected to the power source interface and configured to supply a charging current to the charging output terminals.

3. The charger according to claim 2, wherein the at least one battery cell is disposed in a charger battery pack having terminals configured or adapted to be electrically connectable with, and electrically disconnectable from, corresponding terminals of the power source interface, the charger battery pack being configured to output a voltage between 10-40 volts.

4. The charger according to claim 3, wherein the charger battery pack is configured to output a charging current of at least 0.7 amps.

5. The charger according to claim 1, further comprising: means for detachably attaching the power source interface and the charger base to a user's body.

6. The charger according to claim 5, wherein the means for attaching comprises at least one hook.

7. The charger according to claim 1, wherein the rotatable charging cradle is configured such that the charging output terminals are exposed by rotation of the charging cradle relative to the charger base away from a first rotational position.

8. The charger according to claim 7, further comprising a movable cover configured to cover the charging output terminals when the charging cradle is at the first rotational position and to uncover the charging output terminals when the charging cradle is rotated away from the first rotational position.

9. The charger according to claim 8, wherein the movable cover is slidable relative to the charging cradle between a first location that covers the charging output terminals and a second location that uncovers the charging output terminals.

10. The charger according to claim 1, further comprising means for wiping the surfaces of the charging output terminals when the charging cradle is rotated away from a first rotational position.

11. The charger according to claim 1, wherein the charging cradle is pivotable by at least 90° relative to the charger base, but less than 180°.

12. The charger according to claim 1, wherein the charging cradle is configured such that the hand-held power tool is freely pivotable relative to the charger base when the hand-held power tool is electrically connected to the charging cradle.

13. A charger for a hand-held power tool, comprising:
a power source interface,
a charger base,
a charging cradle rotatably supported on the charger base, the rotatable charging cradle including at least two charging output terminals electrically connected to the power source interface, and
means for detachably attaching the power source interface and the charger base to a user's body,
wherein the means for attaching comprises a belt configured to be worn on the user's body.

14. A charger for a hand-held power tool, comprising:
a power source interface,
a charger base,
a charging cradle rotatably supported on the charger base, the rotatable charging cradle including at least two charging output terminals electrically connected to the power source interface, and
an urging member configured to urge the charging cradle towards a first rotational position, at which charging input terminals of the hand-held power tool, or of an optional charging adapter that is physically and electrically connected to the hand-held power tool, are attachable to the rotatable charging cradle.

15. A charger for a hand-held power tool, comprising:
a power source interface,
a charger base,
a charging cradle rotatably supported on the charger base, the rotatable charging cradle including at least two charging output terminals electrically connected to the power source interface, and
a first lock mechanism configured to prevent the hand-held power tool from being detached from the charging cradle when the charging cradle is not disposed at a first rotational position, the hand-held power tool being detachable from the charging cradle at the first rotational position.

16. The charger according to claim 15, further comprising a second lock mechanism configured to prevent the charging cradle from rotating away from the first rotational position when the hand-held power tool is not mounted on the charging cradle, wherein the second lock mechanism is configured to be released by insertion of a portion of the hand-held power tool into or around the charging cradle.

17. A charger for a hand-held power tool, comprising:
a power source interface,
a charger base,
a charging cradle rotatably supported on the charger base, the rotatable charging cradle including at least two charging output terminals electrically connected to the power source interface, and
a charging controller attached to the charger base, the charging controller being configured to control the voltage and/or the current of the charging current supplied to the charging output terminals.

18. A charger for a hand-held power tool, comprising:
a power source interface,
a charger base and
a charging cradle rotatably supported on the charger base, the rotatable charging cradle including at least two charging output terminals electrically connected to the power source interface,
wherein the charging cradle is rotatably supported by a shaft that is fixedly attached to the charger base.

19. A power tool system comprising:
the charger according to claim 1, and
a hand-held power tool comprising:
charging input terminals configured to electrically connect to the charging output terminals and
at least one battery cell electrically connected with the charging input terminals.

20. The power tool system according to claim 19, wherein the charger battery pack is configured to store sufficient energy to fully recharge the at least one battery cell of the hand-held power tool at least one time.

21. The power tool system according to claim 19, wherein the power tool further comprises a charging adapter that includes the charging input terminals, the charging adapter being configured to conduct the charging current between the charger and the at least one battery cell.

22. The power tool system according to claim 19, wherein the charging adapter is detachably attached to the power tool.

23. The power tool system according to claim 19, wherein the at least one battery cell is disposed in a power tool battery pack that is physically attachable to and detachable from a housing of the power tool.

24. The power tool system according to claim 23, wherein the charging adapter is configured to be physically attached to the power tool housing and/or to the power tool battery pack.

25. The power tool system according to claim 23, wherein the charging adapter is configured to be physically engaged with only the power tool housing, but the charging adapter may optionally contact the power tool battery pack when engaged with the power tool housing.

26. The power tool system according to claim 23, wherein the power tool battery pack is chargeable while the power tool battery pack is connected to the power tool housing.

27. The power tool system according to claim 23, wherein the power tool battery pack is configured to output a voltage between 10-40 volts.

28. The power tool system according to claim 19, wherein the power tool is an electric driver drill, an electric hammer driver drill, an electric impact driver, an electric impact wrench, an electric screwdriver or an electric grinder.

29. A method of charging the power tool system of claim 19, comprising:
contacting the charging input terminals of the power tool with the charging output terminals of the charger,
rotating the charging cradle and the power tool relative to the charging base while the charging input terminals contact the charging output terminals, and
supplying charging current to the at least one battery cell while the at least one battery cell is connected to the power tool and while the charging cradle and the power tool are allowed to freely swing relative to the charging base.

30. A charger for a hand-held power tool, comprising:
a battery pack interface,
a charger main body and
rotatable holding means for holding the hand-held power tool, the rotatable holding means being rotatably supported on the charger main body and including at least two charging output terminals electrically connected to the battery pack interface.

31. The charger according to claim 30, further comprising:
a belt configured to be worn around a user's waist, the battery pack interface and the charger main body being attached to the belt.

* * * * *